(12) United States Patent
Moses et al.

(10) Patent No.: US 9,171,646 B2
(45) Date of Patent: Oct. 27, 2015

(54) CONTROL OF A LASER INERTIAL CONFINEMENT FUSION-FISSION POWER PLANT

(75) Inventors: Edward I. Moses, Livermore, CA (US); Jeffery F. Latkowski, Livermore, CA (US); Kevin J. Kramer, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1244 days.

(21) Appl. No.: 12/681,165

(22) PCT Filed: Sep. 30, 2008

(86) PCT No.: PCT/US2008/011335
§ 371 (c)(1),
(2), (4) Date: May 16, 2011

(87) PCT Pub. No.: WO2009/058185
PCT Pub. Date: May 7, 2009

(65) Prior Publication Data
US 2011/0286563 A1    Nov. 24, 2011

Related U.S. Application Data

(60) Provisional application No. 60/997,780, filed on Oct. 4, 2007, provisional application No. 61/130,200, filed on May 29, 2008.

(51) Int. Cl.
*G21B 1/01* (2006.01)
*G21B 1/13* (2006.01)
*G21B 1/19* (2006.01)

(52) U.S. Cl.
CPC .. *G21B 1/01* (2013.01); *G21B 1/19* (2013.01); *Y02E 30/16* (2013.01); *Y02E 50/30* (2013.01); *Y02T 50/678* (2013.01)

(58) Field of Classification Search
CPC ....................................................... G21B 1/001
USPC ........................................... 376/103, 110, 150
See application file for complete search history.

(56) References Cited

U.S. PATENT DOCUMENTS 3,762,992 A * 10/1973 Hedstrom ..................... 376/103
4,430,291 A    2/1984 Chi
(Continued)

OTHER PUBLICATIONS

Moir et al., "Molten Salt Fuel Version of Laser Inertial Fusion Fission Energy (LIFE)," Fusion Science & Technology, vol. 56, pp. 632-640, Aug. 2009.*
Abbott, et al., "Thermal and Mechanical Design Aspects of the LIFE Engine," LLNL-JRNL-408767 Nov. 2008.*
(Continued)

*Primary Examiner* — Jack W Keith
*Assistant Examiner* — Sean P Burke
(74) *Attorney, Agent, or Firm* — Kilpatrick, Townsend & Stockton LLP

(57) ABSTRACT

A laser inertial-confinement fusion-fission energy power plant is described. The fusion-fission hybrid system uses inertial confinement fusion to produce neutrons from a fusion reaction of deuterium and tritium. The fusion neutrons drive a sub-critical blanket of fissile or fertile fuel. A coolant circulated through the fuel extracts heat from the fuel that is used to generate electricity. The inertial confinement fusion reaction can be implemented using central hot spot or fast ignition fusion, and direct or indirect drive. The fusion neutrons result in ultra-deep burn-up of the fuel in the fission blanket, thus enabling the burning of nuclear waste. Fuels include depleted uranium, natural uranium, enriched uranium, spent nuclear fuel, thorium, and weapons grade plutonium. LIFE engines can meet worldwide electricity needs in a safe and sustainable manner, while drastically shrinking the highly undesirable stockpiles of depleted uranium, spent nuclear fuel and excess weapons materials.

8 Claims, 37 Drawing Sheets

(56) References Cited

U.S. PATENT DOCUMENTS

| | | |
|---|---|---|
| 4,440,714 A | 4/1984 | Rose |
| 4,663,110 A | 5/1987 | Cheng |
| 4,698,198 A | 10/1987 | Gruen |
| 5,160,696 A | 11/1992 | Bowman |
| 6,676,402 B1 | 1/2004 | Early et al. |
| 2002/0057754 A1 | 5/2002 | Stauffer et al. |
| 2005/0157832 A1 | 7/2005 | Nordberg et al. |
| 2006/0002503 A1 | 1/2006 | Ougouag et al. |
| 2006/0280217 A1 | 12/2006 | Zervas et al. |

OTHER PUBLICATIONS

Edwards et al., "Progress towards ignition on the National Ignition Facility," Physics of Plasmas 20, 070501 (2013).*

"Fuel gain exceeding unity in an intertially confined fusion implosion," Hurricane et al., doi:10.1038/nature13008 Feb. 2014.*

International Search Report for PCT application PCT/US2008/011335 (Apr. 17, 2009).

International Preliminary Report on Patentability for PCT application PCT/US2008/011335 (Apr. 7, 2010).

* cited by examiner

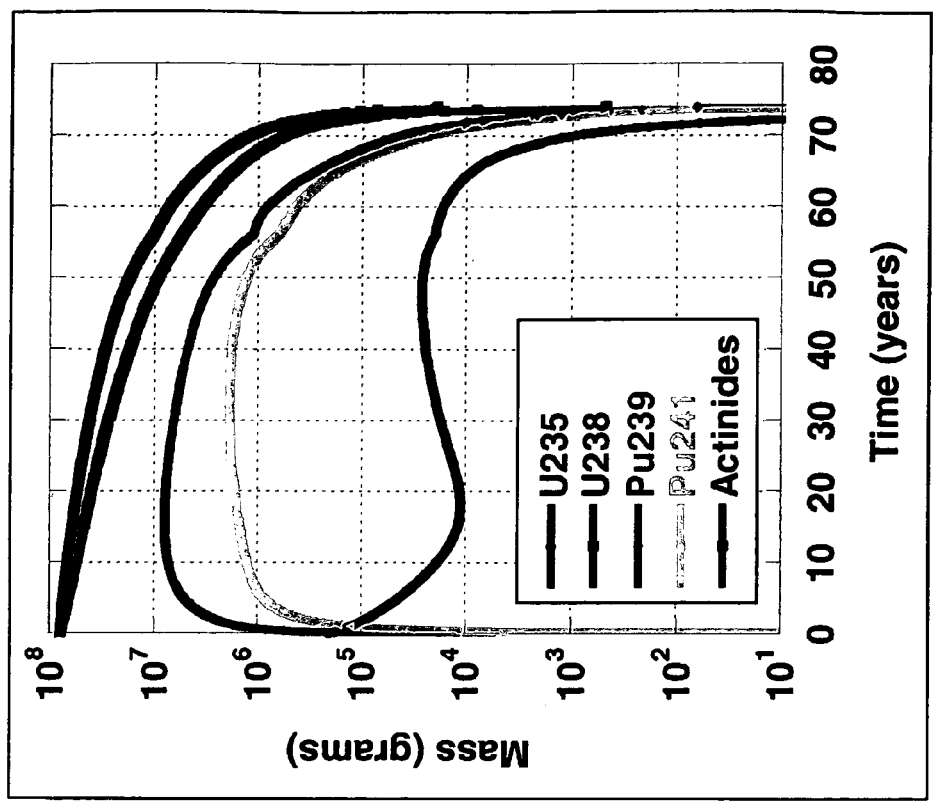
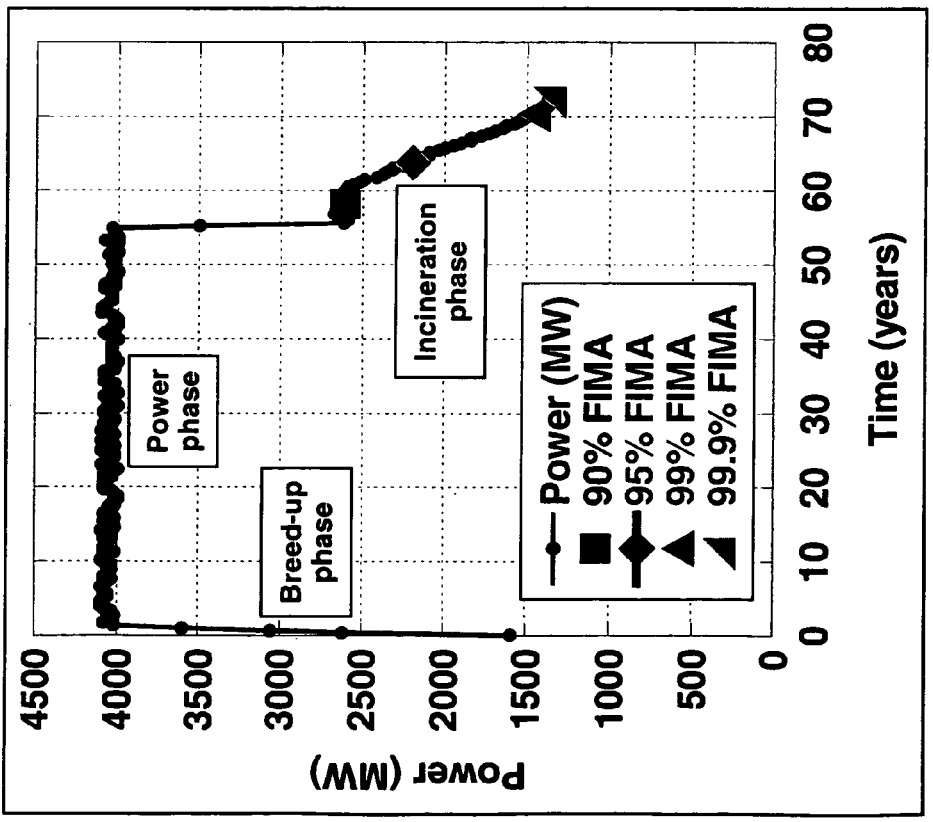
Figure 18

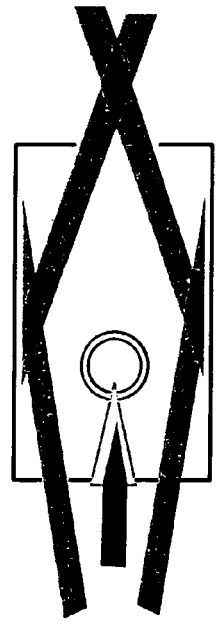
Central Hot Spot Target
Laser specifications:
Compression beams: 1.3 MJ of 0.351 µm
(48 quads @ 40 kJ)
OR
Compression beams: 2.5-3 MJ of 0.532 µm
(48 beams @ 60 kJ)
13.3 Hz operation
Fast Ignition Target
Laser specifications:
Compression beams: 500 kJ of 0.532 µm
(25 beams @ 20 kJ)
Fast ignition beams: 100 kJ of 1.064 µm
(20 beams @ 5 kJ)
13.3 Hz operation
Figure 31

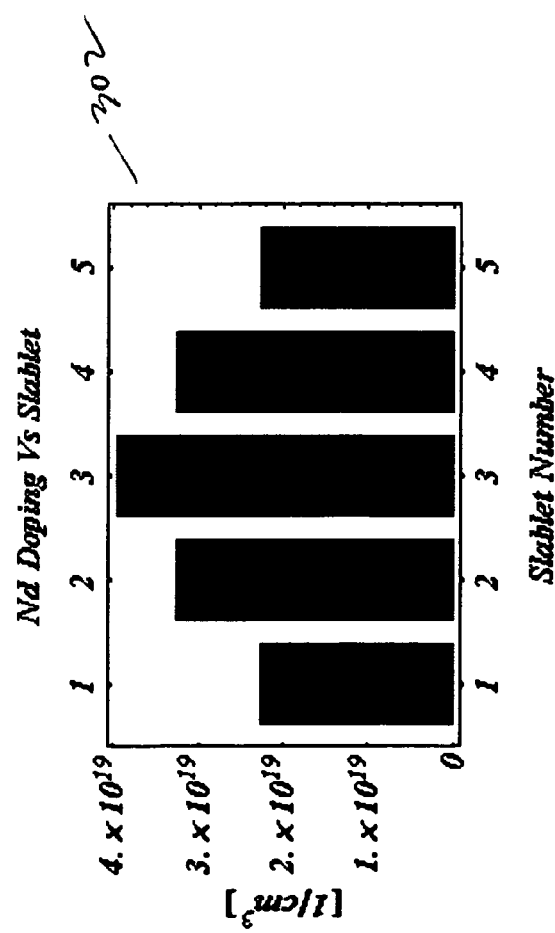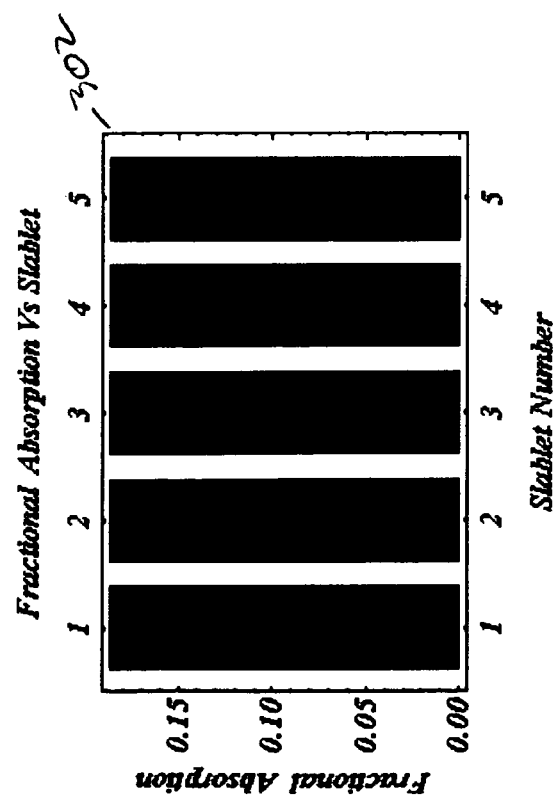
Figure 35

Frequency Converter

Transverse Electrode Pockels Cell

CONTROL OF A LASER INERTIAL CONFINEMENT FUSION-FISSION POWER PLANT

CROSS-REFERENCE TO RELATED APPLICATIONS

The present application is a National Phase Entry under 35 U.S.C. 371 of International Application No. PCT/US2008/011335, which claims benefit under 35 U.S.C. §119(e) of U.S. Provisional Patent Application No. 60/997,780, filed on October 4,2007, entitled "Hybrid Fusion-Fission Reactor," and U.S. Provisional Patent Application No. 61/130,200, filed on May 29, 2008, entitled "Hybrid Fusion-Fission Reactor Using Laser Inertial Confinement Fusion," the disclosures of which are hereby incorporated by reference in their entirety for all purposes.

Table of Contents

CROSS-REFERENCE TO RELATED APPLICATIONS
  I. Background of the Invention
  II. Summary of the Invention
  III. Brief Description of the Drawings
  IV. Detailed Description of the Preferred Embodiments
    1. Overview
    2. Plant Layout
    3. Chamber
    4. First Wall
    5. Chamber Cooling System
    6. Fission Fuel
    7. Segmented Fission-Fuel Blanket
    8. Targets
    9. Laser Architecture
    10. Conclusion

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

I. BACKGROUND OF THE INVENTION

Projections by the Energy Information Agency and current Intergovernmental Panel on Climate Change (IPCC) expect worldwide electric power demand to double from its current level of about 2 terawatts electrical power (TWe) to 4 TWe by 2030, possibly reaching 8-10 TWe by 2100. They also expect that for the next 30 to 50 years, the bulk of the demand of electricity production will be provided by fossil fuels, typically coal and natural gas. Coal supplies 41% of the world's electric energy today, and is expected to supply 45% by 2030. In addition, the most recent report from the IPCC has placed the likelihood that man-made sources of $CO_2$ emissions into the atmosphere are having a significant effect on the climate of planet earth at 90%. "Business as usual" baseline scenarios show that $CO_2$ emissions could be almost two and a half times the current level by 2050. More than ever before, new technologies and alternative sources of energy are essential to meet the increasing energy demand in both the developed and the developing worlds, while attempting to stabilize and reduce the concentration of $CO_2$ in the atmosphere and mitigate the concomitant climate change.

Nuclear energy, a non-carbon emitting energy source, has been a key component of the world's energy production since the 1950's, and accounts for about 16% of the world's electricity production, a fraction that could—in principle—be increased. Several factors, however, make its long-term sustainability difficult. These concerns include the risk of proliferation of nuclear materials and technologies resulting from the nuclear fuel cycle; the generation of long-lived radioactive nuclear waste requiring burial in deep geological repositories; the current reliance on the once through open nuclear fuel cycle; and the availability of low cost, low carbon footprint uranium ore. In the United States alone, nuclear reactors have already generated more than 55,000 metric tons (MT) of spent nuclear fuel (SNF). In the near future, the US will have enough spent nuclear fuel to fill the Yucca Mountain geological waste repository to its legislated limit of 70,000 MT.

Fusion is an attractive energy option for future power generation, with two main approaches to fusion power plants now being developed. In a first approach, Inertial Confinement Fusion (ICF) uses lasers, heavy ion beams, shock ignition, impulse ignition, pulsed power or other techniques to rapidly compress capsules containing a mixture of isotopes of hydrogen, typically, deuterium (D) and tritium (T). As the capsule radius decreases and the DT gas density and temperature increase, DT fusion reactions are initiated in a small spot in the center of the compressed capsule. These DT fusion reactions generate both alpha particles and 14.1 MeV neutrons. A fusion burn front propagates from the spot, generating significant energy gain. A second approach, Magnetic Fusion Energy (MFE) uses powerful magnetic fields to confine a DT plasma and to generate the conditions required to sustain a burning plasma and generate energy gain.

Important technology for inertial confinement fusion is being developed primarily at the National Ignition Facility (NIF) at Lawrence Livermore National Laboratory (LLNL) in Livermore, Calif. At LLNL a laser-based inertial confinement fusion project designed to achieve thermonuclear fusion ignition and burn utilizes laser energies of 1 to 1.3 MJ. Fusion yields of the order of 10 to 20 MJ are expected. Fusion yields in excess of 200 MJ could be expected to be required in central hot spot fusion geometry if fusion technology, by itself, were to be used for cost effective power generation. Thus, significant technical challenges remain to achieve an economy powered by pure inertial confinement fusion energy.

In the 1950's, Andrei Sakharov discussed the idea of fusion-fission engines in which a fusion reaction generates neutrons for a fission engine. Hans Bethe and Nikolai Basov expanded on his ideas in the 1970's and 1980's, as did many other groups around the world. The focus of some of these studies was on the use of fusion neutrons to generate fuel for fast nuclear reactors, although Basov and others discussed the possibility of using laser-driven fusion targets to drive a fission blanket for generating commercial power. Many proposals have also been made to use accelerators to generate neutrons that can then be used to transmute nuclear waste and generate electricity. Fusion-fission engines, however, did not advance beyond a conceptual stage. For example, LLNL investigated conceptual concepts for ICF-based fusion-fission hybrids in the 1970's. See, for example, "US-USSR Symposium on Fusion-Fission Reactors," Jul. 13-16, 1976, Hosted by Lawrence Livermore Laboratory. The current generation of enabling technology, including computational design tools, optical materials, diode-pumped solid state lasers, and high burn-up tristructural-isotropic (TRISO)

fuels, however, are required to move the conceptual ideas toward realization. Similarly, accelerator based schemes have not advanced significantly, in part because a complete nuclear fuel cycle—including uranium enrichment and nuclear waste reprocessing—is still required to generate economical electricity. As a result the efficiency and cost of those systems is prohibitive relative to the benefit of transmuting nuclear waste.

Typical of additional early publications speculating upon a fusion-fission hybrid are articles: *The Fusion Hybrid*, by Hans A. Bethe in Physics Today 32(5), 44 (1979), *Concept of a Coupled Blanket System for the Hybrid Fission-Fusion Reactor* by A. P. Barzilov, A. V. Gulevich, A. V. Zrodnikov, O. F. Kukharchuk, V. B. Polevoy, Institute for Physics & Power Engineering, 1, Bondarenko Sq., Obninsk, Russia 249020 in Proc. Intern. Conf. SOFE'95, 1995, and the article, *Hybrid Fission-Fusion Reactor Initiated by a Laser*, by A. P. Barzilov, A. V. Gulevich, O. F. Kukharchuk and A. V. Zrodnikov, Institute of Physics & Power Engineering, Obninsk 249020 RUSSIA, Technical Physics Laboratory, Copyright©1997-2000, (http://www.ippe.obninksuipodr/tpl/pub/html/1/ref1a.html).

II. SUMMARY OF THE INVENTION

We have examined a scenario where Laser Inertial-confinement Fusion-fission Energy, (often referred to herein as LIFE) power plants would be introduced into the U.S. economy before 2030. At present the U.S. supply of depleted uranium (DU) is approximately 550,000 tons. If burned in LIFE engines as described herein, this would generate approximately 550 TWe-yrs of power. If estimates that the total U.S. electricity demand could reach about 2 TWe by 2100 are accurate, the current stockpile of DU alone could supply the total U.S. electric demand for nearly 300 years. In addition, a significant advantage afforded by the combination of fusion and fission is that a LIFE engine can burn existing and future inventories of spent nuclear fuel (SNF) from light water reactors (LWRs). At present, in the U.S. alone, the current inventory of SNF in temporary storage at reactor sites is roughly 55,000 MT.

In this scenario, we assumed that no light water reactors (LWRs) or advanced LWRs would be built after 2035, and that the last LWR would be shut down in 2095 after reaching its 60 year lifetime. We assumed that starting in 2030, LIFE plants could be built at a rate of 5 to 10 per year, and could then begin burning un-reprocessed SNF. By that time, the accumulated SNF in the U.S. alone would total about 110,000 MT, and would have grown to about 190,000 MT at the time the last LWR goes off line in 2095. The depleted uranium (DU) would have grown to about 1,500,000 MT.

With LIFE technology, the SNF destined for Yucca Mountain would become a tremendous energy resource. Waste streams (DU, SNF) from existing nuclear facilities could provide fuel for LIFE for more than a thousand years. Existing SNF from LWRs can supply 75 TWe-yrs, which is predicted to be the entire U.S. electricity demand from now through 2100. The accumulated SNF through the end of the century can provide U.S. electricity needs beyond 2100 (2 to 2.5 TWe) for another hundred years. The DU could supply over 2 TWe for an additional thousand years. LIFE will prolong the service life of the U.S. geological repository, and will require only 7% of the repository capacity per unit electricity generated as a comparable LWR fleet, assuming a once-through fuel cycle. This estimate assumes the current statutory limit for Yucca Mountain of 70,000 metric tons heavy metal (MTHM), with 90% of that limit being commercial SNF.

The 1,500,000 MT of depleted uranium accumulated from the uranium enrichment process required to power LWRs through the end of the century subsequently would provide more than 1500 TWe-years of electricity if burned in LIFE engines. In short, LIFE could supply U.S. electricity needs for more than 1,000 years by burning the two waste streams (DU and SNF) generated by the operations of the past, current, and future LWRs, as well as other type fission energy power plants.

In addition to the U.S. scenarios described above, LIFE technology offers an attractive pathway for the expansion of nuclear power around the world. Proliferation concerns are mitigated compared to other nuclear technologies, and nuclear fuel for LIFE engines is inexpensive and widely available. Moreover, because LIFE employs a self-contained closed fuel cycle, and it burns its fuel to the point where the actinide content of the spent fuel is less than 1% of its original content, nuclear waste repository considerations are simplified, particularly for countries not willing to build such underground repositories.

III. BRIEF DESCRIPTION OF THE DRAWINGS

FIG. 1 illustrates an exemplary LIFE power plant;
FIG. 2 is a more detailed view of the LIFE engine itself;
FIG. 3 illustrates a fast ignition fusion chamber;
FIG. 4 illustrates the chamber cross-sectional structure;
FIG. 5 illustrates an alternate chamber for central hot spot fusion;
FIG. 6 is a diagram illustrating the chamber cooling system;
FIG. 7 is a diagram illustrating the coolant system at a higher level of abstraction;
FIG. 8 is a diagram of the helium Brayton power cycle;
FIG. 9 illustrates a passive safety system;
FIG. 10 is a diagram illustrating the mechanical structure of the coolant and passive safety systems;
FIG. 11 is a further diagram of the passive safety system;
FIG. 12 illustrates a special TRISO fuel structure;
FIG. 13 illustrates a spherical fuel with porous carbon core;
FIG. 14 is a phase diagram of molten salt-based liquid fuel;
FIG. 15 illustrates tuning of fuel burn up and is a schematic drawing of a segmented fuel blanket;
FIG. 16 illustrates the thermal power produced by a LIFE engine over time and illustrates the advantages of using $^6$Li to control the system thermal power;
FIG. 17 illustrates the thermal neutron spectrum in LIFE engine fuel;
FIG. 18 includes typical LIFE engine power and mass curves;
FIG. 19 illustrates control by adjusting the tritium breeding ratio;
FIG. 20 illustrates the system criticality with and without $^6$Li control;
FIG. 21 illustrates power flow for a depleted uranium fuel blanket;
FIG. 22 illustrates a fusion capsule;
FIG. 23 illustrates a hohlraum capsule assembly;
FIG. 24 illustrates heating of the hohlraum via laser deposition;
FIG. 25 illustrates compression of the fuel core;
FIG. 26 illustrates a fast ignition capsule structure;
FIG. 27 illustrates a fast ignition capsule/hohlraum assembly;

FIG. 28 illustrates the fast ignition process;
FIG. 29 illustrates manufacture of fast ignition targets;
FIG. 30 illustrates geometry of a fast ignition hohlraum;
FIG. 31 describes laser specifications for fast ignition and central hot spot ignition;
FIG. 32 is a diagram illustrating laser architecture;
FIG. 33 illustrates a booster amplifier and a cavity amplifier;
FIG. 34 illustrates VCSEL diodes fabricated as an integrated assembly;
FIG. 35 illustrates neodymium doping of slablets;
FIG. 36 illustrates the transverse electrode Pockels cell;
FIG. 37 illustrates the frequency converter; and
FIG. 38 illustrates the overall laser system and techniques for diagnosing and monitoring the beams.

IV. DETAILED DESCRIPTION OF THE PREFERRED EMBODIMENTS

1. Overview

The capability of lasers to create conditions required for inertial confinement fusion is expected to be demonstrated at NIF in about 2010. Ignition and modest target gain are expected. The fusion yield to laser energy ratio is expected to be about 10, resulting in fusion energy yields of 10 to 15 MJ. The first experiments to demonstrate ignition and gain will use 350 nm laser light with a central hot spot (CHS) ignition geometry and laser energy of 1-1.3 MJ. Although NIF ignition and burn experiments are expected to be successful, fusion yields in excess of 200 MJ likely would be required for a CHS geometry if the technology were to be used for efficient, cost effective power generation solely from fusion.

To mitigate the challenges of nuclear energy and advance the time scale of the usefulness of fusion sources, a fusion-fission engine combines aspects of nuclear fusion and fission. Our approach surrounds a relatively modest inertial confinement fusion neutron source with a spherical subcritical fission fuel blanket. In a LIFE engine, the point source of fusion neutrons acts as a catalyst to drive the fission blanket, which obviates the need for a critical assembly to sustain the fission chain reaction. Starting from as little as 300 to 500 megawatts of fusion power (MWf), a single LIFE engine can generate 2000 to 3000 megawatts of thermal power (MWt) in steady state for periods of years to decades, depending on the fuel and engine configuration. Because neutrons are provided by the fusion targets, the fission blanket in a fusion-fission system is subcritical. This enables the LIFE engine to burn any fertile or fissile nuclear material, including un-enriched, natural or depleted uranium and SNF, and to extract virtually 100% of the energy content of its fuel. This results in greatly enhanced energy generation per metric ton of nuclear fuel, and enormously reduces the amount of nuclear waste. Even the resulting waste has vastly reduced concentrations of long-lived actinides. LIFE engines thus can provide vast amounts of electricity while greatly reducing the actinide content of existing and future nuclear waste, thereby extending the availability of low cost nuclear fuels for thousands of years. LIFE also provides a pathway for burning excess weapons grade plutonium (Pu) to over 99% Fraction of Initial Metal Atoms (FIMA) without need for fabricating or reprocessing mixed oxide fuels. Because of all of these advantages, LIFE engines offer a pathway toward sustainable and safe nuclear power that significantly mitigates nuclear proliferation concerns, and minimizes nuclear waste.

The system described herein is a fusion-fission hybrid system, in which inertial confinement fusion is used to produce 14 million electron volt (MeV) neutrons from a fusion reaction of deuterium and tritium. The neutrons in turn drive a subcritical blanket of fissile or fertile fuel. The inertial confinement fusion reaction can be implemented using various mechanisms. In our initial approach we use central hot spot fusion initiated using indirect drive. Indirect drive uses energy from lasers to heat a hohlraum which contains a pellet of fusion fuel (deuterium and tritium). The hohlraum emits x-rays which compress and heat the fuel, causing fusion ignition and burn, as described in more detail below. In alternate approaches direct drive (no hohlraum), or fast ignition (separate compression and ignition lasers) may also be used.

The LIFE engine produces electrical power without uranium enrichment and burns nuclear waste without need for chemical separation of weapons attractive actinide streams. The point-source of high-energy neutrons produced by laser-generated, thermonuclear fusion is used to achieve ultra-deep burn-up of the fissile or fertile fuel in a sub-critical fission blanket. Fertile fuels which may be employed include depleted uranium (DU), natural uranium (NatU), spent nuclear fuel (SNF), and thorium (Th). Fissile fuels such as low-enrichment uranium (LEU), excess weapons plutonium (WG-Pu), and highly-enriched uranium (HEU) may be used as well. As a consequence, LIFE engines can meet worldwide electricity needs in a safe and sustainable manner, while drastically shrinking the nation's and the world's stockpiles of depleted uranium, spent nuclear fuel and excess weapons materials.

In LIFE the laser system generates fusion yields of 20 to 50 MJ at 10 to 20 Hertz (i.e. $\approx 10^{20}$ n/s), and fusion powers of 200 to 1000 megawatts. The fusion reaction, when coupled with a subcritical fission blanket, generates several gigawatts of power without carbon dioxide emissions, while mitigating nuclear proliferation concerns and minimizing nuclear safety concerns by long term nuclear waste disposition. The fusion-fission energy engine (1) eliminates the need for uranium enrichment; (2) utilizes over 90% of the energy content of the nuclear fuel; (3) eliminates the need for spent fuel chemical separation and reprocessing facilities; (4) maintains the fission blanket subcritical at all times ($k_{eff} < 0.90$); (5) minimizes future requirements for deep underground geological waste repositories; and (6) minimizes actinide content in the end of life nuclear waste below the U.S. Department of Energy attractiveness level E (the lowest). The fission blanket can comprise natural or depleted U, Th, U/Th mixtures, spent nuclear fuel without chemical separations of weapons-attractive actinide streams, and excess weapons grade Pu or highly enriched uranium. The fission blanket is designed to always remain subcritical, enabling heat removal via passive mechanisms, thereby making the technology inherently safe. In addition to laser inertial confinement fusion, other neutron sources can also be used to drive the sub-critical fission blanket. For example, heavy ion beam accelerators can be used. Specific combinations, described below, of operating conditions, including laser power, target yield, neutron multiplication, fission fuel thermal power, overall system efficiency, and engine dimensions enable a practical system to be realized. LIFE engines can also be configured to use their process heat to produce hydrogen for transportation needs, to desalinize seawater, or to power material and other manufacturing processes.

A significant advantage of the approach described herein is that fuel production, power generation, and waste incineration are performed in a single system. Thus without enrichment or reprocessing, power is provided with substantially reduced waste and reduced proliferation concerns.

2. Plant Layout

FIGS. 1 and 2 illustrate the LIFE engine when implemented in a fast ignition configuration, that is, a configuration in which fast ignition is used to create the fusion reaction to drive the engine. (An alternate embodiment is depicted in FIG. 5 which illustrates the LIFE chamber configured in a manner to support central hot spot ignition for the fusion process.)

An exemplary LIFE power plant 10 is depicted in FIG. 1. The LIFE power plant 10 preferably comprises a 10 to 20 Hz, diode-pumped solid state laser (DPSSL) bank 12 for initiating a fusion reaction on targets within a fusion-fission target chamber 15 surrounded by both a neutron multiplication blanket and a sub-critical fission blanket. The plant 10 includes a fusion target factory 16 for producing the targets for the lasers, and the balance of the plant 18, e.g. heat exchangers, control rooms, steam turbine generators, a spare chamber, etc. The components of a LIFE plant are explained in more detail below.

FIG. 2 is a more detailed view of the LIFE engine itself. The LIFE engine design shown in FIG. 2 utilizes the Fast Ignition (FI) approach to IFE and is based on a 500 to 600 kJ, 2ω compression laser 20 and a 75-150 kJ, 10 ps, 1ω petawatt-class ignition laser 22, operating in an indirect drive configuration. Fast ignition compresses DT to higher densities and more moderate temperatures compared with those required for CHS ignition. After compression of the fuel, an ultra-short (~10 ps) laser pulse ignites the fuel. Decoupling the compression and ignition processes relaxes many of the geometric constraints on compression, and in particular, reduces the overall energy required for a given target gain. A comparison of calculated fusion yields as a function of laser energy for CHS and FI shows that FI offers significantly higher fusion gain for the same laser energy. In addition, indirect drive FI targets enable low solid-angle, less than about 20 degree half-angle, two-sided illumination. This reduces the complexity of the optical system and the chamber, while reducing the size of the chamber building 25. Note in this configuration heat exchangers 26 and a spare chamber 27 are nearby.

For the laser energies and indirect drive fast ignition approach discussed above, the LIFE engine operates with fusion energy gain of the order of 40-50 and fusion yield of 25 to 50 MJ. Such an approach to fusion generates approximately $10^{19}$ 14.1 MeV neutrons per shot, which for a 10 Hz system translates into about $10^{20}$ neutrons per second. Operating at a preferred 13 Hz, the LIFE engine consumes about 1.1 million targets per day. When utilized to drive a subcritical fission blanket, additional energy gains of 4 to 8, for a total system energy gain of 160 to 400 can be achieved, leading to the generation of thousands of megawatts of power. For a laser driver efficiency, $\eta$, of 10% and a total system energy gain, G, of 300 (corresponding, for example, to a fusion gain of 50 and a fission gain of 6), a LIFE engine would have an efficiency figure-of-merit of $\eta G=30$. The recirculating power required to run the laser and associated power systems is then about $f=2/(\eta G)$, which is only about 7%. Such a system is efficient in the net electrical power output of the system, $P_e=(1-f)P_{out}$ where $P_{out}=P_{laser}G\eta_e$, $P_{laser}$ is the input power of the laser and $\eta_e$ is the electrical power conversion efficiency of the power plant. For a modest input laser power $P_{laser}=10$ MW, G=300. With $\eta_e=45\%$ and $f=6.7\%$, $P_{out}=1350$ MW, making the net power output of the engine $P_e=1250$ MW$_e$.

3. Chamber

FIG. 3 illustrates the fast ignition fusion chamber 30, showing the laser compression beams 32, the ignition beams 33, the fusion target 31 and the fission blanket 35 surrounding the chamber. The spherical chamber configuration enables uniform irradiation of the fission fuel 35, and uniform radiation damage to the chamber walls 34 before replacement, thereby maximizing material utilization. Preferably, oxide dispersion strengthened ferritic steels are used for construction of the spherical engine chamber, with a solid first wall consisting of tungsten or tungsten-carbide armor. Such steel is less sensitive to displacement from lattice sites by neutron bombardment. The chamber includes a layer of beryllium or lead as a neutron moderator and multiplier. (The chamber wall structure is described in detail below.) A radial flow high-temperature lithium-containing coolant system, for example, using flibe (2LiF+BeF$_2$) or flinak (LiF+NaF+KF), includes multiple entrance ports 36, 37 and others not shown, and exit port 38. The coolant removes heat from the fission blanket of the engine and transports the heat to a Brayton energy conversion system. The cooling system is described in more detail below. A high-rate fusion target fabrication and injection system, with target tracking and laser firing, and with recycling of hohlraum materials, introduces targets into the chamber as desired. This is also discussed further below.

FIG. 4 illustrates the chamber cross-sectional structure in greater detail. The fusion-fission chamber is the heart of the LIFE engine. The high-energy neutrons generated by the deuterium tritium fusion targets first pass through the mostly empty central portion 1 of the chamber. The target chamber and laser beam path are filled with xenon gas or another noble gas 1 at an atomic density of approximately $1\times10^{16}$ cm$^{-3}$ to $3\times10^{16}$ cm$^{-3}$. This gas absorbs a significant portion of the x-ray energy and prevents essentially all ions emitted from the targets from reaching the inner wall of the chamber. The hot gas cools via radiation on a timescale sufficiently long to prevent damage to the tungsten coated first wall. Using the chamber gas essentially turns a nanosecond burst of x-rays into a millsecond burst of heat, which can be accommodated via thermal conduction in the tungsten. The gas density is low enough to allow for propagation of the laser beams to the target.

The neutrons then encounter a structural steel wall 40 approximately 0.3 cm thick, which is a low-activation, nano-structured Oxide Dispersion Strengthened (ODS) ferritic steel. The ODS ferritic steel is coated with 250-500 μm of tungsten or other suitable material, which withstands the high temperatures resulting from absorption of x-rays emitted from the targets, and is resistant to damage by fusion neutron irradiation. This inner wall provides a structural component, and vacuum barrier to separate the materials behind the wall from the interior of the chamber within which an essential vacuum is maintained.

Immediately behind the first wall 40 a lithium-lead solution 2 flows through about a 3 cm thick region. This solution is preferably about 17% lithium and 83% lead. The lithium-lead cools the first wall 40. Another ODS ferritic steel wall 41 about 0.3 cm thick contains the lithium-lead, separating it from further materials.

The neutrons then pass through an injection plenum 3, also about 3 cm thick, which serves as a plenum for radial distribution of flibe coolant through a porous ODS ferritic steel wall 42, for example, a wall formed of mesh or other minimal structure. After passing through the first wall, the fusion neutrons then enter a beryllium (or lead) layer 4. $^9$Be(n,2n)$^8$Be reactions moderate the neutron energy and generate of the order of two neutrons for every one absorbed. The beryllium layer preferably consists of an about 16 cm thick layer of Be pebbles mixed with flibe coolant, enabling the pebbles to flow around the chamber for removal, automated inspection and replacement as necessary. A further 0.3 cm ODS steel wall 43 confines the beryllium pebbles.

The neutrons, moderated and multiplied, then strike the next layer, an 85-cm thick subcritical fertile or fission blanket 5 designed to remain subcritical, e.g. $k_{eff}$<0.9, at all times. Thicker or thinner blankets may be used, as well as numerous types of fuels. In one implementation, the fission blanket comprises TRISO fuel pebbles, solid hollow core fuel pebbles, or liquid fuel, each of which is described further below. The fuel circulates through the engine, assuring desired exposure of the pebbles or liquid fuel to the fusion neutron flux from the targets. Heat from the fuel is the source of energy from the engine.

A further porous ODS ferritic steel wall 44 is backed by a graphite reflector layer 6 which is about 75-cm thick. The graphite minimizes neutron escape from the engine and is backed by another ODS ferritic steel layer 45. Alternatively, the graphite reflector may comprise one or more layers of graphite pebbles circulating behind the fuel, then backed by a solid graphite layer. If some of the carbon pebbles are mixed with the fuel pebble region, they can be used to control the fuel-to-moderator ratio. By placing a small amount of high density material in the center of the carbon pebbles, the pebble density can be matched, and the carbon pebbles are caused to behave essentially identically with the fuel pebbles.

Behind the graphite reflector 6 a flibe extraction plenum 7 about 5-cm thick allows for the removal of the higher temperature flibe. The heat from the flibe is extracted and used to generate electrical power, e.g. using a steam turbine or other conventional approach, as will be described below. Beyond the extraction plenum 7 is a further ODS ferritic steel wall 46, about 1-cm thick to provide the final structural component and vacuum barrier. If additional neutron shielding is desired, the outer shell can be fabricated from other materials, or a further shell 9 added to the structure. The outer shell, for example, can comprise high-boron high-gadolinium or similar material. Iron-based amorphous metal coatings are generally insensitive to displacement from lattice sites otherwise caused by neutron bombardment.

The flibe coolant or the actual liquid fuel extracts heat from the engine which is then used to produce electrical power using any known technique. In addition, the neutrons convert some of the lithium in the flibe to tritium. That tritium can be collected and used to replace the tritium burned in the fusion targets, making the LIFE engine self sufficient in tritium. Tritium has low solubility in flibe and precipitates out as $T_2$ gas. This gas can then be flowed across a bed of appropriate metal to which the tritium attaches. Different metals may be used for different length storage of the tritium. For example, uranium provides a relatively short term storage, while titanium can be used for longer term storage. The high volumetric heat capacity of liquid salts, such as the flibe, allows the fission blanket to be compact and have high power density when coupled to the point source of fusion neutrons. Circulation of the flibe results in flibe input temperature of about 610° C. and an exit temperature of about 640° C. If TRISO fuel is used, the temperature spike in the TRISO fuel pellets that result from the pulse of neutrons entering the fission blanket multiple times per second is approximately 20-40° C.

Of course materials other than flibe can also be used, e.g. liquid metals such as lithium alloys.

In an alternate embodiment, the chamber structure dispenses with the layer of lithium-lead shown in FIG. 4. In this embodiment the flibe injection plenum is placed immediately behind the tungsten-coated ODS first wall. In other embodiments one or the other of the lithium-lead layer or the beryllium pebble layer are omitted.

The chamber thus far discussed herein has been a chamber for fast ignition fusion reactions. An alternate chamber embodiment for central hot spot fusion is depicted in FIG. 5. The chamber structure itself as shown in FIG. 5 is similar to that described in conjunction with FIG. 4. As shown by FIG. 5, however, rather than have the laser beams entering the chamber from essentially two opposite sides of the chamber as was depicted in FIG. 1, the laser beams enter the chamber much more uniformly. In FIG. 5 ports 51 are disposed about the entire surface of the spherical chamber enabling laser beams to be focused on the target in the center of the chamber from essentially all directions. In the illustration of FIG. 5, 24 of the 48 beam ports are shown, and each port is capable of receiving multiple beams. (The other 24 would be in the portion of the chamber cut-away from the illustration.) In this implementation the fusion yield is expected to be about 37.5 MJ with a target rate of about 13 Hz. The chamber has an inner radius of 2.5 meters (m). About 40 metric tons (MT) of depleted uranium fuel in the form of TRISO pebbles is used to produce 2 GW of thermal power and a net of 750 MW electric power with a helium Brayton power cycle. FIG. 5 also illustrates the lithium-lead flow path with inlet port 52 and exit port 53.

4. First Wall

As mentioned above, in one implementation, the first wall of the chamber comprises about 500 microns of tungsten coated onto oxide-dispersion strengthened ferritic steel. Alternatively vanadium or molybdenum coatings may be used. Tungsten has been studied at much higher thermal loads than are produced in the chamber, and even a million high temperature pulses of about 1800° K., although creating cracks which relieve stress, did not propagate to the substrate. This provides protection to the underlying ferritic steel. The tungsten can be applied to the walls using various techniques, for example, a high velocity oxy fuel thermal spray process (HVOF). Of course other materials, such as tungsten carbide can be used, and materials can be applied to the wall using plasma vapor deposition, explosive bonding, or other approaches.

The x-rays, ions, and neutrons from the fusion reaction provide a hazardous environment for the first wall. By introducing relatively low amounts of xenon, argon or other inert gas, however, x-rays from the fusion are attenuated, and the ions are substantially precluded from reaching the first wall. The result is that essentially only neutrons pass through the first wall into the fuel layer. While this makes it desirable to include xenon in the chamber, the ultimate gas density is limited by the laser beams used for the fusion reaction. The beams ionize the xenon to $Xe^{+10}$. For fast ignition the target yield is about 25 MJ, of which 19 MJ is in neutrons, 3 MJ in x-rays, and 3 MJ in ions. The density of the chamber fill gas is set to be high enough to stop debris from reaching the first wall which is about 2.5 m from the center point. An Ar density of $3.8 \times 10^{22}$ m$^{-3}$ is sufficient to stop the most energetic ions, yet allows the laser beams to propagate to the target. This gas density also stops more than 90% of the x-rays.

While this protection scheme is effective in protecting the first wall, the gas/debris remaining in the chamber after a fusion of a target creates a need for chamber clearing. In particular, lead or other materials from the hohlraums will collect on the chamber walls, but due to the high temperature remain molten and flow to the bottom of the chamber. There, the molten lead drains away where it can be collected and allowed to solidify into ingots or other desired shape, for reprocessing by the target factory.

The energy absorbed in the gas creates a high temperature (10's of eV) fireball that radiates to the chamber wall over 100 μs as it cools to 5000-10,000° K. This is much longer than the burn time (10's of ps), so the peak heat pulse on the wall is greatly reduced. The hot gas pressurizes the chamber, and gas blows out the beam ports. By maintaining the region outside the chamber at a low enough pressure relative to the chamber interior, choked flow conditions are created, providing a high exhaust rate. Additional protection in the form of a cryogenic gas layer can be added to the exterior walls of the hohlraum containing the fusion target, as needed. (The target structure is described below.) Even with up to 11 g of additional Ar, the chamber returns to pre-shot Ar density in less than 50 ms, as required for 20 Hz operation.

A wide variety of high-performance first-wall composite materials can exploit the high melting point and low vapor pressure of a broad range of known compounds. Similarly, a wide variety of high-performance inert-matrix materials can be exploited to fabricate high performance fuel elements. For example, these compounds fall into several broad classes, including carbides, nitrides, oxides, intermetallics and silicides. Some of these materials are: (1) Carbides such as (Ta,Cr,Zr)C, HfC, Tac, ZrC, NbC, $Ta_2C$, TiC, SiC, VC, $W_2C$, MoC, $ThC_2$, WC, $B_4C$, $Al_4C_3$, and $Te_3C$; (2) nitrides such as HfN, TaN, BaN, ZrN, TiN, UN, ThN, AlN, Be3N, NbN, VN; (3) borides such as HfB, $TaB_2$, $ZrB_2$, $NbB_2$, $TiB_2$, $Ta_3B_4$, $VB_2$, TaB, WB, $W_2B_5$, TiB, MoB, $CrB_2$, $MoB_2$, CrB, $Ta_3B_2$, TiB, and $Mo_2B$; (4) intermetallics such as $Re_5W_2$, MoW, CrAl, $Mo_3Al$, $UBe_2$, $Zr_5Sn_3$, $Cr_3Ta$, and NiAl; and (5) silicides such as $Ta_3Si$, $TaSi_2$, $W_5Si_3$, $Zr_2Si$, $WSi_2$, ZrSi, $V_3Si$, $Mo_3Si$, $Mo_4Si$, and $MoSi_2$. These materials may be used in place of the ODS ferritic steel or other structural portions of the engine.

5. Chamber Cooling System

FIG. 6 is a diagram illustrating the chamber cooling system. As shown there, the flibe is injected through about 24 large ports 50 arrayed periodically about the substantially spherical chamber. This number of ports is used to assure an isotropic cooling flow field, low passive flow impedance, and to avoid erosion via maximum flibe injection speeds of less than 5 m/s. The coolant flows into the flibe injection plenum (see FIG. 4) to be distributed about the surface of the spherical chamber. While the inner wall 41 of the plenum is solid, the outer wall 42 of the plenum is porous and allows the flibe to flow out through the beryllium pebbles, another porous wall, and through the fuel particles (pebbles or spheres). The flibe assumes a convoluted path as shown in the insert of FIG. 6 as it flows through the agglomeration of fuel particles, removing heat, and eventually reaching the outer porous wall. It then flows into the extraction plenum. As shown by FIG. 6, the extraction plenum is coupled to a coolant outlet port 38 from which the now-heated coolant can be removed. The radial flow of the flibe provides cooling for the beryllium and the fuel particles as the flibe carries the heat from the engine to heat exchangers, as discussed below.

The inlet port 52 and the outlet port 53 for the Li—Pb first wall coolant are also shown in FIG. 6. The Li—Pb coolant is forced across the first wall to remove heat from the re-radiated ion and x-ray power that was deposited. The Li—Pb enters at a temperature of about 260° C., a velocity of about 4.5 m/s, and a mass flow rate of about 4 MT/s. By the midpoint of its flow, i.e., halfway to the outlet port 53, the Li—Pb will reach a temperature of about 355° C. and a velocity of 1 m/s. As it reaches the outlet port, the flow area is reduced, so it again reaches a velocity of about 4.5 m/s. The coolant will be much hotter, about 450° C., removing about 30 kW/m²/K.

Connections 55 for recirculation of the fuel are also shown. Because the fuel is heavier than the flibe coolant, the fuel flow is from top to bottom in the illustration of FIG. 6. Connections 57 provide for recirculation of the beryllium pebbles and connections 58 for recirculation of the graphite pebbles. The beryllium pebbles float in the flibe, and thus flow from bottom to top in the illustration. As also shown by FIG. 6, the flibe assures that the maximum pebble surface temperature will be about 700° C. with a temperature spread between 610° C. and 640° C. between the inlet and outlet coolant ports.

FIG. 7 is a diagram illustrating the overall cooling system for the LIFE engine at a higher level of abstraction. As shown there, the LIFE chamber 15 is coupled to a primary flibe or flinak coolant loop 70. The chamber portion of the primary coolant loop 70 was discussed in conjunction with FIG. 6. The loop 70 minimizes the inventory required of beryllium-laden molten salts, effectively cools the fission fuel, and imparts minimal mechanical loads to the chamber structure. The primary coolant loop 70 is coupled through heat exchangers 71 to a secondary coolant loop 72, preferably employing flinak. This coolant loop 72 is coupled through heat exchangers 73 to a helium Brayton power loop 74. This is the loop used to generate electrical power by passing the heated helium through a gas turbine, to produce electricity. The secondary coolant loop 72 minimizes the required inventory of flibe and isolates the helium power loop 74 from tritium which is present in the primary coolant loop 70.

The primary coolant has a minimum/maximum temperatures of about 610° C. and 640° C. The secondary coolant has minimum/maximum temperatures of about 595° C. and 625° C. The turbine inlet and outlet temperatures will be about 610° C. and 435° C. Helium pressure is about 10 MPa. With three primary cooling units, three to six turbines can be driven, producing thermal power of 2×860 MW. It is expected that subsequent designs, that is, improved versions of the LIFE engine and cooling system, can result in higher minimum and maximum coolant temperatures, higher peak fuel surface temperatures, higher peak fuel center point temperatures, reduced pressure drops, and lower coolant flow rate, thereby resulting in higher efficiencies.

FIG. 8 is a diagram of the helium Brayton power cycle illustrating a salt-to-helium heat exchanger 73. Note that the molten flinak salt flows in through coolant loop 80, passes through multiple helium/salt heat exchangers 82, 83, thereby transferring heat from the salt to helium as shown by the numerous smaller arrows 85. The helium itself is injected through port 88, and after being heated flows out through port 89.

The cooling system discussed above includes passive safety features, assuring reliable safe operation of the overall LIFE engine. This passive safety system is illustrated in schematic form in FIG. 9. In essence, in a loss of coolant flow accident, the fuel will be cooled in situ using natural circulation. As shown by FIG. 9, a one-way valve—a fluidic diode 90—isolates the flow loop during normal (active) cooling. The primary loop 70 and the secondary coolant loop 72 in FIG. 9, correspond to the designations in FIG. 7. The primary loop includes the engine fission blanket, through which the heated flibe is circulated. Situated approximately 10 meters above the engine blanket is the flibe/flinak heat exchanger 71. The hot flibe emerging from the engine passes through this heat exchanger 71 and then through the fluidic diode 90 back to the engine, as discussed in conjunction with FIG. 7, and shown in FIG. 9. The combination of the diode and the position of the heat exchanger above the engine blanket allow the hot flibe to rise in the system as the cool flibe returns to the bottom of the engine blanket. This natural circulation continues even if the flibe pumps fail. Meanwhile, in the secondary coolant loop 72, the flinak circulation similarly continues naturally as the hot flinak passes through the heat exchanger 75 where it is cooled and returns back to the primary heat exchanger 71, also by convection in the event of a pump failure. In the event of a helium failure, air can be circulated through the heat exchanger 75 to cool the flinak.

FIG. 10 is a diagram illustrating the mechanical structure for the coolant system. As shown there the chamber 15 is situated in the center of the figure with the compression beam lines 20 and ignition beam lines 22 depicted. Four primary heat exchangers 71 are shown, together with a coolant injection manifold 72 which accepts cooled flibe from the primary heat exchangers 71 and returns it back into the fusion chamber 15 for circulation through the chamber walls as discussed above. A similar injection manifold on the backside of the chamber 15 is not shown.

As mentioned above, if solid fuel is used, the fuel pebbles circulate through the spherical target chamber for desired exposure to the fusion neutron flux. The fuel pebble injection line 101 is shown, as is the extraction line 102. Because the fuel pebbles circulate through the system, in the event of a failure, a pebble dump tank 104 is provided below the chamber. The drop tank coolant is maintained in a molten condition via a heat exchange with the primary coolant loop, as depicted using circulation path 105. An air-to-flinak loop 106 provides tritium isolation, while removing any fission decay heat to the dump tank loop 105.

Because of the continued presence of fission energy in the blanket, for example, a decay heat in the blanket of 7% for a 3000 MW engine, a passive safety system is implemented. This is further shown by FIG. 11. In a loss of coolant failure, the increasing fuel temperature, for example by the dissolution of a melt plug, initiates a pebble drop to the passive cooling tank 104 through the pebble chute 111. Chute 111 connects to the bottom of the fission fuel blanket in the LIFE chamber. Dropping the pebbles from the spherical target chamber into the dump tank, where they surround a collection of cooling pipes 116, also with natural convective flow from cooler at the bottom 113 to warmer at the top 114 allows the pebbles to be cooled as they are removed by the pebble extraction line 112 to an external location. The decay heat from the pebbles is conducted through the walls of the cooling pipes and heats a molten salt. The hot molten salt becomes buoyant, and a passive flow, capable of removing the decay heat, is established.

6. Fission Fuel

The fission fuel used in the engine may take any of multiple formats. Three different forms are discussed below. One form, shown in FIG. 12 is approximately 2-cm diameter pebbles containing 2-mm diameter tristructural-isotropic (TRISO) fuel pellets embedded in a graphite or similar inert matrix. A second form, shown in FIG. 13, is referred to as a solid hollow core sphere with a porous carbon core and sacrificial silicon carbide. Alternatively, a liquid molten-salt based fuel with $UF_4$ or $ThF_4$ dissolved therein may be used. Each of these fuel formats is described next.

In FIG. 12, a fuel pebble 126 is shown on the left side of the figure, and the contents of the pebble—a large number of TRISO fuel particles, are shown in more detail on the right side of the figure. As shown on the right side of FIG. 12, a TRISO fuel particle is a type of micro fuel particle. It consists of a fuel kernel composed of UOC 120 in the center, coated with multiple layers of isotropic materials. The layers consist of a porous carbon buffer layer 121, an inner high-density pyrolytic carbon (PyC) 122, a silicon carbide shell 123, an outer low-density PyC layer 124, and a protective layer of PyC 125. The porous carbon layer 121 attenuates fission recoils and reacts with the gaseous fission products to lower the pressure within the pebble. The inner PyC layer 122 protects the SiC 123 by limiting its interactions with the fuel. The SiC shell 123, preferably substantially thicker than conventional TRISO (e.g. 120 mm), serves as a pressure vessel containing the gaseous and metallic fission products. Its thickness is sufficient to resist stress from the fission gases as they accumulate with the burning of the fuel portion of the pebble. Without that protection the fission gases can escape from the TRISO and circulate in the coolant loop. In addition, metallic fission products can react with SiC 123, and that is to be prevented. The PyC layer 124 provides structural support to the SiC layer, while the outer PyC layer 125 protects the particles and prevents the molten salt coolant, should a pebble develop a crack, from leaching radioactive materials, such as UOC, from the TRISO particles.

As illustrated by FIG. 12, the TRISO particles are grouped together into pebbles 126. The pebbles 126 may have a cladding of a refractory metal, or a metal-carbide. The surface material is compatible with the flibe or other molten coolant. The TRISO particles are designed to accommodate fission gas accumulation at burn-up in excess of 95% FIMA. These fuels have excess sacrificial carbon inside the silicon carbide shell to react with palladium and other fission products, thereby preventing these deleterious elements from reacting with the silicon carbide encapsulation shell. A ZrC diffusion barrier also prevents direct contact of fission products from the TRISO particles with the SiC shell. The LIFE engine is designed not to exceed the melting point of the TRISO fuel, preferably operating between 500° C. and 850° C.

A further benefit of the pebbles is that they can be individually tracked for accounting of the fuel, e.g. by being individually numbered, bar coded, or otherwise encoded. This is not otherwise possible with the TRISO particles themselves. In addition because each pebble contains enough of the TRISO fuel to emit enough radiation to prevent manual removal without personal harm, the pebbles are self protecting. One pebble emits more radiation than a convention fuel rod, yet to accumulate enough nuclear material to be of concern, on the order of 30,000 pebbles need to be acquired. Even then refining the fuel from the particles inside the pebbles is a difficult task. The coolant flow within the LIFE engine results in a typical pebble speed on the order of 10 cm per day. About 15 million pebbles are needed to fuel the LIFE engine; and the pebbles are expected to have a lifetime on the order of 60 years.

A more detailed explanation of the TRISO fuel and its manufacture can be found in commonly assigned U.S. patent application Ser. No. 12/681,339 entitled, "TRISO Fuel for High Burn-Up Nuclear Engine" and filed Sep. 30, 2008, the contents of which are incorporated by reference herein.

The TRISO fuel has limitations. The mass fraction of fertile material in the enhanced TRISO fuel discussed above is limited by the packing efficiency of the small TRISO particles (1 mm) in the larger pebble (2 cm). Furthermore, the strength of the pressure boundary of the TRISO particle is limited by the properties of silicon carbide, typically formed by chemical vapor deposition on the underlying layers. Further disadvantages of the TRISO fuel are an inability to control the buoyancy of the pebbles in the molten salt coolant, and the relatively poor heat transfer from the kernel to the ultimate exterior of the pebble.

For all these reasons, the solid hollow core fuel shown in FIG. 13 is preferred. The core is referred to as a solid hollow core because the core of the sphere is preferably a nanoporous metal foam. This metal foam provides sacrificial silicon carbide to provide regions for storage of the fission gases, via chemisorption on the surface of the foam. Because the foam layer is interior to the fertile shell, it does not insulate the heat produced from the UOC shell from being transported to the exterior of the sphere, unlike the circumstance with the TRISO particles inside the pebble shell.

FIG. 13 is an illustration of an alternate solid fission fuel for the engine. The fuel shown there is configured as a sphere between about 2 and 4 cm in diameter with a porous carbon kernel 131 surrounded by a layer of fertile UOC 133. The fertile UOC shell 133 is surrounded by a further layer 134 which consists of a silicon carbide sacrificial layer, a zirconium carbide diffusion barrier, and a PyC transition layer. The structure illustrated enhances heat transfer while providing space for the fission gases. This structure includes a high strength carbon-fiber composite layer 136 for strength, and cladding 138 for protection from abrasion and molten salt attack. As shown in FIG. 13, the porous carbon core 131 includes sacrificial silicon carbide and PyC transition layer 134. The fission reactions will produce, around the core 131, a layer of 1:3:3:5 U:Pd:Si:C 132 which has a melting point of about 1952° C. This silicon carbide containment vessel 135 is wrapped with high strength silicon carbide fiber 136, followed by a fiber-to-clad transition layer 137 and then the refractory metal corrosion resistant cladding layer 138.

This fuel configuration of FIG. 13 overcomes some of the disadvantages of the TRISO fuel described with respect to FIG. 12. The TRISO particles do not pack tightly, occupying on the order of only 30% by volume of the pebbles. This limits the extent of the fuel blanket volume being made up by the fuel itself. In addition, the heat transfer from the TRISO fertile material is inefficient. Also the silicon carbide wall thickness is limited by the need to contain the fission gas pressure. Additional limitations of the TRISO fuel compared to the fuel shown in FIG. 13 are that in the TRISO fuel the heat transfer from fertile material UOC is through the low thermal conductivity porous buffer layer, resulting in lower efficiency energy transfer. In addition, the TRISO particles, on the order of 1 mm are too small to enable the use of high temperature fiber composite materials.

The structure of FIG. 13 allows either the fuel or moderator masses to be much larger than TRISO, enabling tailoring of the fuel pebbles for optimum performance. The fertile/fissile material is in direct contact with a solid pressure vessel wall for improved heat transfer, and greater thermal conductivity. The large diameter enables use of fiber composite materials, such as SiC/Carbon fibers to build high strength containers. In the case of the spherical structure, the full diameter of the sphere—in comparison to the pellet diameters of 1 mm for TRISO pellets—can provide structure. The thicker and stronger walls of the spherical structure give greater fission gas retention. Additionally, the structure can be manufactured to float or to sink, facilitating movement of the spheres in the engine blanket. If one sphere leaks, it will sink, enabling easy detection of damaged spheres. As with the TRISO pebbles, each sphere can have an individual tracking number applied to it. Thermal conductivity is improved because heat from the fission transfers outward without need for an exterior sacrificial layer, it all having been provided interior to the fissile material. The large size of the sphere allows a silicon carbide wrap to make a strong vessel. Importantly, the cladding layer 138 must survive the molten salt coolant. The exterior corrosion-resistant refractory metal cladding must resist attack by hydrofluoric acid. Hydrofluoric acid is formed in the molten salt coolant as a result of the neutron flux and its impact on the coolant. The preferred cladding comprises tungsten or vanadium silicides which are resistant to hydrofluoric acid.

A more detailed explanation of the solid hollow core fuel and its manufacture can be found in commonly assigned U.S. patent application Ser. No. 12/681,343, entitled, "Solid Hollow Core Fuel for Fusion-Fission Engine" and filed May 26, 2011, the contents of which are incorporated by reference herein.

A third approach to fuel for the LIFE engine is to use a molten salt-based fuel. Molten salt-based fuels offer advantages because they eliminate the radiation damage concerns of solid fuel. In addition, some fission products precipitate out of the liquid, resulting in fewer neutrons lost. Radiation does not damage molten fuel, and therefore can achieve the high burn-up (>99%) of heavy atoms of U.

Liquid fuels avoid problems associated with radiation damage of solid fuels at high burn-up, but are challenged by the need for on-line processing to remove fission products. Fission gases must be removed and stored for disposal or treatment. Metallic fission products must be removed to prevent them from plating out in the primary circulation loop. Rare earths must be removed so that the solubility of plutonium can be maintained at a relatively high level. Such liquid fuels require oxidation-state (redox) control, which can be accomplished with active electronic systems. In addition liquid fuels provide higher blanket gain because most of the fission products are removed. These products must be disposed of, either continuously, or at the end of the life of the fuel.

One fuel salt consists of $LiF+UF_4+ThF_4$. This mixture replaces the solid fuel zone in the LIFE engines described above. For example, in FIGS. 4, 5, and 6, the liquid fuel replaces the TRISO pebble layer. These approaches enable use of $NaBF_4+NaF$ as secondary loop coolants. Flinabe and flinak based systems may also be used. A phase diagram for the most basic lithium-based liquid fuel, assumed to consist primarily of lithium, uranium and plutonium fluorides is shown in FIG. 14. This phase diagram reveals a region of stable operation for liquid fuels at UF mole fractions on the order of 0.2 and temperatures on the order of 650° C. In this regime no solid-phase precipitates form. In an on-line salt reprocessing plant, fuel salt is fluorinated to convert dissolved UF to gaseous $UF_6$, thereby allowing uranium separation from the liquid stream. The remaining salt is separated from rare earth and other fission products by vacuum distillation. A LIFE engine with liquid fuel uses a separation process for the continuous removal of rare earth fission products to prevent the precipitation of $PuF_3$. In addition, a high enough temperature for the solubility of Pu yet low enough for structural strength of the materials involved restricts the engine to a narrow operating temperature range.

Molten salt with dissolved uranium is one implementation of the liquid fuel blanket. In one implementation, the molten salt composition is the eutectic mixture of 73 mol % LiF and 27 mol % $UF_4$, whose melting point is 490° C. To reduce corrosion, a small amount (about 1 mol % of $UF_3$) is added to the mixture. The same beryllium neutron multiplier can be used as with TRISO fuel, or liquid lithium or liquid lead multiplier can be employed. Maintaining enough solubility of $PuF_3$, which builds up to about 4 mol % during the peak of the burn phase, is desirable. The temperature of the molten salt fuel are on the order of 550° C. at the inlet (60° C. above the melt) and 650° C. at the outlet. To mitigate corrosion of the steel, a tungsten coating similar to the first wall facing the fusion source can be used in the regions of high neutron flux. In lower flux regions various alloys of nickel, can be used in the piping and heat exchangers.

Alternatives for the liquid fuel are $UF_4/Li_2BeF_4$ or variant, $PuF_3/Li_2BeF_4$ or variant, $UF_4/Li$—Na—K—F, $PuF_3/Li$—Na—K—F, or $ThF_4/Li$—Na—K—F. The $Li_2BeF_4$ eutectic as molten salt between LiF and $BeF_2$ results in the lowest melting point, reducing the difficulty of maintaining the fuel in a molten state. With WG-Pu or HEU, direct digestion into salt is possible, enabling a waste disposal approach.

There are potential disadvantages, however, to molten salt-based fuels. They are inherently corrosive, and therefore require protective coatings on those surfaces of the engine to which they are exposed. Coatings such as nickel, tungsten, or molybdenum are required. In addition, any plutonium produced as a result of the reactions must be managed to stay below the precipitation threshold of plutonium. This can be achieved by operating the engine with a tertiary salt composition which includes thorium to suppress the plutonium. Liquid fuels require a process for removing the fission gases, the metallic fission products, and the rare earth fission products. The volatile fission products such as Kr, Xe and $T_2$ can be removed by gas sparging. Insoluble noble and semi-noble metals such as Zn, Ga, Ge, As, Nb, Tc, Ru, Rh, Pd, Ag, Cd, In, Sn and Sb can be removed by centrifugation and filtration.

7. Segmented Fission-Fuel Blanket

Several complementary approaches are used to tune the performance of the LIFE engine. FIG. 15 illustrates tuning of the fuel burn up throughout the duration of operation of the LIFE engine. Segmenting the fuel blanket (region 5 in FIG. 4) controls the lifetime of the pebbles and results in finer control of the burn up of the fissile fuel in the TRISO particles or the solid hollow core fuel. As shown in FIG. 15, different regions of the fission blanket 141, 142, and 143 will be exposed to different neutron fluxes originating from the centrally located targets. As the layers closest to the targets are fully burned, the successive layers are promoted, and new fuel is added to the back of the blanket. This allows operating the engine indefinitely, at least in terms of need for suspension of operation to refuel. Experiments on blankets of TRISO sized objects have shown that the pebbles do not experience much motion toward and away from the center of the chamber as they traverse the blanket. In other words, the pebble layers remain stratified. If finer control is desired, small amounts of structure can be added to the chamber walls to maintain an essentially layered structure for the pebbles. The segmented blanket enables tailoring the nuclear burn by injecting the pebbles at varying depths to subject them to different neutron environments. This is shown schematically in FIG. 15.

In FIG. 15, the layer of pebbles closest to the first wall 146 experiences the highest flux, and thus, burns the fastest. After being routinely removed for inspection, such pebbles can be reinserted in the front of the blanket and be burned to 99% FIMA much more rapidly than in a fully mixed blanket. Once the front layer of pebbles is fully burned, it can be removed, and the second layer promoted to the front. As shown in FIG. 15, successive layers are promoted as well, with fresh fuel inserted at the back of the blanket. By using several blanket segments it is possible for deeper layers to provide a significant portion of the thermal power when the front layer is in its incineration phase. This allows maintaining a desired power output as a function of time for as long as desired with the power ramp-down occurring only when decommissioning that particular LIFE engine is desired.

In a preferred implementation illustrated in FIG. 15 three layers of fuel pebbles are used, with the inner layer 141 being promoted to waste, once essentially all of its fission capacity is exhausted. As that occurs the pebbles of former layer 142 are moved into the inner layer 141 for exposure to the highest neutron flux. In the manner illustrated, new unburned pebbles may be added at layer 143 as pebbles from that layer are promoted to inner layers.

A finer control of pebble lifetime can be achieved by inspecting the pebbles using an automated process as they pass through the circulation system in the LIFE engine. This inspection allows sorting the pebbles based upon their remaining energy content and placing them in an appropriate layer as determined by the inspection process. This inspection and control of pebble position within the engine allows full power for the engine to be extended indefinitely, limited by the lifetime of the structure itself.

In one implementation, inspection of the pebbles preferably is performed by an automated process which Thompson Radiated Extreme X-rays—a laser-based technique for making mono-energetic gamma rays allows analyzing the isotope content of an object. See commonly assigned, co-pending United States patent application entitled "Isotopic Imaging via Nuclear Resonance Fluorescence with Laser-Based Thomson Radiation," Ser. No. 11/528,182. Such a system can be used to assay the solid fuel as the objects exit the blanket, for example, even at 3 fuel pebbles per second. Depending on the isotope content of each ball, the system allows determining whether (1) the particular fuel ball has been damaged or if it can continue to be used, (2) if the fuel ball has fuel left to be reused, (3) into which layer of the fission blanket it should be injected. In addition the fuel can be inspected for fission gas leakage using a quadrapole mass spectrometer. If desired, trace isotopes can also be used for tracking of individual pebbles based on the gamma emissions of such isotopes.

FIG. 16 is a graph which illustrates the thermal power produced by a LIFE engine over its expected lifetime of 50+ years. A peaked line 161 shows the expected thermal power as a function of time assuming the engine operates without special control of tritium produced by the engine. We refer to this as the "natural" power output curve. Note that after an initial about one year startup phase, power output peaks at about 4000 MW at about five years, and then gradually declines to a level of about 1000 MW by year 40. Such a power output curve is undesirable for many reasons. For example, such power output requires the entire plant to be sized to handle the maximum thermal power of 4000 MW which lasts for only a relatively brief period, thereby increasing capital and operational costs of the plant. In addition, because it requires the utility to provide other plants which peak at other times, it is difficult to incorporate such a widely divergent power output from a single plant into an overall utility system.

A more desirable manner of operation is to have a power plant which provides essentially a steady state amount of power over most of its lifetime. Curve 167 in FIG. 16 illustrates a LIFE power plant output of a relatively steady 2000 MW over essentially all of its life. After a startup phase of about a year, the "natural" power output 161 of a LIFE engine can be controlled to provide a more uniform power output 167 by control of the $^6$Li/$^7$Li ratio. As coolant in the LIFE engine is consumed, a coolant makeup system, which introduces necessary additional coolant, supplies both $^6$Li and $^7$Li. Control of this ratio allows tailoring of the power output of the LIFE engine. During an initial phase of operation, shown in FIG. 16 as extending between about year 1 and year 25, a surplus of $^6$Li is used in the coolant, resulting in the production of excess tritium, thereby reducing the power output of the plant. Then, during a later phase of operation of the LIFE engine, shown in FIG. 16 as extending between years 25 and 45, the $^6$Li to $^7$Li ratio is changed with more $^7$Li being used. During this phase of operation, any tritium required for target manufacture at the particular LIFE engine is provided from other target manufacturing plants or taken from stores accumulated during the earlier phase that produced excess tritium. $^6$Li plus a low-energy neutron creates an alpha particle plus tritium. $^7$Li plus a high-energy neutron creates an alpha particle, tritium, and an additional neutron. In addition, LIFE uses low neutrons to convert $^{238}$U to make $^{239}$PU. Therefore, by adding or subtracting $^6$Li the tritium production is changed. Changing the tritium production changes the power level.

Whether the engine is fueled with solid or liquid fuel, as explained above, tritium gas will be produced by the neutron bombardment. This tritium can be separated and stored in the form of metal tritides by being flowed over a suitable metal bed. For example, the tritium may be stored using Metal Tritide (MxTy), based on a reversible hydrogen storage system using LaNi$_5$ (1.52 g-H$_2$/100 g-M), LaCuNi$_4$ (1.30 g-H$_2$/100 g-M), La0.7CeO$_{0.3}$Ni$_5$ (1.60 g-H$_2$/100 g-M), Mm$_{0.85}$Ce$_{0.15}$Ni$_5$ (1.50 g-H$_2$/100 g-M), Mm$_{1.05}$N$_{4.97}$Al$_{0.03}$ (2.42 g-H$_2$/100 g-M), Vanadium (5.90 g-H$_2$/100 g-M), Vanadium with 0.93% Si (5.60 g-H$_2$/100 g-M), Niobium (2.10 g-H$_2$/100 g-M), Magnesium (7.60 g-H$_2$/100 g-M), Fe—Ti (1.80 g-H$_2$/100 g-M), Fe—Ti—Mn (2.42 g-H$_2$/100 g-M), Mg0.93Ni0.07 (5.70 g-H$_2$/100 g-M), or an alanate system (4.00 g-H$_2$/100 g-M).

Another approach for storing the tritium is to use liquid storage as an oxide (T$_2$O). The tritium can be oxidized (T$_2$ to T$_2$O) in two different processes. First the process can be performed using a Pt Catalyst in O$_2$-Containing He. Alternatively a fuel cell with membrane Separating T$_2$ and O$_2$ can be used. Once stored in either of these manners, the tritium can be liberated using an electrolysis cell as needed. Alternatively the tritium in T$_2$O form may be frozen for storage as "Hot Ice." However stored, the tritium requires care in assuring that it does not diffuse through the piping of the engine. Concentric piping with He gas flow to remove any tritium that does diffuse through the piping is one solution. Alternatively the piping may be lined with copper, gold, or alloys of such metals, or other metals resistant to tritium diffusion.

LIFE engine performance is also improved by controlling the fuel-to-moderator ratio. The high-energy neutrons produced in the LIFE engine make power inefficiently. Lower energy neutrons are more efficient for power production. In a typical fission reactor this is achieved by controlling the fuel-to-moderator ratio to provide neutrons at the most efficient energy level. In the LIFE engine, however, the fissile content of the fuel changes dramatically over its lifetime. Depleted uranium, for example, contains only 0.25% $^{235}$U, which is fissile. After about 10 years in a LIFE blanket, the fuel pebbles would contain 5-10% $^{239}$Pu, which is also fissile. Thus, the fissile content changes by 20-40×, while the carbon moderator, which is fixed within the TRISO particles and pebble matrix, does not change. The results is a 20-40× change in the fuel-to-moderator ratio. Such a widely varying ratio leads to inefficient operation. This difficulty is overcome by using additional all graphite pebbles, otherwise identical to the fuel pebbles or spheres, thereby allowing control over the fuel-to-moderator ratio and improved performance. FIG. 17 illustrates the thermal neutron spectrum in LIFE engine fuel and its variation with time.

FIG. 18 includes two diagrams, a first diagram of a typical LIFE engine power curve on the left-hand side, and a second diagram of the mass of various fuel constituents on the right-hand side. The power curve illustrates the "breed-up" phase at the beginning of operation, the power production phase during most of the life of the engine, and the incineration phase at the end of the fuel lifetime. During the incineration phase the fission products are burned to a high FIMA. The FIMA is shown numerically on the power curve portion of the diagram. The resulting destruction of the radioactive materials is shown on the right side of the figure. Note that the mass of all of the actinides is reduced by many orders of magnitude.

The fission blanket is fueled with approximately 40 to 50 tons of fertile fission fuel such as depleted or natural U, SNF, or natural Th, or with a few tons of fissile fuels such as excess WG-Pu or HEU. In each case, the neutrons that enter the subcritical fission blanket are absorbed either by Li in the coolant, which in turn generates tritium that can be harvested to manufacture new DT fusion targets, or by the fission fuel pellets where they drive neutron capture and fission reactions, releasing heat. In this manner, an energy gain from fusion is multiplied in the fission blanket by another factor of 4 to 6, resulting in approximately 2000 to 3000 MWt of carbon-free power being generated by the system. Most importantly, because of the continuous availability of external neutrons from the fusion source, the fuel can be burned to as high as 99% final inventory of metal atoms, rendering it enormously less dangerous.

A typical power curve calculated for a LIFE engine loaded with 40 tons of DU, as described above, is characterized by an initial steep rise to a plateau, with the power output of the LIFE engine kept constant at approximately 2000 MWt by control of the $^6$Li/$^7$Li ratio in the fluoride molten salt coolant. This alters the balance of neutrons that are utilized to generate tritium relative to those available to generate energy in the fission blanket. In time $^{238}$U breeds up through neutron capture to $^{239}$Pu and other higher atomic number actinides.

After approximately 50 years operation, when the $^{238}$U is significantly depleted, the fusion neutrons burn down the higher actinides bred in the nuclear fuel, as well as continue to produce tritium for the fusion targets. Additionally, neutrons are lost to absorption in some of the fission product poisons. Because the LIFE engine is a driven, subcritical system, these losses do not result in the shutdown of the power plant, as with a critical reactor. With advanced TRISO-based or spherical fuels, LIFE burns the actinides from more than 99% of the initial fuel load. With a fission energy content of about 1 MW-day per gram and a thermal conversion efficiency of 45%, LIFE engines provide about 1.2 GWe-year per ton of fuel burned. The final level of fuel burn up can be adjusted to meet nuclear waste repository and safeguard requirements. Burning 40 MT of DU to 99% FIMA in a LIFE engine leaves only 400 kg actinides—about 10 kg per metric ton. In contrast 970 kg of actinides remain in the SNF per ton of fuel burnt in a typical LWR. These advantages, together with the fact that only 40 MT are required as input fuel for a LIFE engine operating for 50 years (versus 900 MT for a current generation LWR generating the same power over the same period of time) substantially reduce the requirements for geological waste repositories.

The LIFE engine burns not only fertile fuels such as DU, but also fissile materials such as excess weapons Pu or HEU.

A LIFE engine fueled with 7 tons of plutonium and driven by a 375 MW fusion source can provide 3000 MWt for about 5 years. The initial 7 MT of plutonium is converted almost entirely to fission products at the end of 5 years, with a few milligrams of plutonium and minimal quantities of other minor actinides remaining. The full-power portion of operations can be extended by segmenting the blanket and continuing to feed new fuel pebbles into the system as older ones reach full burn-up.

With a LIFE engine there is no need to extract fission fuel from the fission blanket before it is burned. Thus, except for fuel inspection and maintenance processes, the fuel is always within the core of the engine. No weapons-attractive materials are ever available outside the core. A consideration regarding proliferation concerns with any nuclear fuel cycle is the ease with which reactor fuel can be converted to weapons usable materials, not just when extracted as waste, but at any point in the fuel cycle. With the LIFE engine, nuclear fuel remains in the core of the engine until the actinides are burned, soon after start up of the engine. Once the system breeds up to full power, several tons of fissile material is in the fission blanket. With solid fuel, this fissile material is widely dispersed in millions of fuel pebbles. These can be tagged as individually accountable items and are thus hard to divert in large quantities. For the LIFE configurations discussed herein, 40 MT of DU are initially loaded into 15,000,000 fuel pebbles with 250 mg of Pu in each pebble at peak Pu concentration time. To obtain a significant quantity (SQ) of fissile material (defined as 8 kg for $^{239}$Pu) nearly 33,000 pebbles would be required. Such a collection of pebbles, however, generates about 10,000 rad/hr at 1 m and is thus well beyond self-protecting (a dose of 100 rad/hour) at a distance of 1 meter. At the end of the burn cycle, the full collection of pebbles contains less than one SQ of $^{239}$Pu.

Our calculations show that a LIFE engine can produce approximately 3000 MWt for 45 years while burning 37 metric tons of depleted uranium ($^{238}$U). If operated until 99.95% burn-up, the final fuel composition will contain only 18 kg of actinides, of which the vast majority is in the form of $^{246}$CM, an element of little or no interest from a proliferation perspective. The quantities of weapons attractive actinides such as Pu and Am are miniscule, as is the remaining amount of long-lived Np. In fact, the spent fuel qualifies for DOE attractiveness level E, the lowest categorization in the DOE safeguard tables.

FIG. 19 illustrates the control of thermal power in a LIFE engine by adjusting the tritium breeding ratio using lithium enrichment. Note that the LIFE engine produces excess tritium early in life cycle and consumes this tritium later in life cycle. Some of the excess tritium is lost due to radioactive decay. Tritium has a 12.3 year half-life.

8. Targets

Figure 1:
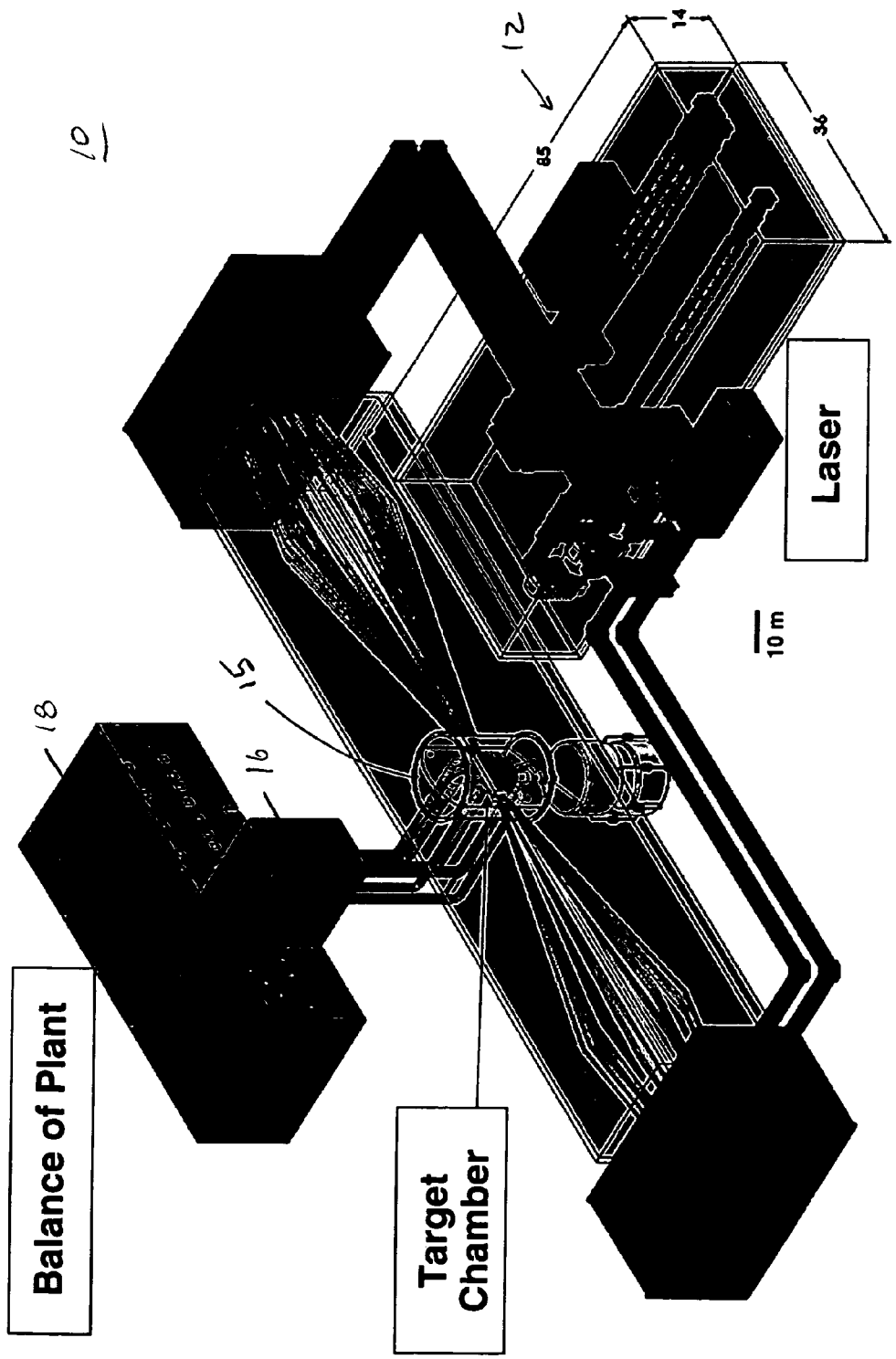
Figure 2:
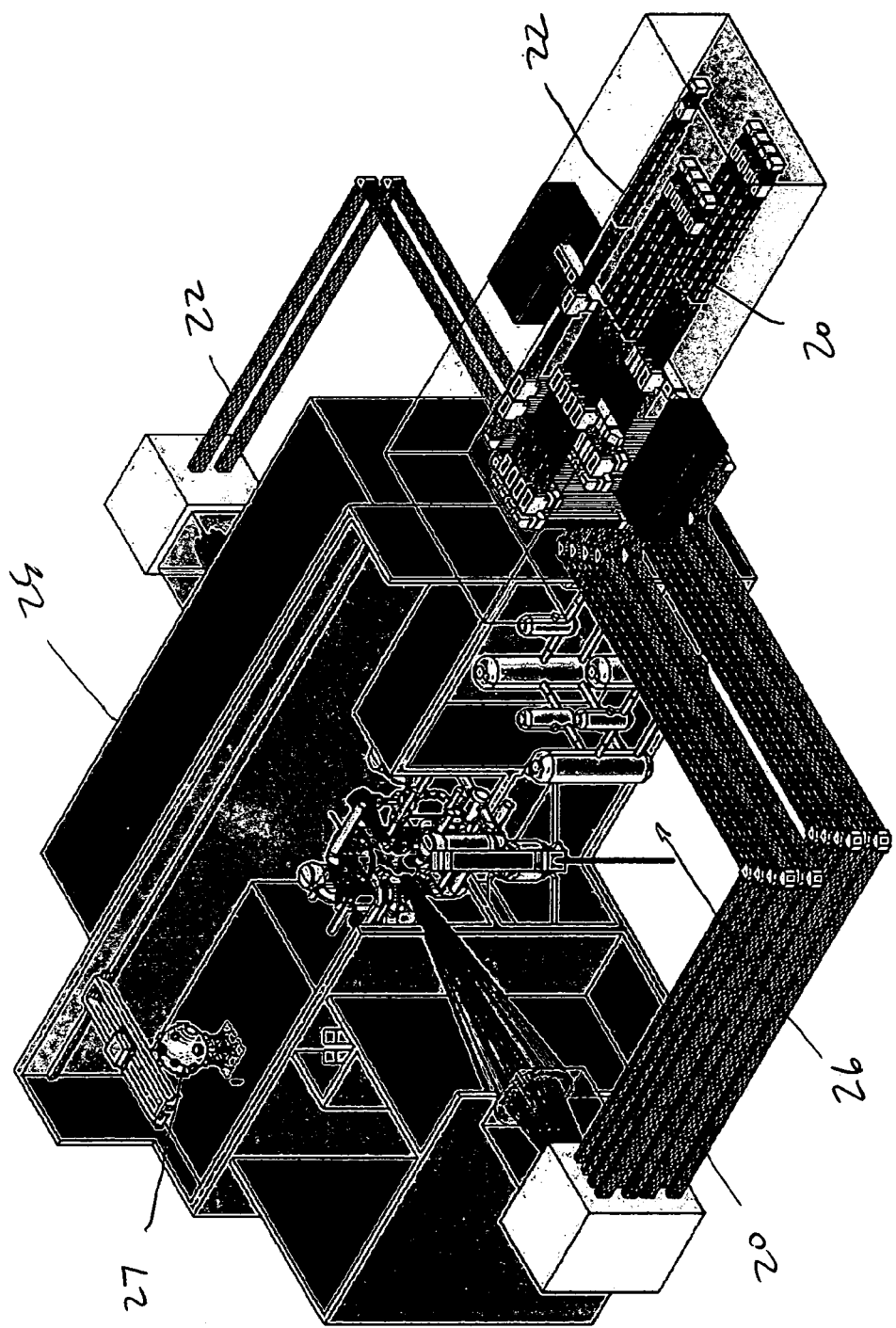
Figure 3:
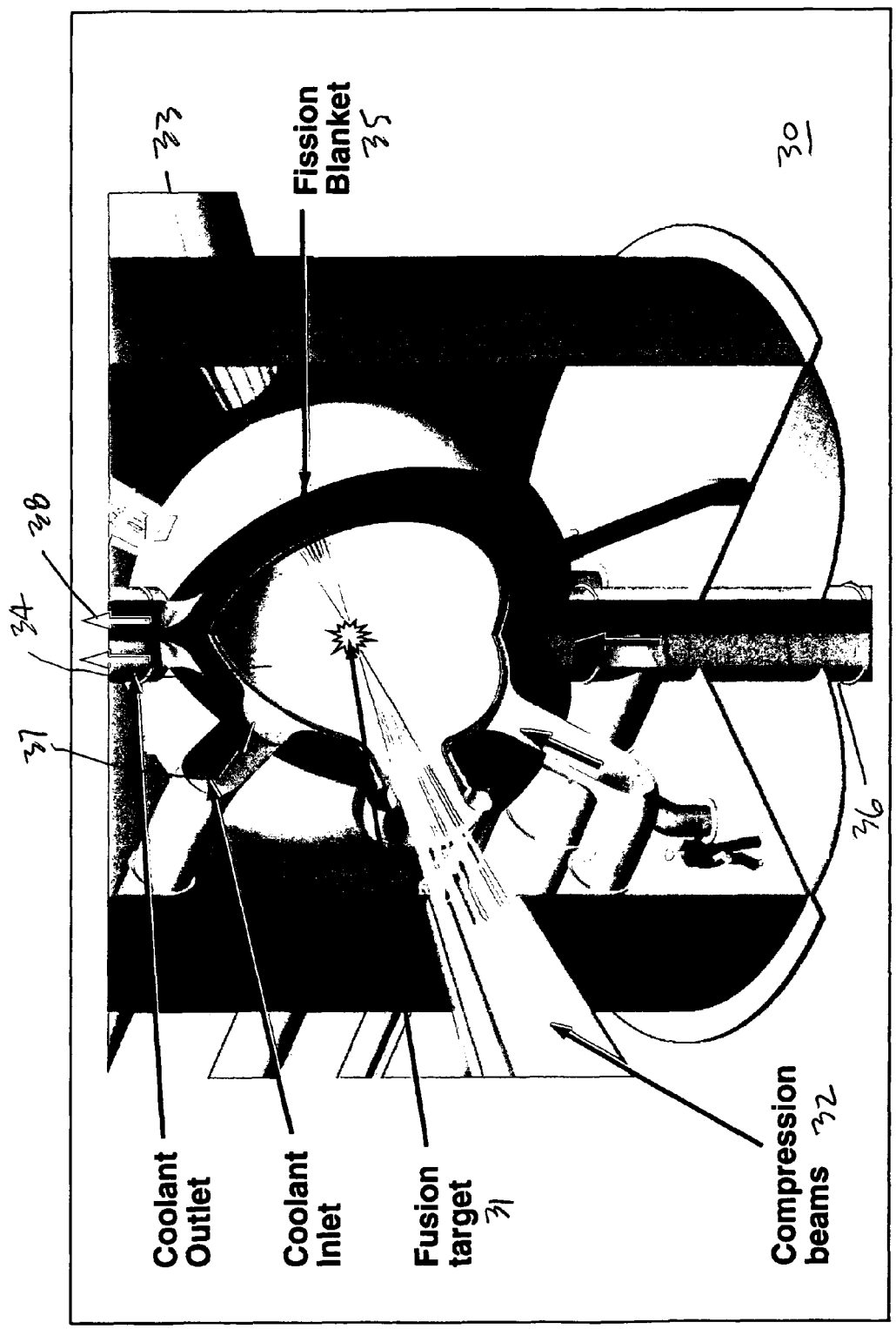
Figure 4:
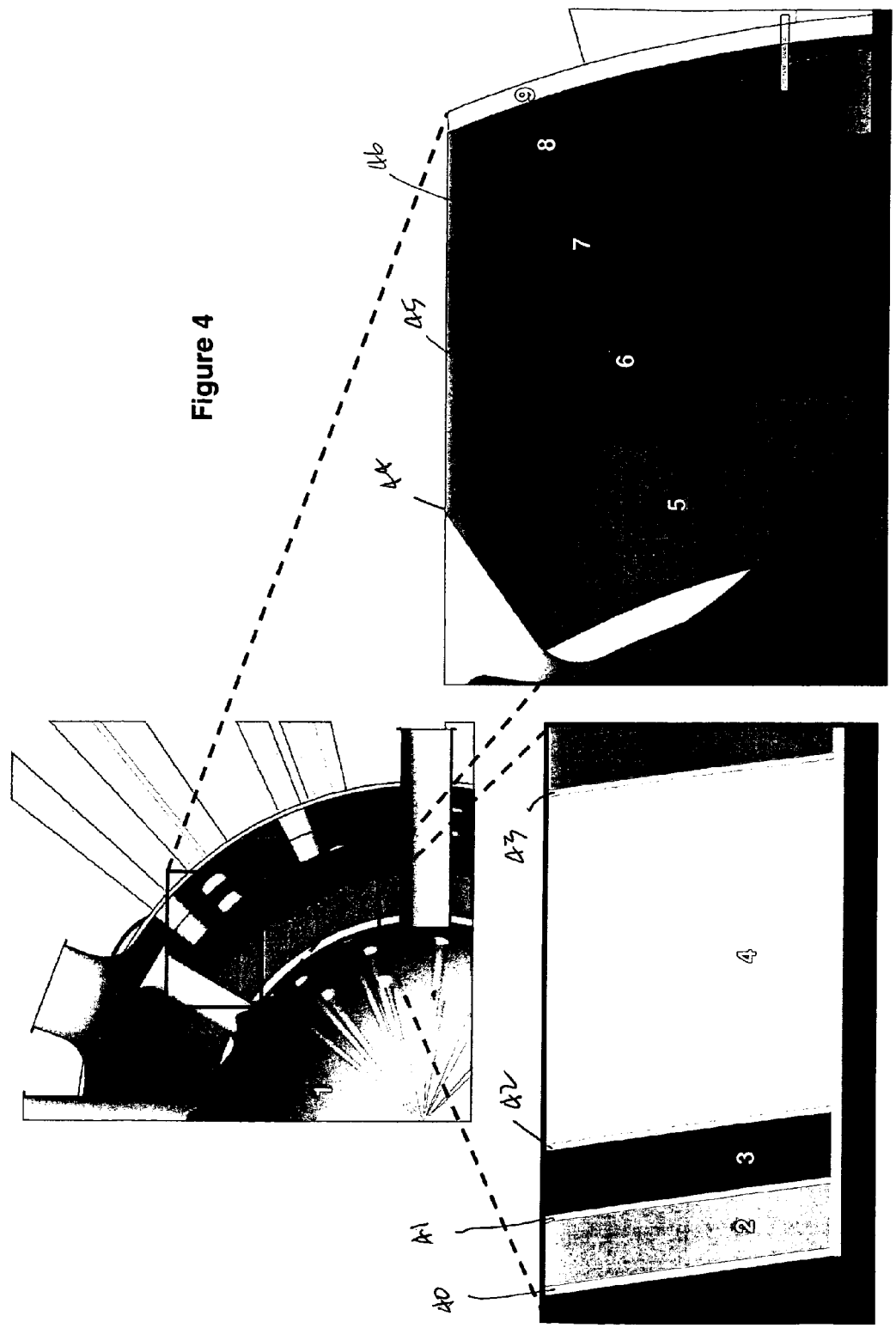
Figure 5:
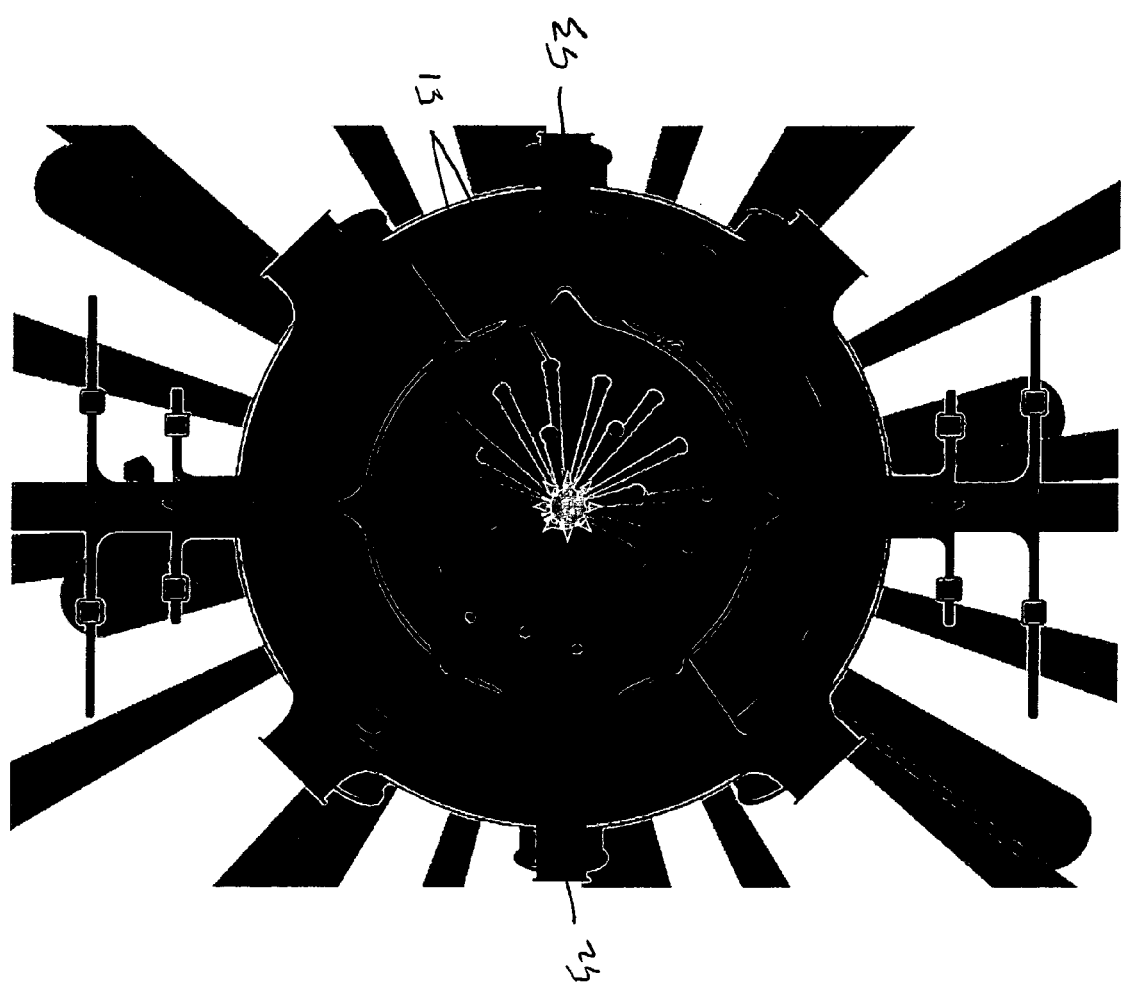
Figure 6:
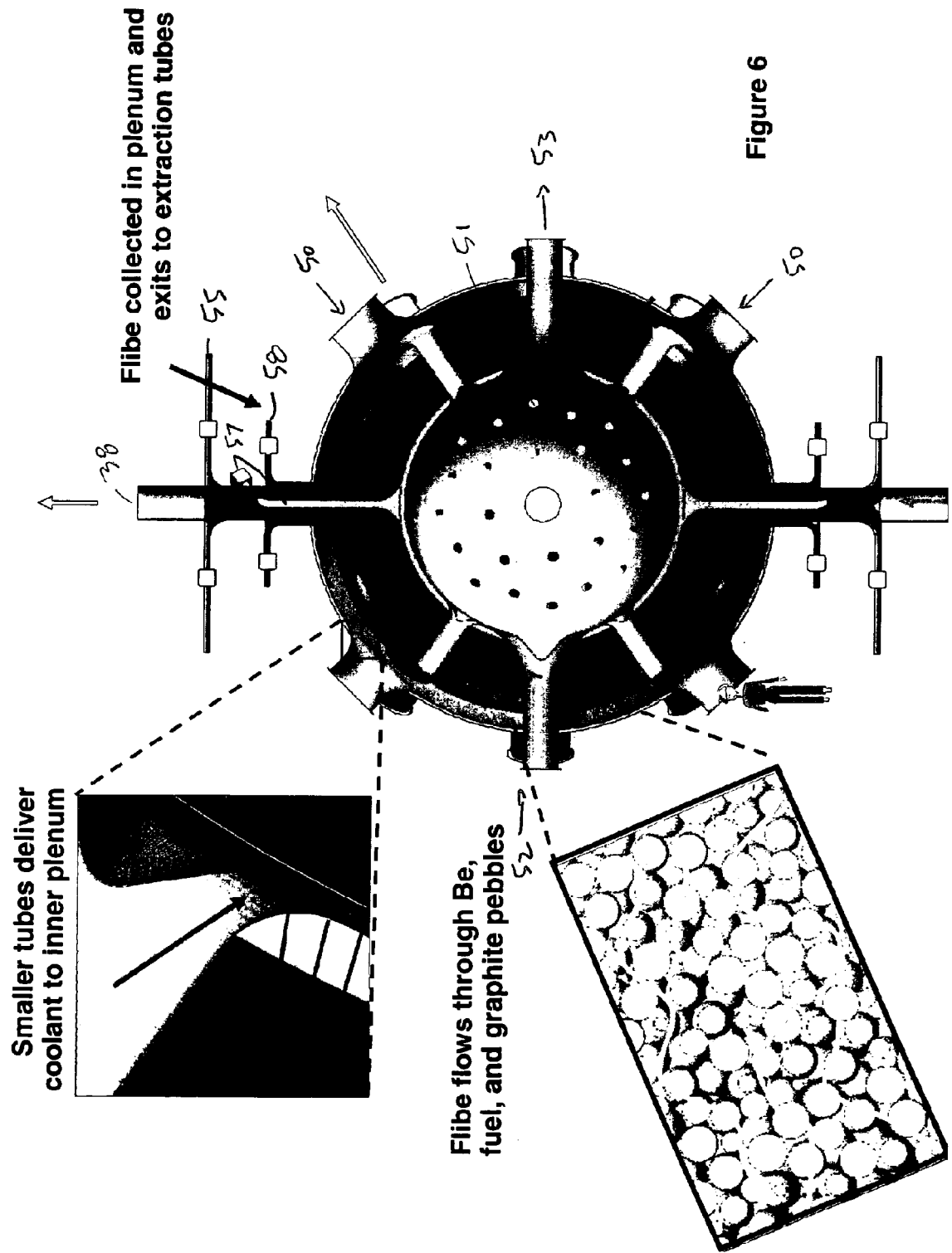
Figure 7:
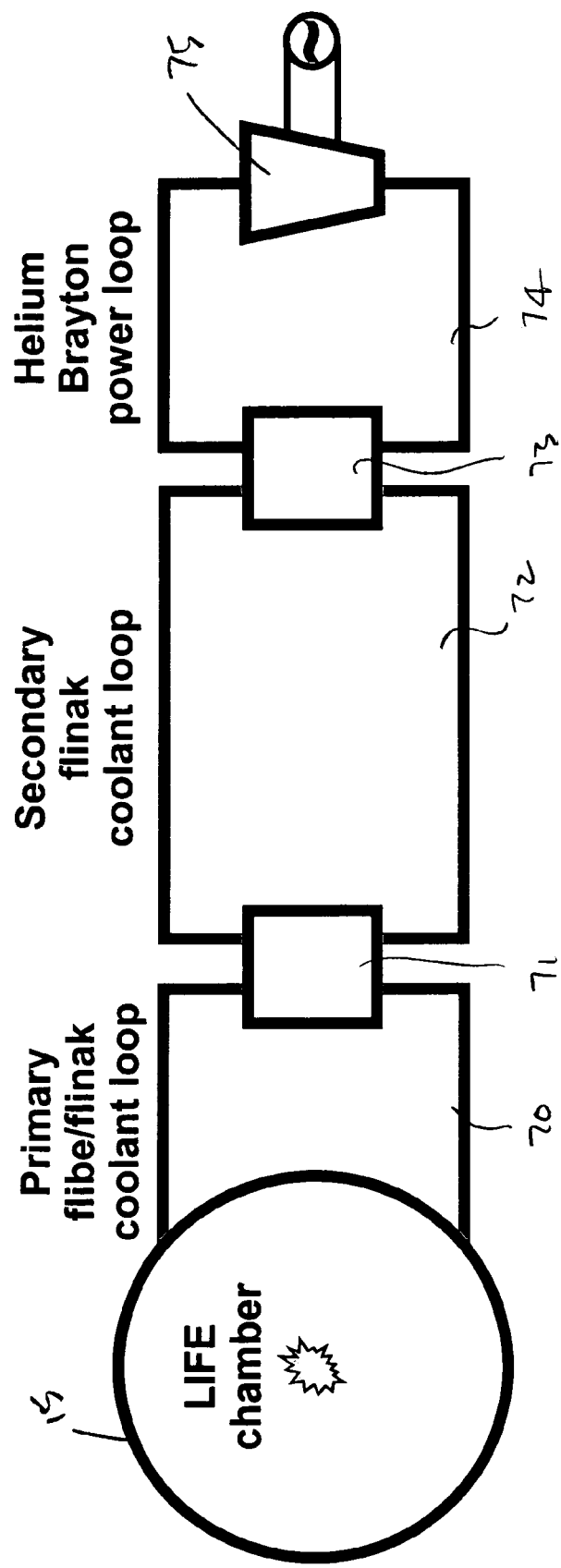
Figure 8:
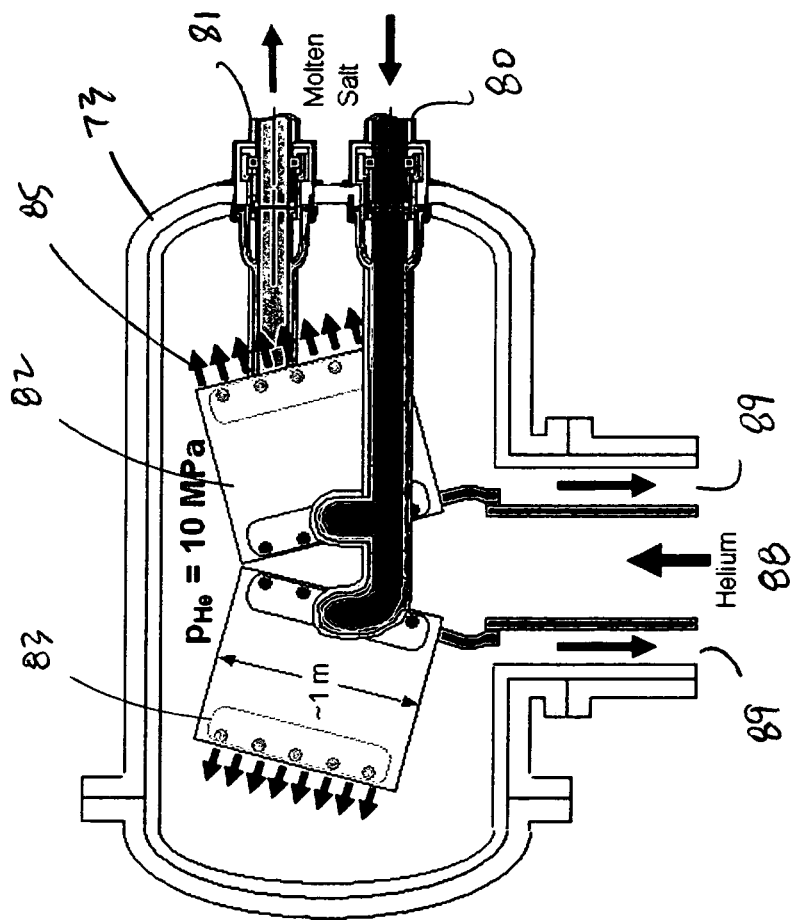
Figure 9:
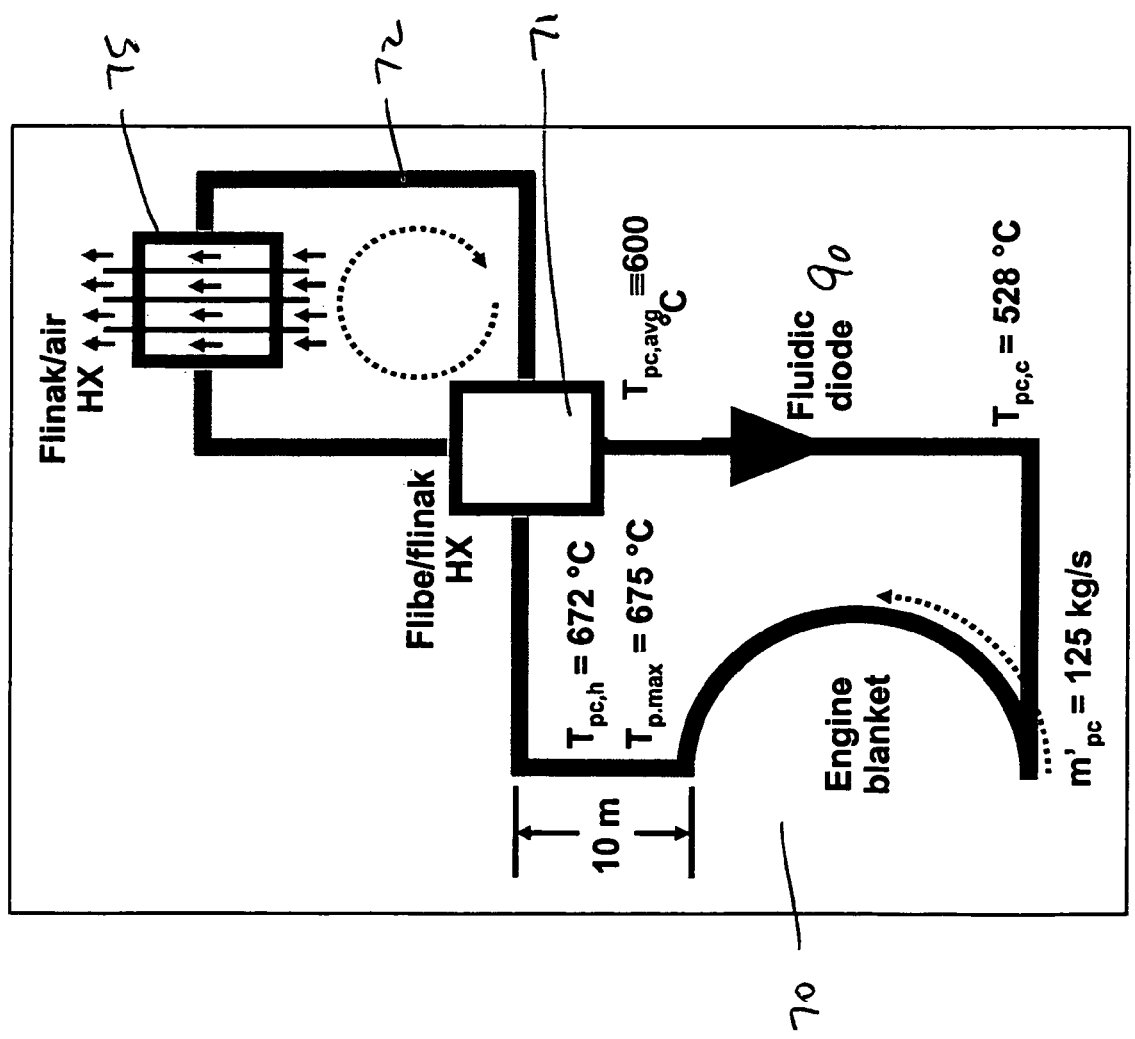
Figure 10:
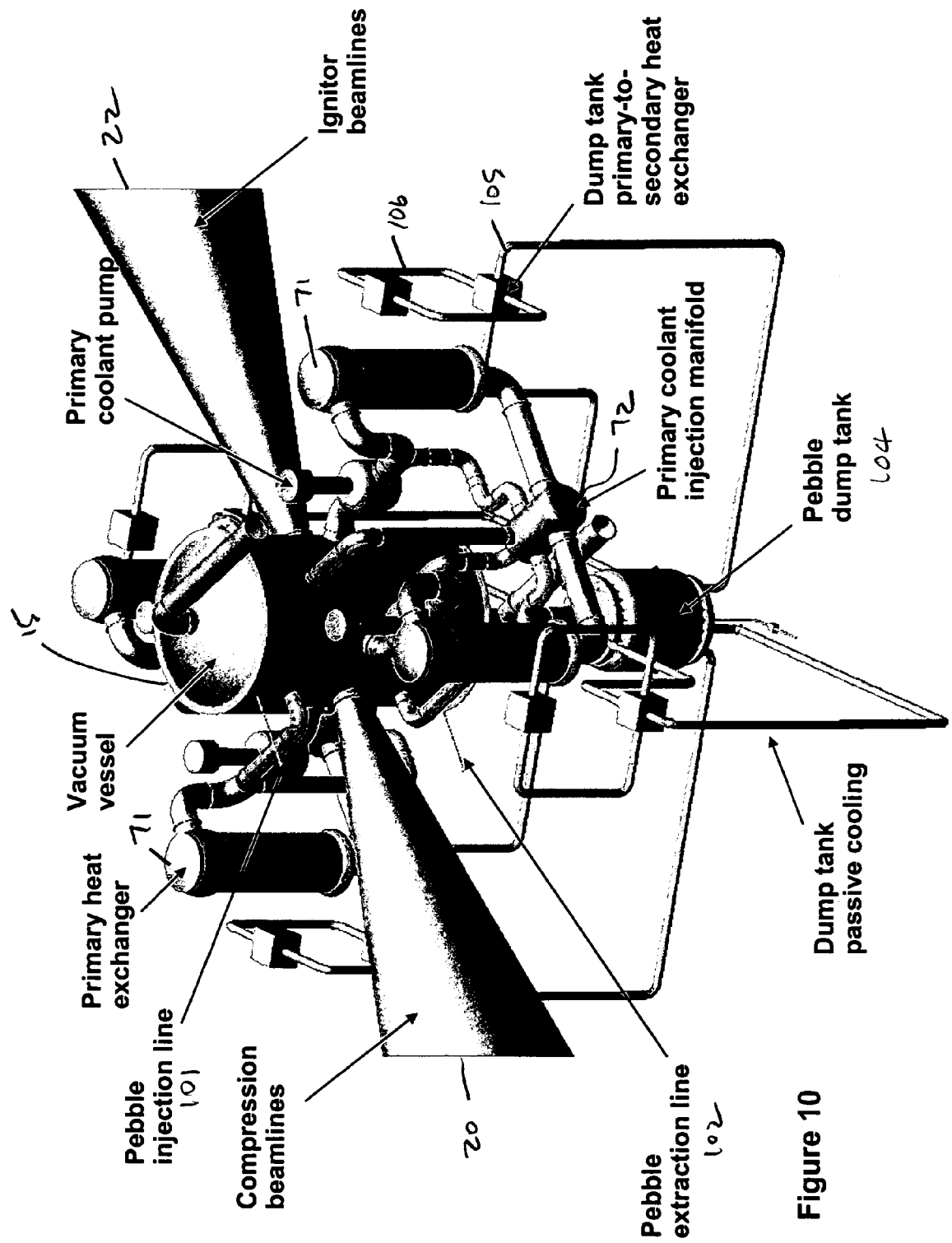
Figure 11:
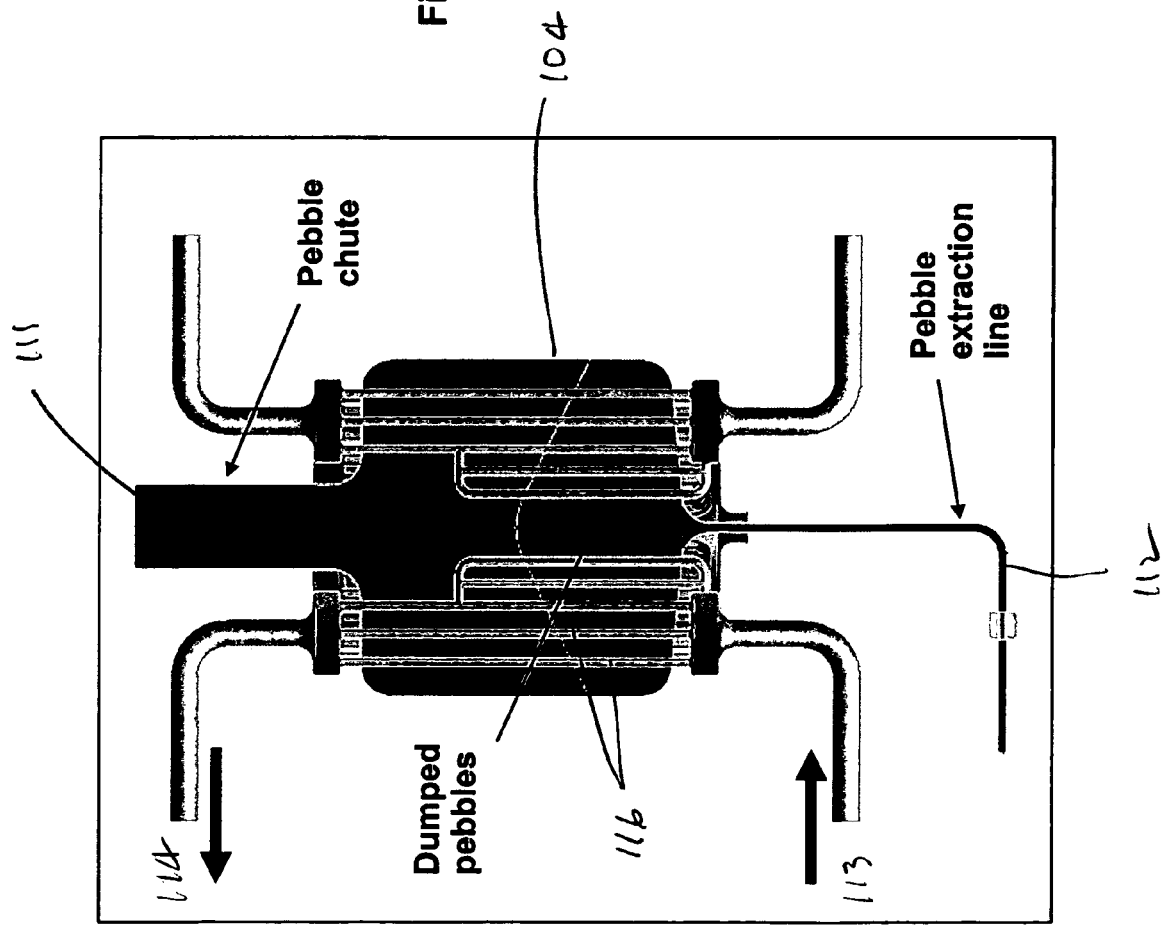
Figure 12:
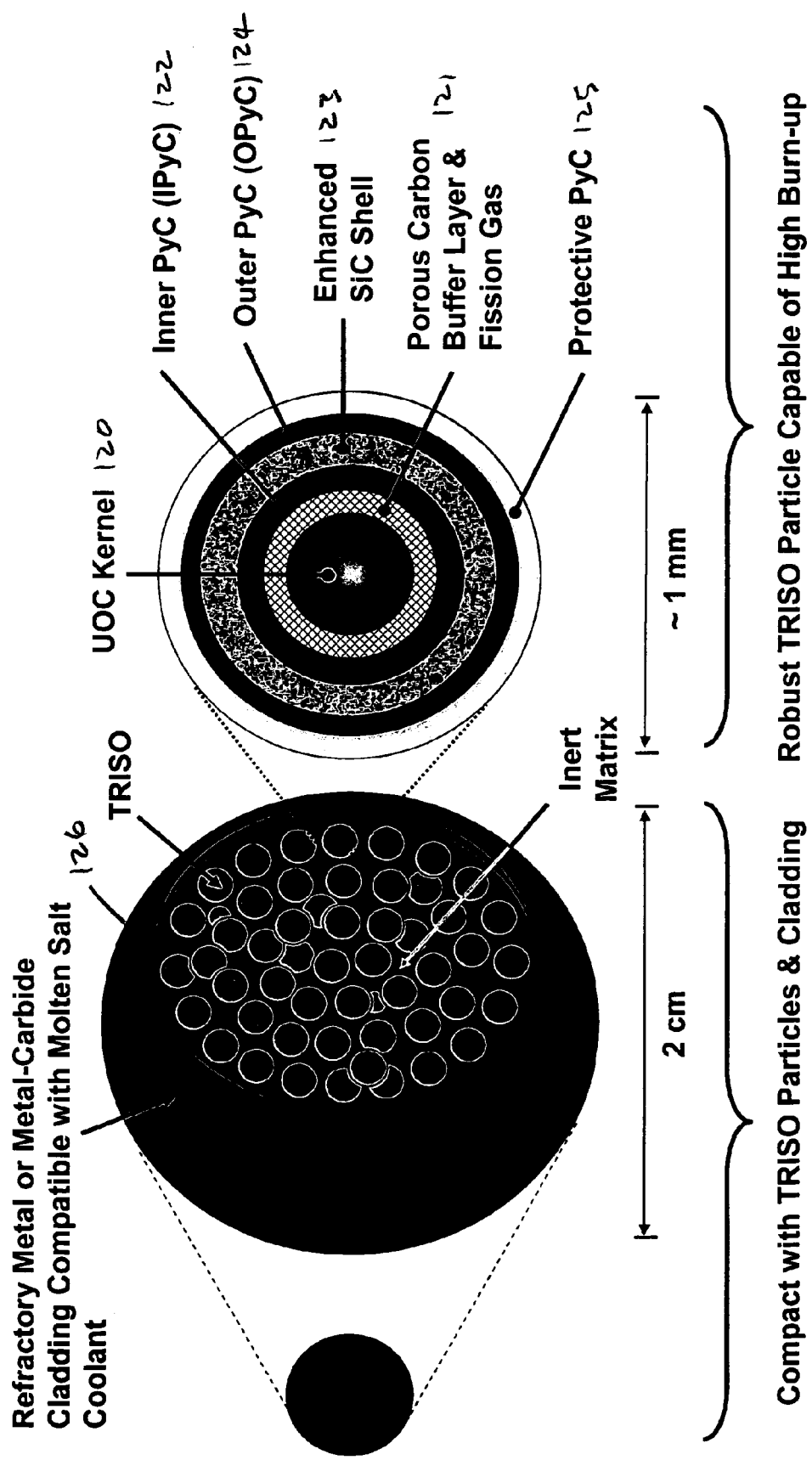
Figure 13:
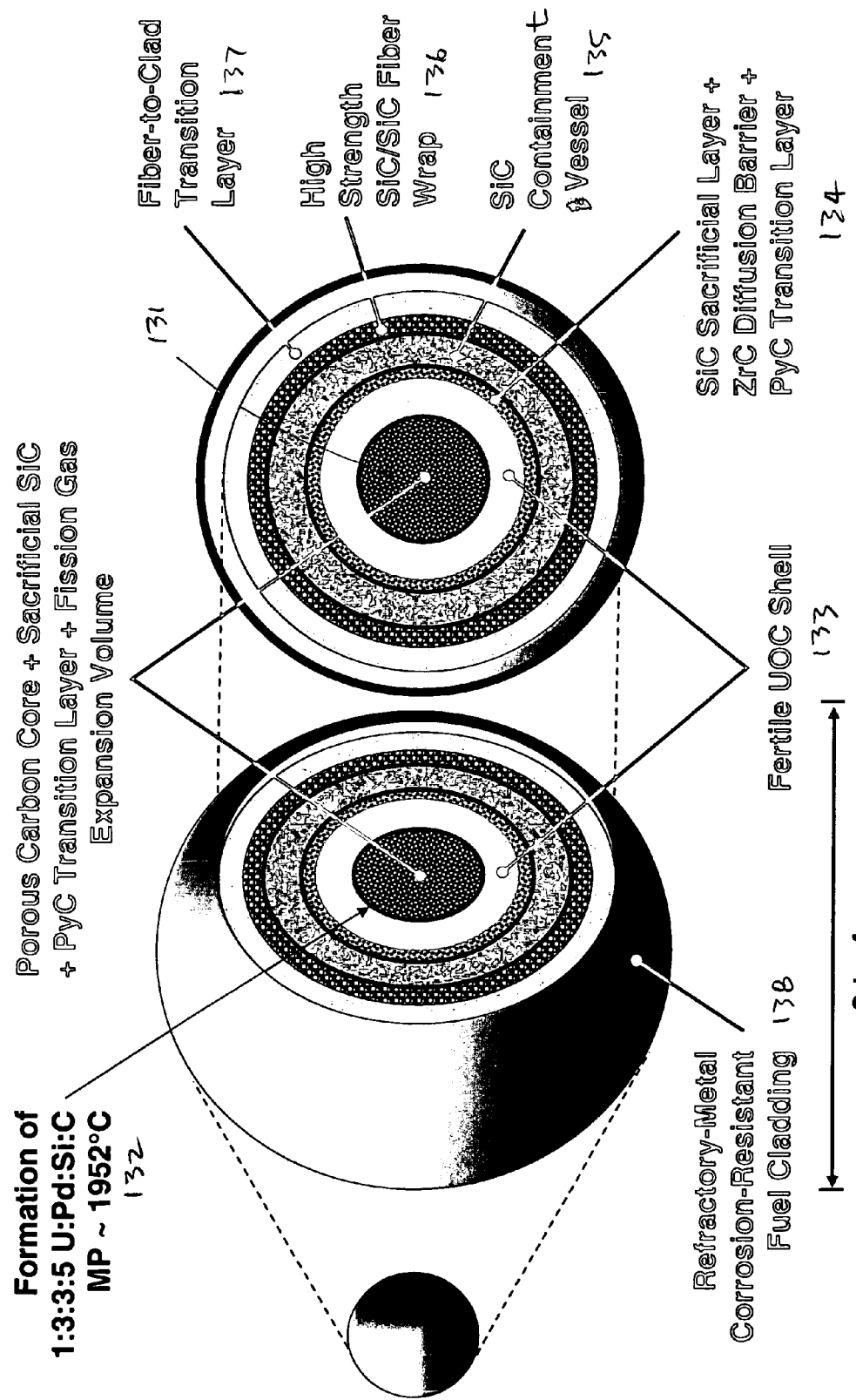
Figure 14:
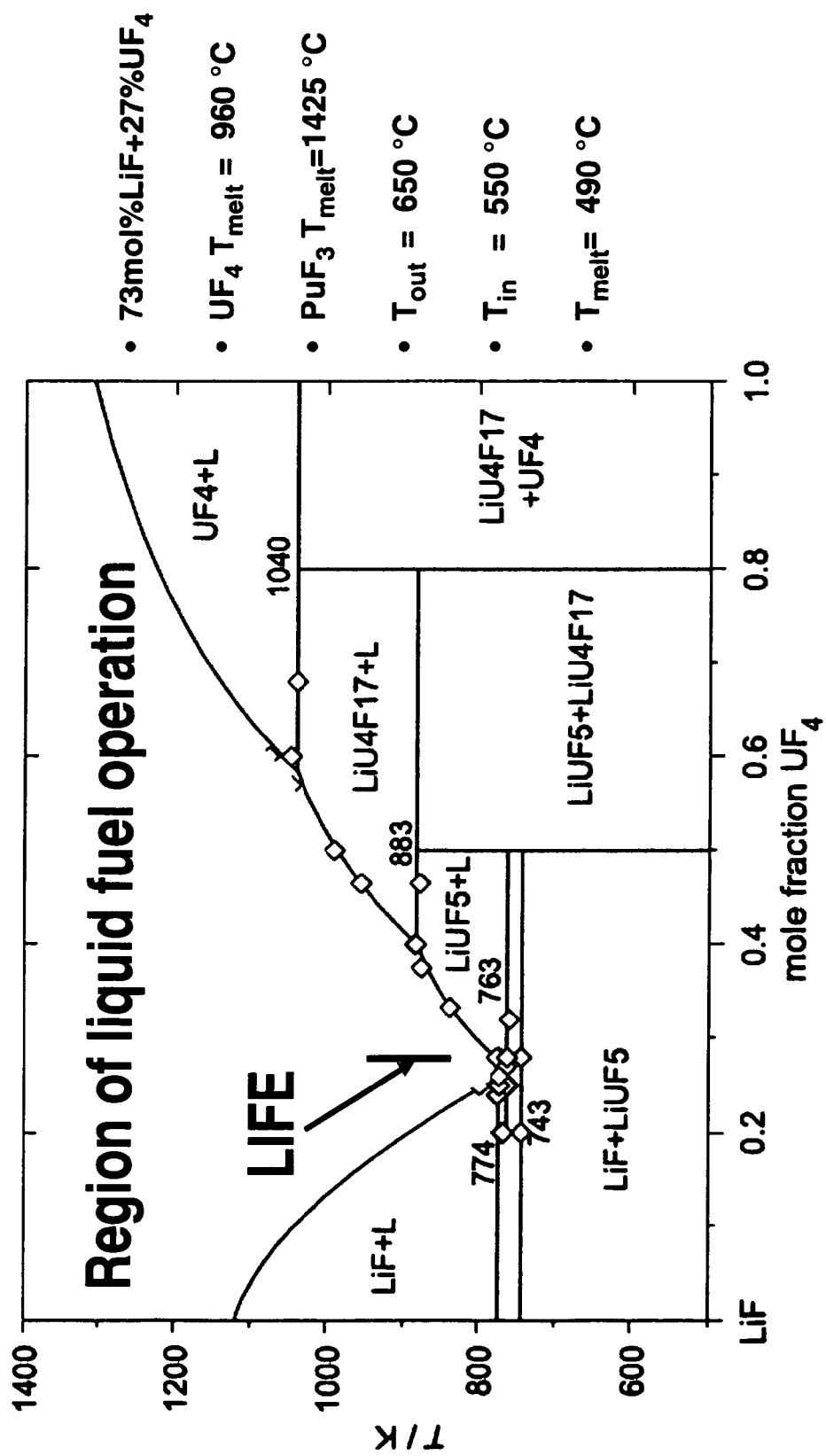
Figure 15:
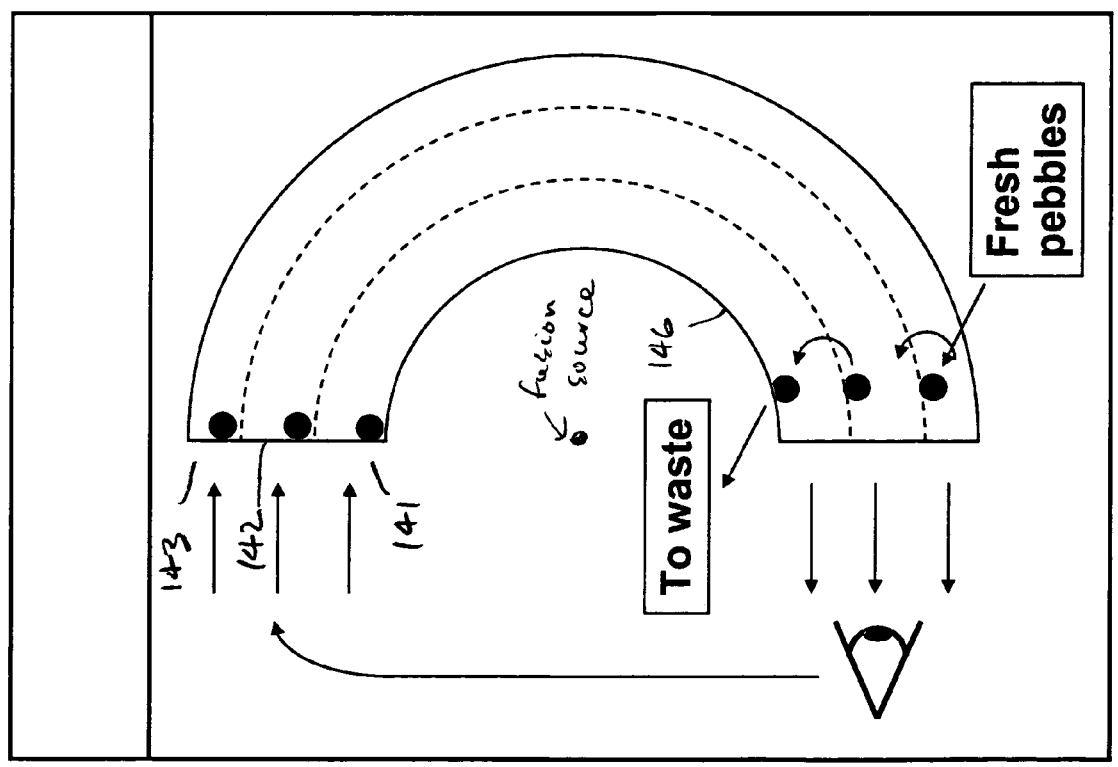
Figure 16:
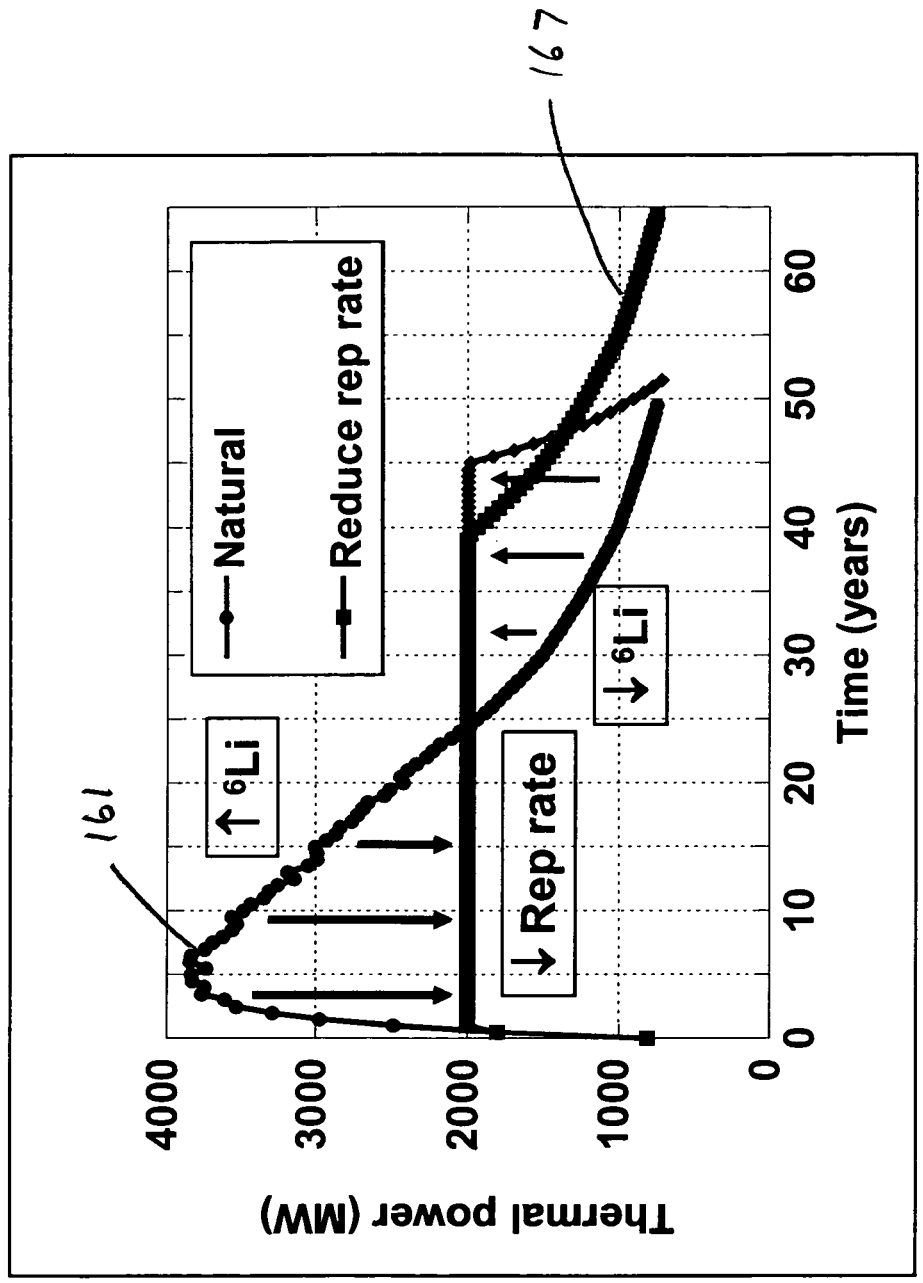
Figure 17:
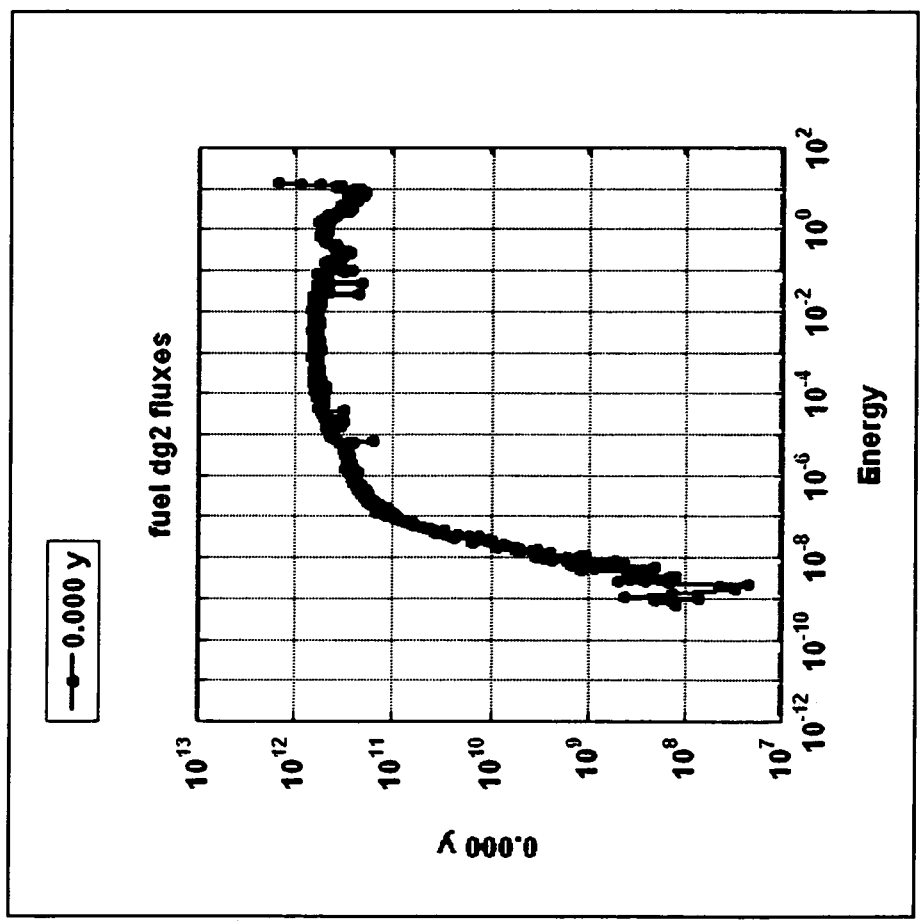
Figure 19:
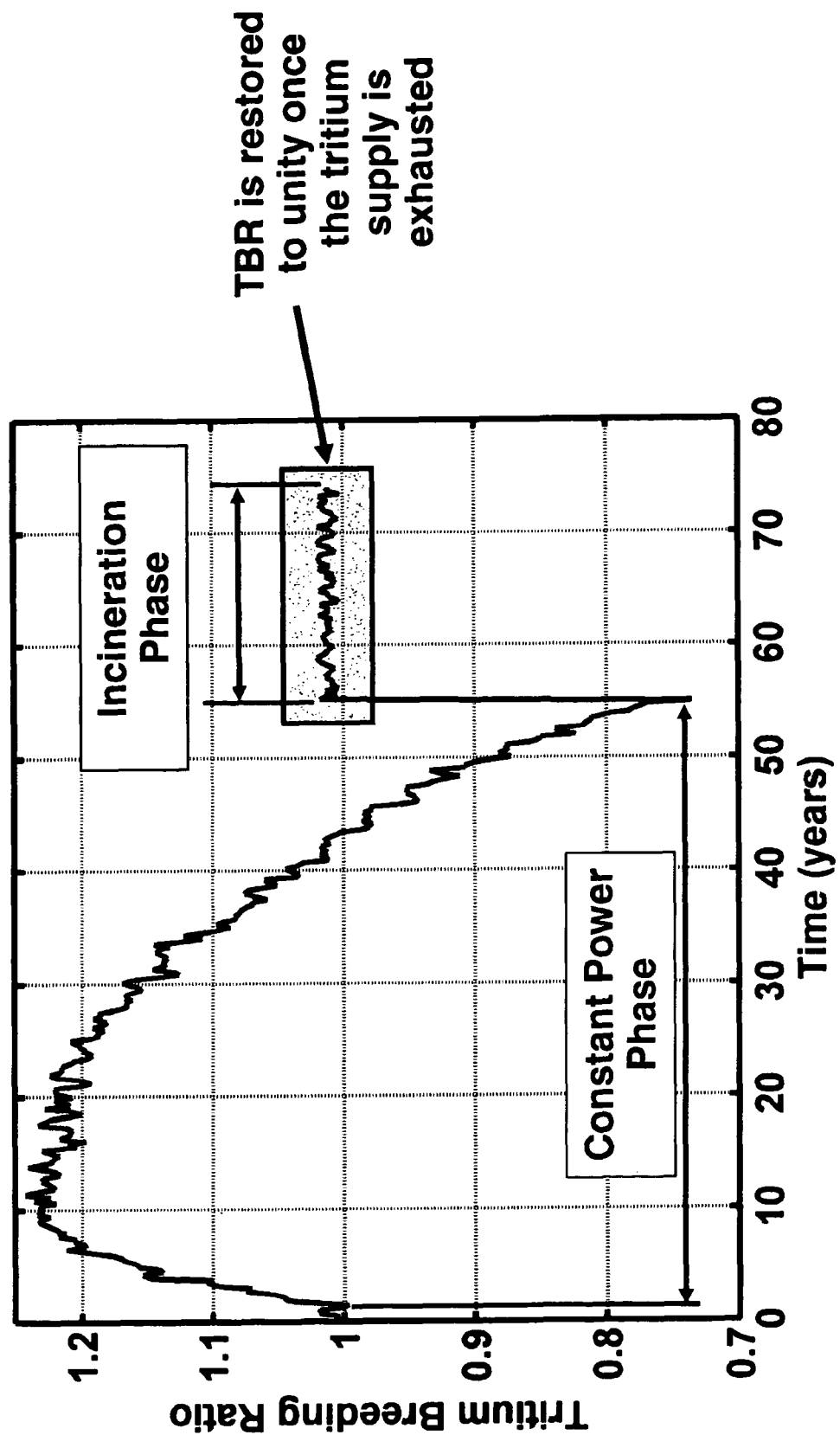
Figure 20:
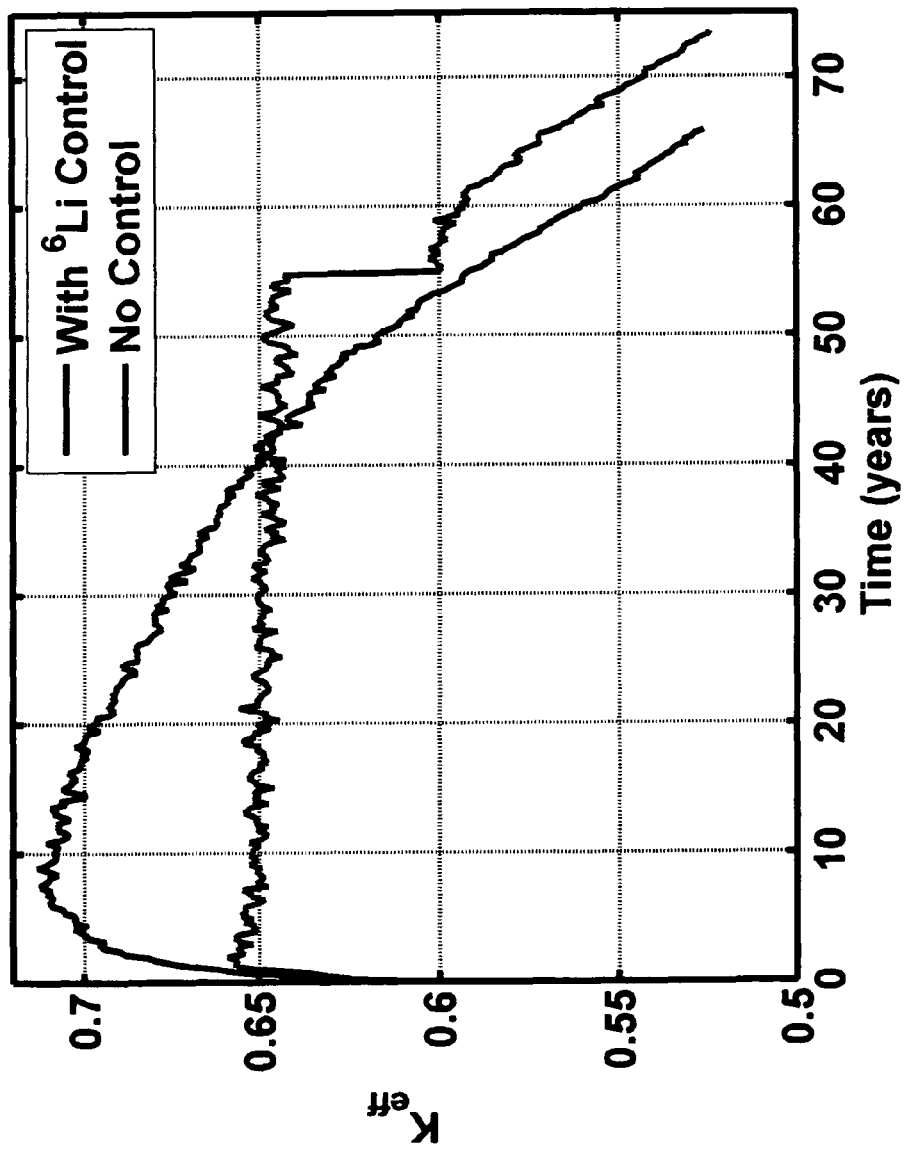
FIG. 20 illustrates how the large fusion target gain allows designing the fuel blanket for a low $k_{eff}$ at all times during engine operation. It is not possible to assemble a critical mass with LIFE fuel pebbles in a flibe-cooled system even at the time of peak plutonium.
Figure 21:
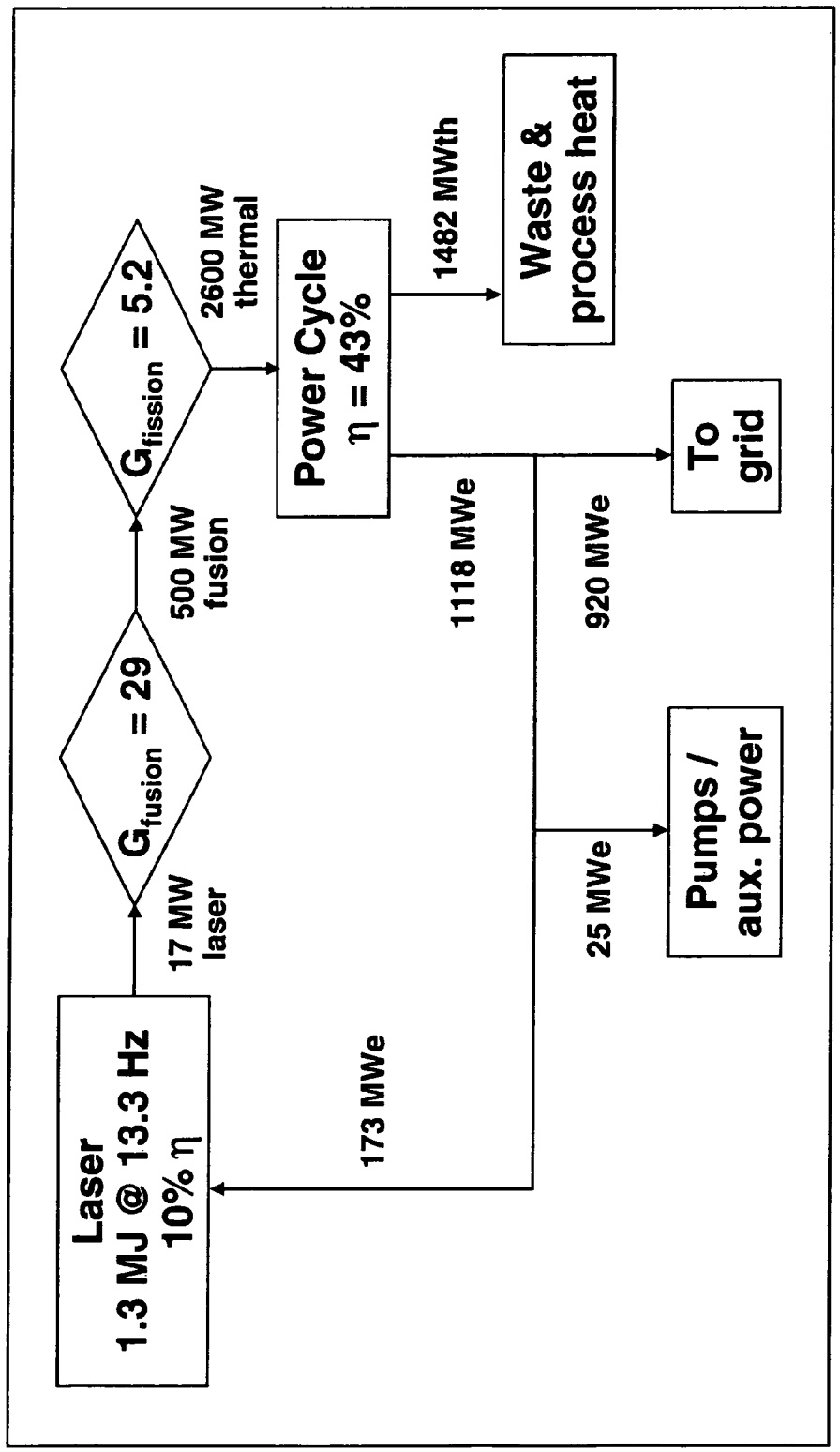
FIG. 21 illustrates the LIFE engine power flow for a depleted uranium fuel blanket. Note that in the system depicted 920 MWe is provided to the electrical grid to which the engine is connected.
Figure 22:
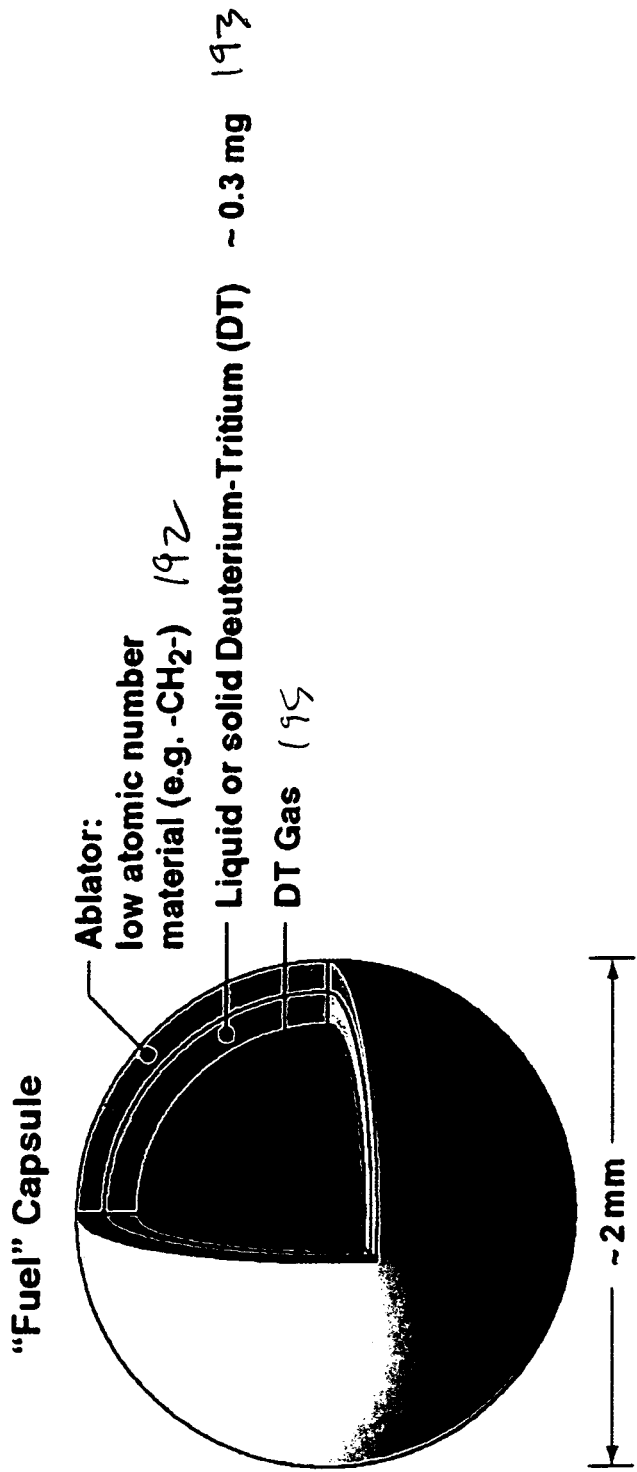

FIG. 22 illustrates a fuel capsule—the fuel portion of a fusion target. The capsule 190 includes an ablator layer 192, an interior layer 193 of liquid or solid deuterium-tritium of approximately 0.3 mg cooled to solidify on the walls of the capsule 190. The center of the capsule is filled with DT gas 195. The exterior dimension of the capsule 190 is about 2 millimeters diameter. The ablator portion of the capsule, such as illustrated in FIG. 22, can be manufactured by a variety of different approaches, such as injection molding. In injection molding a hopper of raw plastic is fed into a machine, for example with a screw motor drive, to be driven past heaters. The heaters render the plastic molten, enabling it to be injected into a mold to manufacture one hemisphere of the spherical capsule. Of course, the mold itself may manufacture thousands of the capsules in one operation. In one implementation an array of 1000×1000 capsule hemispheres is injection molded, thereby making 1 million half-capsules per mold. This array may then be joined with another similar array to make one million capsules per operation. By joining the two arrays together in an appropriate atmosphere of deuterium-tritium, the capsules are in effect pre-filled with the desired isotopes. A solvent can be used to remove any seam which remains after joining of the two arrays. Alternatively, if the capsules are manufactured from permeable plastic, they may be dipped into a liquid deuterium-tritium bath which allows the DT to permeate the capsule wall and fill the capsules.

Another approach for filling the capsules is to drill a hole in each capsule with, for example, a laser beam. The deuterium-tritium mixture can then be inserted into the capsule through the opening, followed by a step of chilling the capsule to an appropriate temperature to, for example, 15° K. so that the DT mixture does not leak out. The hohlraum/capsule is then maintained at this temperature until just before use in the LIFE engine.

Figure 23:
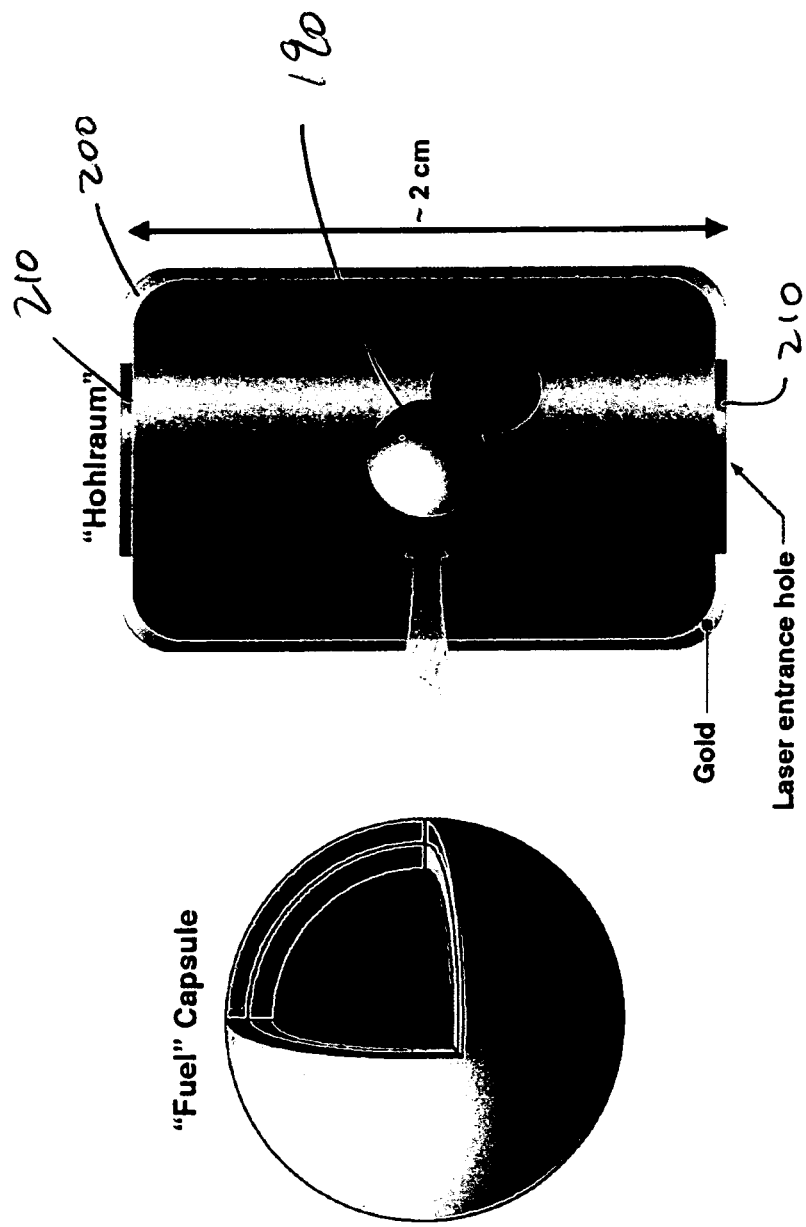

In an alternate process the capsules and hohlraum are fabricated in the same operation by molding half of the hohlraum/capsule assembly in each of two molds, then joining the molds together. FIG. 23 illustrates the hohlraum capsule assembly and the option of manufacturing it by manufacturing the two halves and then joining them. For the central hot spot fusion approach, half of the hohlraum/capsule system can be formed in a metal stamping operation, where the half is represented by a horizontal cut through the center of the capsule as illustrated in FIG. 23. The two halves can then be braised together.

Another approach for filling the capsules is to provide a nanofoam precursor on the interior wall surface at the time the capsule halves are manufactured. At the completion of manufacture, the completed capsule is spun and cured to create a thin nanofoam layer inside the capsule, and this foam layer can then absorb the DT mixture soaking through the permeable shell of the capsule.

Figure 24:
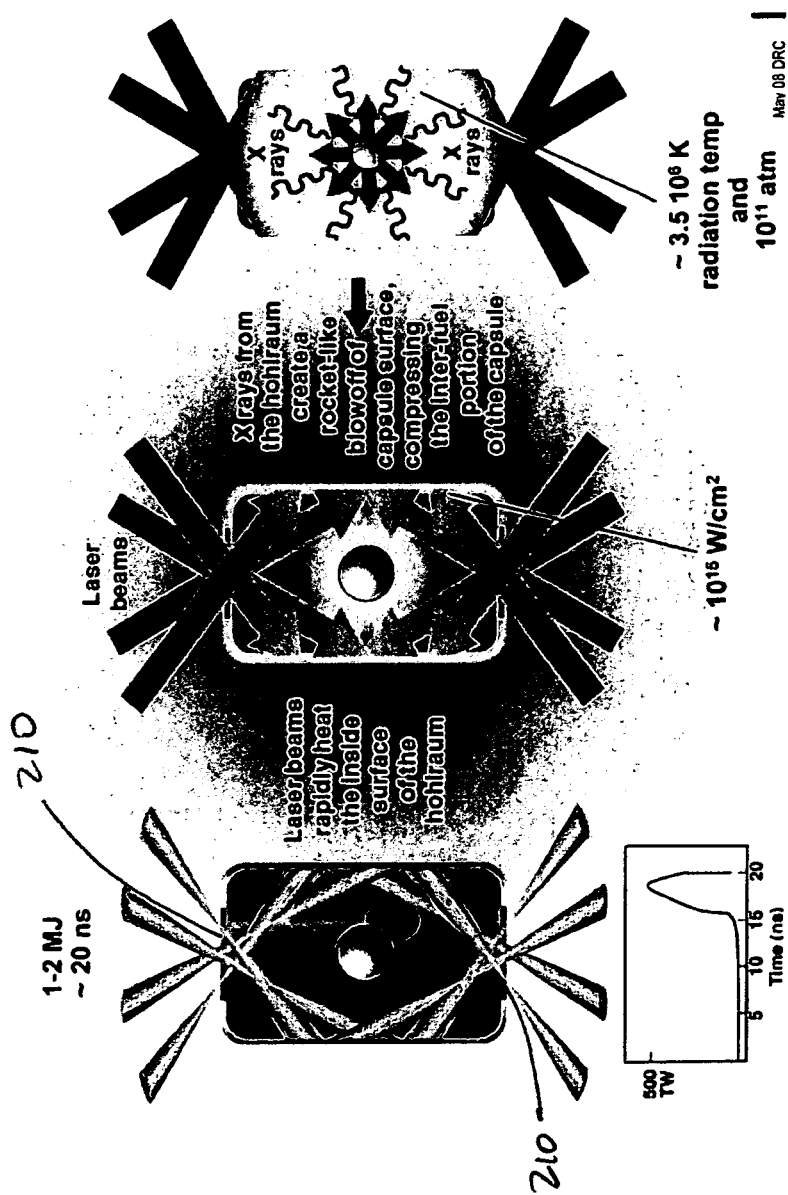

FIG. 23 illustrates the capsule after being positioned in the hohlraum 200. The hohlraum 200 is a cylinder with openings 210 at each end to allow laser beams to enter the hohlraum. The fuel capsule is suspended inside the hohlraum, for example, using a membrane (not shown). The hohlraum is preferably fabricated from gold, lead, or other heavy element. In the LIFE engine hohlraums are injected into the center of the target chamber, for example using a rail gun, compressed air or other approach. When the hohlraums reach the center of the target chamber, lasers or other devices heat the hohlraum, as shown in FIG. 24. The laser beams enter through the openings at each end of the hohlraum and rapidly head the inside surface of the hohlraum. As shown by the middle diagram of FIG. 24, the heated inside surface of the hohlraum causes x-rays to be emitted, creating a rocket-like blow off of the capsule surface. This compresses the capsule and the fuel within it, as shown on the right-hand side of FIG. 25.

Figure 25:
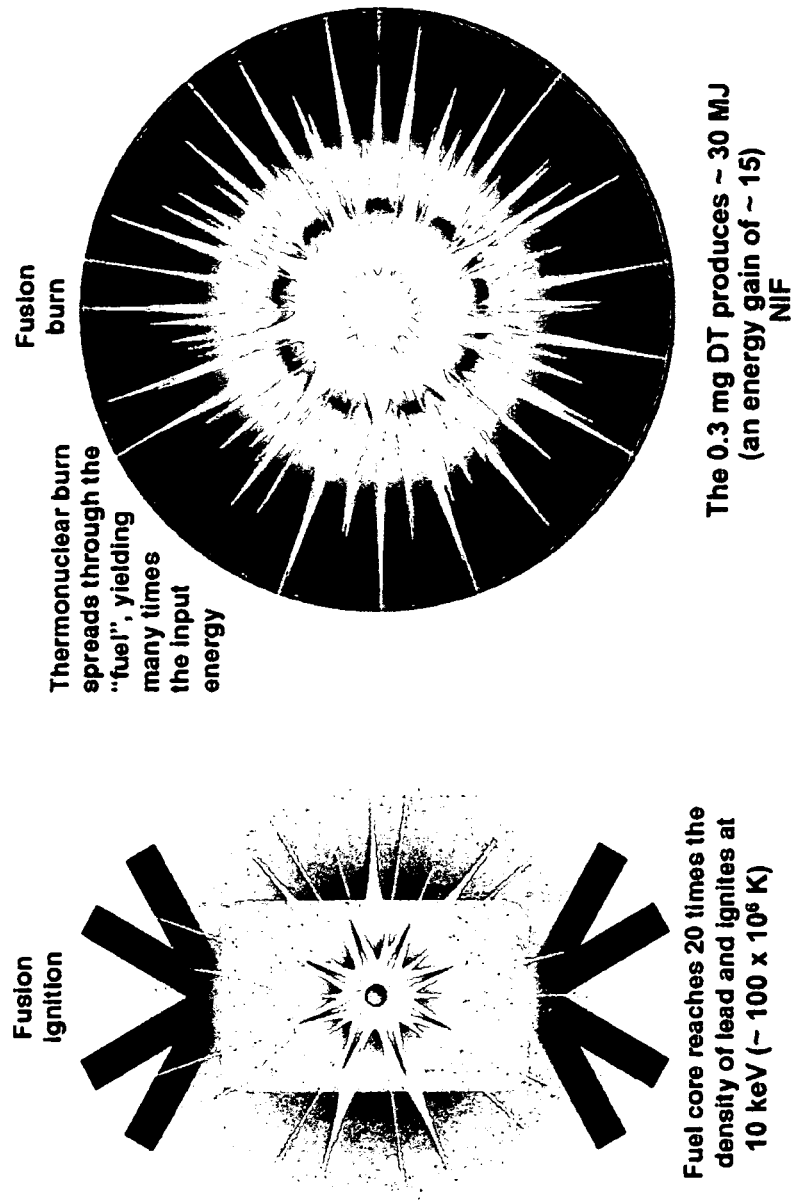

As shown by FIG. 25, the x-rays ultimately compress the fuel core to about 20 times the density of lead, and raise its temperature to 100,000,000° Kelvin, causing fusion ignition. The ignition causes thermonuclear burn through the rest of the fuel, yielding many times the laser input energy. (See the right-hand side of FIG. 25.) As a result, the 0.3 milligrams of DT fuel produces about 30 MJ of energy.

Figure 26:
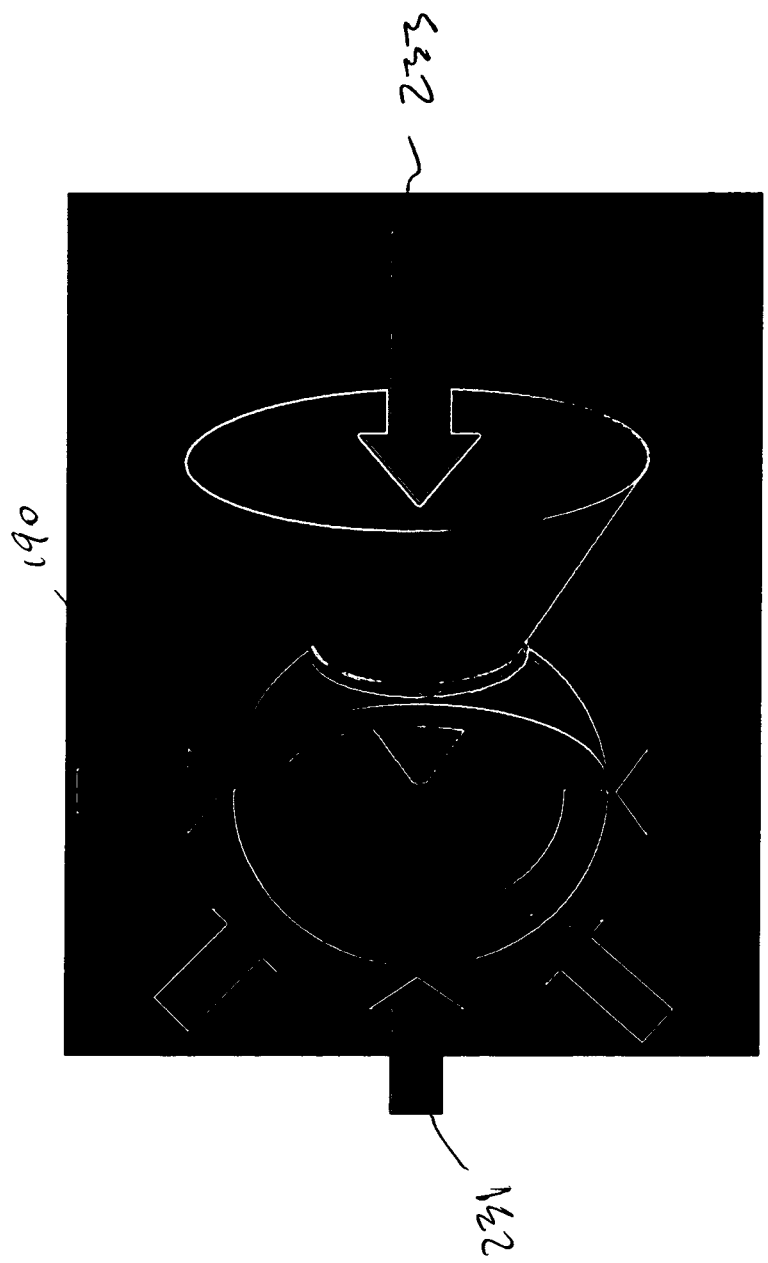

FIG. 26 is a diagram illustrating an alternative capsule structure for use with indirect drive fast ignition. As shown there, the hohlraum 230 includes ports 231 for compression laser beams, and a separate port 233 for an ignition laser beam. By separating the compression beam from the ignition beam, the laser requirements are relaxed compared with hot spot ignition, described above. The lower laser power means higher gain for the fusion reaction. Because of the separation of compression from ignition, the compressed fuel density needs to be only one-sixth to one-third that required for hit spot ignition. The ignition laser generates hot electrons that deposit their energy in the capsule, initiating a burn wave through the fuel capsule 190. The assembly depicted in FIG. 26 also enables the capsule to be positioned on the tip of a cone 235 allowing introduction of the ignition laser to the capsule. Guiding lasers enable tracking of the hohlraum as it passes through the chamber.

Figure 27:
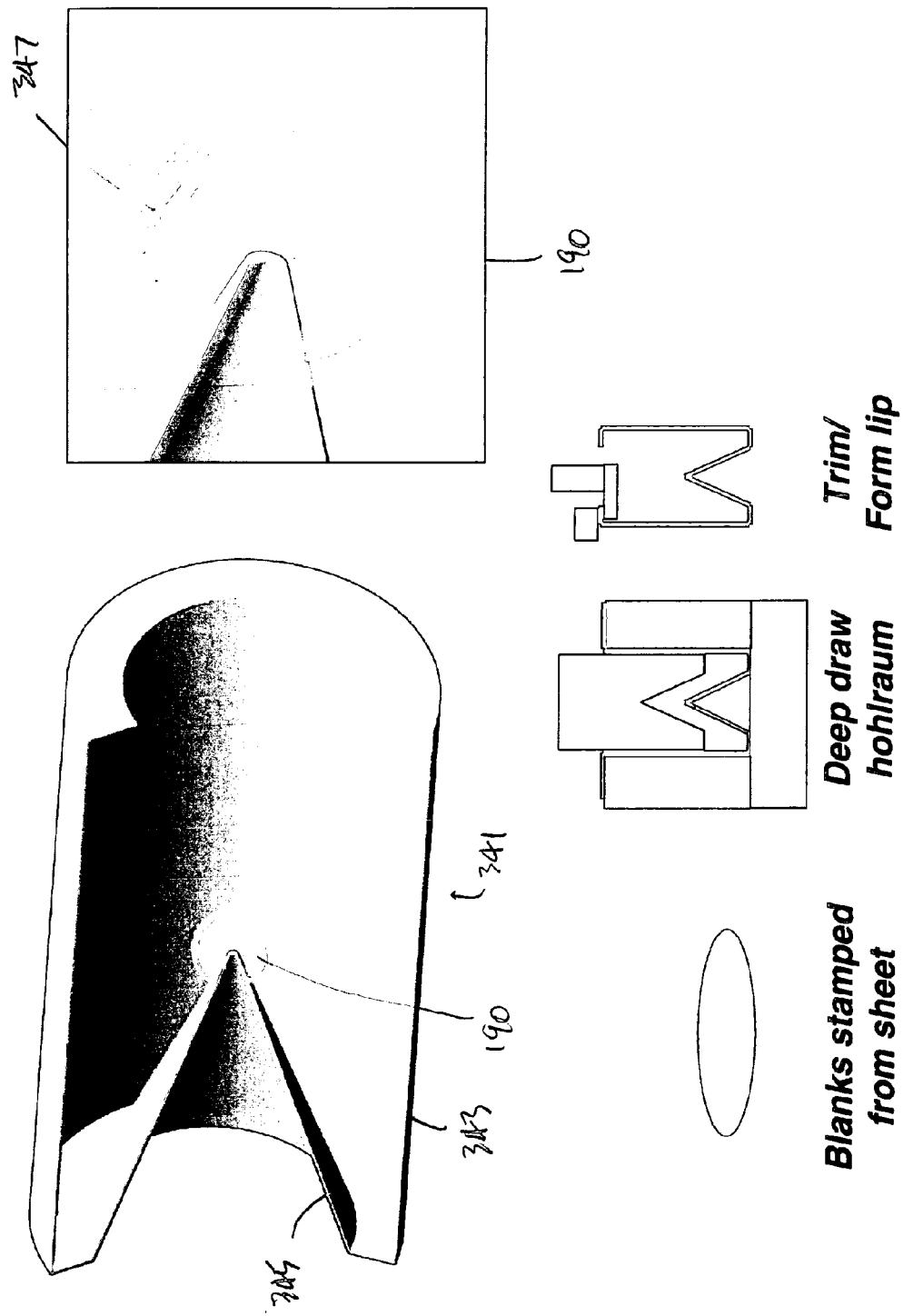

FIG. 27 is an illustration of a fast ignition capsule/hohlraum assembly 341. The fast ignition target includes a hohlraum 343, the fuel capsule 190, and a cone-shaped member 345 onto which the fuel capsule 190 is mounted. As discussed above, in fast ignition a series of laser beams impinge upon the capsule through openings 346 in the hohlraum, compressing the capsule to extremely high density. The DT fuel in the capsule 190 is then ignited by an ignition laser beam arriving at capsule 190 through the cone 345, triggering ignition of the DT mixture. FIG. 27 illustrates the overall structure of the fast ignition target. Note that in the illustrated embodiment the hohlraum is approximately 20×10 mm, and the capsule is approximately 2 mm in diameter with a 250 micron thick foam lining 347 containing the DT mixture.

A typical manufacturing process for manufacturing the hohlraum portion of the fast ignition structure shown in the upper portion of the figure. As shown in FIG. 27, blanks are first stamped from a sheet of desired material, typically a metal. These blanks are then placed in a deep draw stamping machine, as shown in the middle portion of the figure. The hohlraum shape, including the cone protrusion, is then stamped from the sheet. Following this step the lip of the hohlraum is formed and trimmed, as shown on the right-hand side of the figure.

Figure 28:
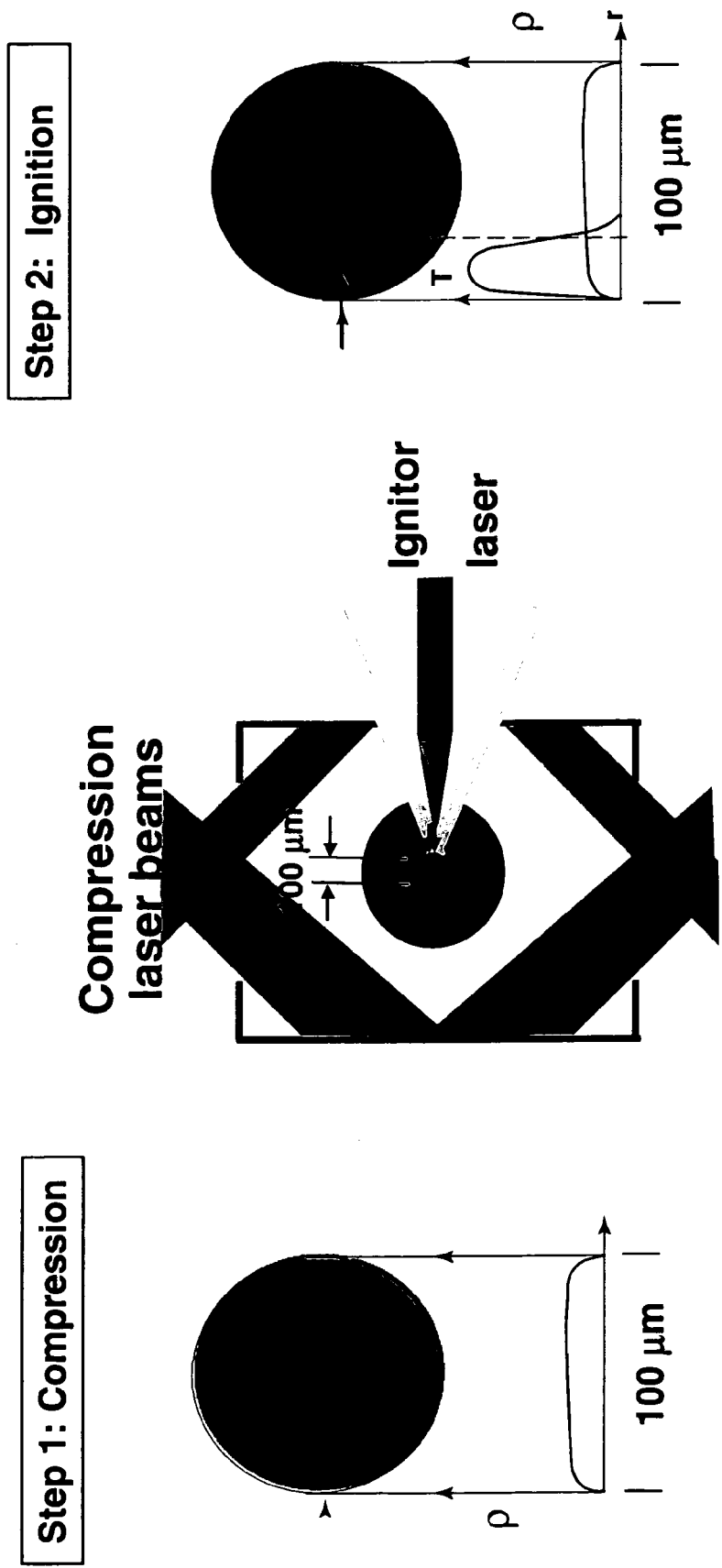

FIG. 28 illustrates the fast ignition process in conjunction with a hohlraum/target structure as described above. In a first step the DT fuel is compressed to about ⅙ to ⅓ of the density required for central hot-spot ignition. Then in a second step, an ignition laser generates hot electrons that initiate a burn wave. Efficient coupling of the short pulse ignitor beam to the compressed fuel is required and achieved using a cone shaped structure as described.

Another technique for manufacture of the fast ignition capsules after an initial step of formation of the capsules is to use a fill-and-aspirate technique to provide a layer of catalysts/precursor on the inside wall of the capsule through the opening in the capsule. The capsule is then filled with DCPD monomer and polymerized. Next, the capsule is placed in a super critical extractor and the excess polymer removed. Immersion of the completed capsule, which includes an opening for the cone, is then filled by immersion in a DT solution to saturate the foam layer with a DT mixture. By forming the foam at the desired thickness, an appropriate amount of DT is introduced into the capsule.

Figure 29:
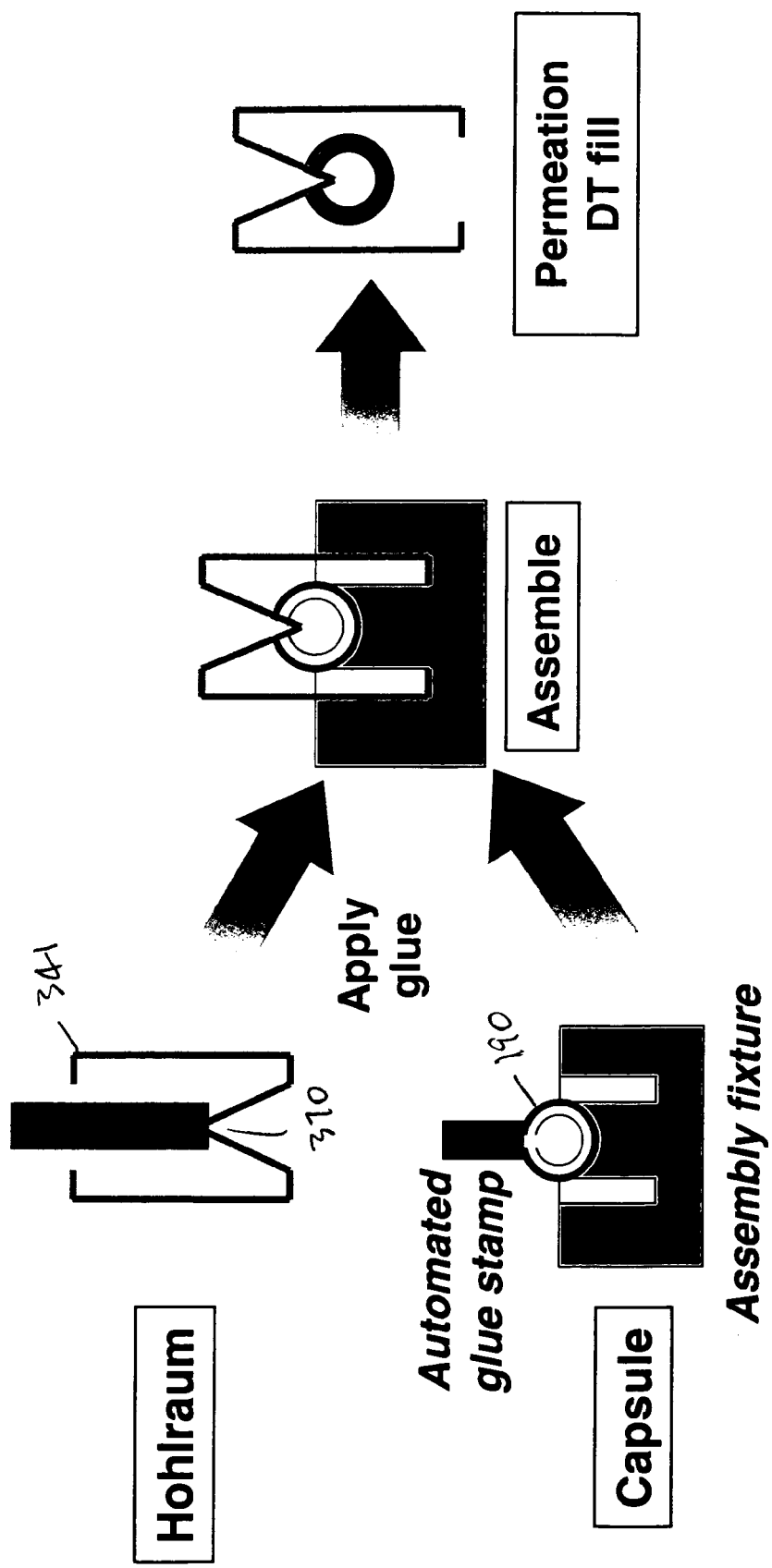

FIG. 29 illustrates another approach for manufacture of the fast ignition targets. After manufacture of the hohlraum 341, a bit a glue 370 is applied to the tip of the cone. In another process, a fixture positions the capsule and its internal foam layer in the appropriate orientation. The capsule 190 and hohlraum 341 are then combined, as shown in the middle portion of FIG. 29. The DT mixture can then be introduced into the capsule, for example by using a permeable portion of the tip of the cone, or the permeability of the capsule itself.

The cone positions the capsule in the correct location, and the foam inside the capsule makes obtaining a smooth uniform layer of DT easier. The foam is preferably a nanoporous foam, for example $CH_{1.3}$. The hohlraum is preferably lead. In alternative embodiments, however, the hohlraum can be manufactured from cooled flibe or other materials already in use as coolants for the chamber. Such materials have the advantage that the materials handling systems already in place for the chamber can be used to handle the recycled hohlraum material, which might otherwise require a special further materials-handling system.

Another way to manufacture the capsules is to use a drop tower. In this implementation two soluble polymers are maintained separately until they are combined at a nozzle having a desired shape. Drops of the combined polymers form at the nozzle and fall downward through the tower. With appropriate polymers and control, substantially uniform spherical drops are formed with appropriate wall thickness (on the order of 200 microns). By filling the tower with a DT mixture, as the drops fall and solidify, the DT mixture is trapped inside the drop and ready for cooling to form the appropriate layer within the capsule.

Figure 30:
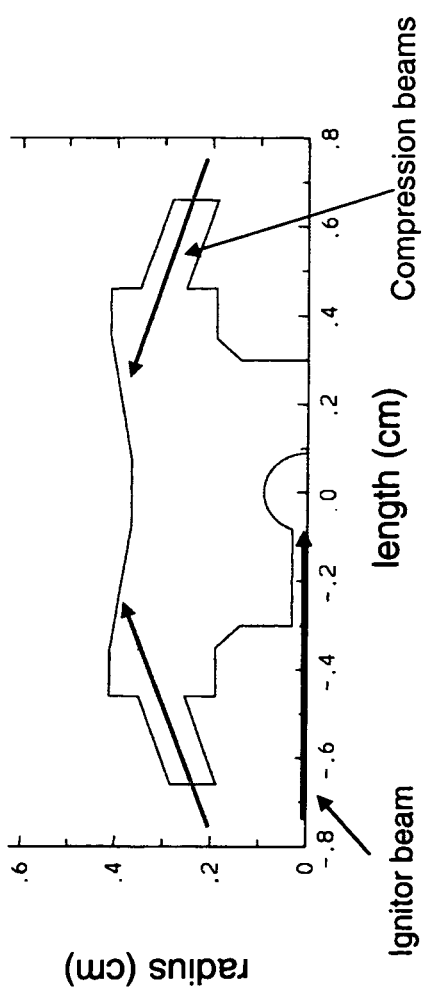

FIG. 30 is a more detailed diagram of the geometry of a fast ignition hohlraum. For this LIFE hohlraum configuration, two rings of laser beams provide sufficient radiation. There are four laser entry openings on each side (two shown). The beam intensity on the left ring is 6% higher to provide the desired asymmetry. The interior wall of the hohlraum is coated with 0.5 gm diamond. Input energy for the compression beams is about 660 kJ, while for the ignitor beam is about 100 kJ. The energy absorbed by capsule is about 40 kJ, resulting in overall gain of 28 [21 MJ/(660 kJ+100 kJ)]. The laser peak power is 160 TW for 8 beams which is 20 TW/beam. The spot diameter is 1.5 mm through entry holes of 2 mm, with a peak intensity of $10^{15}$ W/cm².

9. Laser Architecture

Two approaches—central hot spot and fast ignition—have been generally described above regarding the fusion portion of the LIFE engine. The table below compares the laser systems for these two approaches.

|  | Hot-spot Ignition | | Fast Ignition | | |
|---|---|---|---|---|---|
|  | Compression Laser | | Compression Laser | | Ignition Laser |
|  | 2ω laser | 3ω laser | 2ω laser | 3ω laser | 1ω laser |
| Pulse Energy | 1.85 MJ | 1.3 MJ | 1.3 MJ | 0.8 MJ | 0.15 MJ |
| Peak Power | 500 TW | 350 TW | 350 TW | 200 TW | 15 PW |
| Pulse Length | 20 ns | 20 ns | 20 ns | 20 ns | 10 ps |

|  | Hot-spot Ignition | | Fast Ignition | | |
| --- | --- | --- | --- | --- | --- |
|  | Compression Laser | | Compression Laser | | Ignition Laser |
|  | 2ω laser | 3ω laser | 2ω laser | 3ω laser | 1ω laser |
| Repetition Rate | 13.3 Hz | 13.3 Hz | 13.3 Hz | 13.3 Hz | 13.3 Hz |
| Focal Spot Size | 250 μm | 250 μm | 250 μm | 250 μm | 50 μm |
| RMS Pointing Error | ±50 μm | ±50 μm | ±50 μm | ±50 μm | ±10 μm |

FIG. 31 illustrates the laser specifications for the two approaches to fusion described herein—fast ignition on the left side of the figure, and central hot spot on the right side of the figure.

Figure 32:
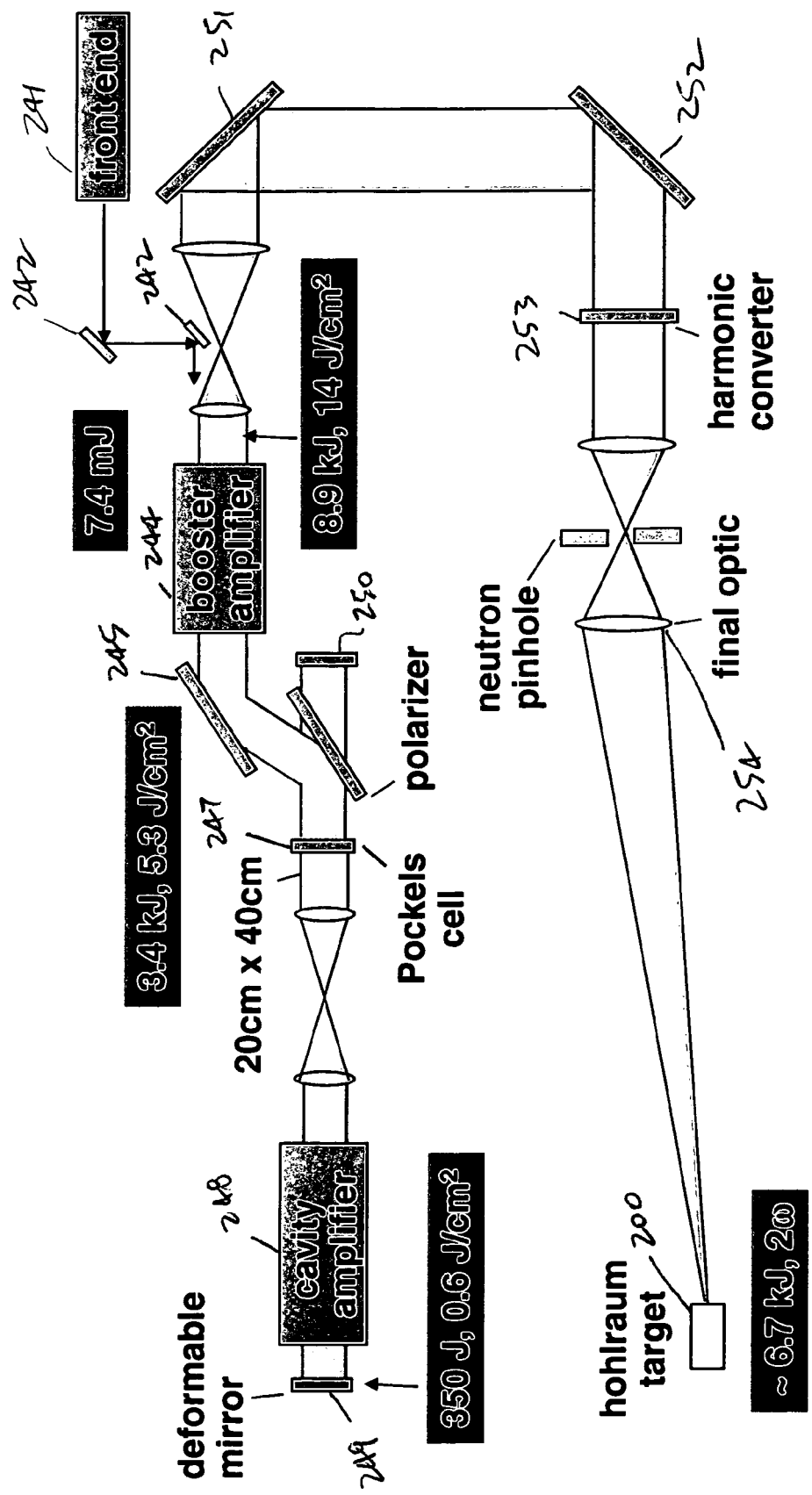

FIG. 32 is a diagram illustrating the laser architecture for the LIFE engine. As shown in FIG. 32, a front end portion 241 includes a continuous Yb-fiber master oscillator for generating the initial beam. Of course other lasers, such as short wavelength (248 nm) lasers such as krypton fluoride (KrF) may also be used. The beam then passes through an array of fiber-optic components to provide amplitude and bandwidth control, and is split to drive the desired number of preamplifier modules, e.g. 48. Immediately following the injection, about 1% of the laser energy is diverted to a diagnostic suite referred to as the input sensor package (ISP). Here, the total energy, temporal shape, and near-field spatial shape from each preamplifier module is measured. Pulses from the injection system are split four ways, supplying each of four main beamlines with energy that is adjustable from millijoules to more than a joule. Pulses from this injection laser system are then introduced via mirrors 242 into one of the main beam lines, by being injected near the focal plane of a transport spacial filter 243, as illustrated. The beam expands to full size of 37.2 cm×37.2 cm at the level of 0.1% of the peak fluence and is then collimated by the spatial filter lens 243.

The beam is then amplified by a booster amplifier 244, which is configured to have as many as seven slabs, but typically contains five. The amplifier aperture is preferably 20 cm×40 cm. The beam is reflected by a mirror 245 and a polarizer 246 to pass through a polarization switch provided by Pockels cell 247. The beam traverses the cavity amplifier 248, containing the equivalent of 11 Nd-doped glass laser slabs and is reflected by a deformable mirror 249. The deformable mirror corrects for wavefront distortions. The beam then passes again through the amplifier 248, acquiring additional energy. By the time the beam is passed through the amplifier 248 again, the plasma-electrode Pockels cell 247 switch has been fired to rotate the beam polarization by 90°. This allows the beam to pass through the polarizer 246 and be reflected by mirror 250 back for another double pass through the amplifier 248, acquiring still more energy. This time, however, by the time the beam returns to the Pockels cell 247, the cell has been turned off, allowing the beam to reflect from the polarizer 246 and the mirror 245 back into the booster amplifier 244.

After it again passes through the transport spacial filter, a beam splitter reflects a small sample of the output pulse back to the central transport special filter area, where it is collimated and directed to an output sensor package. There diagnostics record the beam energy, temporal pulse shape, and near-field profiles. The main pulse proceeds to a switchyard, where multiple mirrors, such as depicted by mirrors 251 and 252, direct the pulse to a final optics assembly which includes a harmonic converter 253 for converting the pulse to the desired 351 nm wavelength. The beam then passes through a final optical assembly 254 which focuses the beam to the desired spot size for application to the hohlraum target 200. Preferably the focusing optic—designated final optic—in FIG. 32 comprises a Fresnel lens. A Fresnel lens has the benefit that static loss due to neutrons saturates quickly, and that losses are reduced when the lens is heated.

As shown by FIG. 32, the beam energy, as a result of the process, is increased from the initial fractional joule output of the master oscillator to about 12 kJ joules by the time the beam reaches the hohlraum target. As an indication of scale, the CSF is 22 m long, the TSP is 60 m the path length from the TSF output to the target chamber is 60-75 m, and the target chamber is 5 m in radius.

Figure 33:
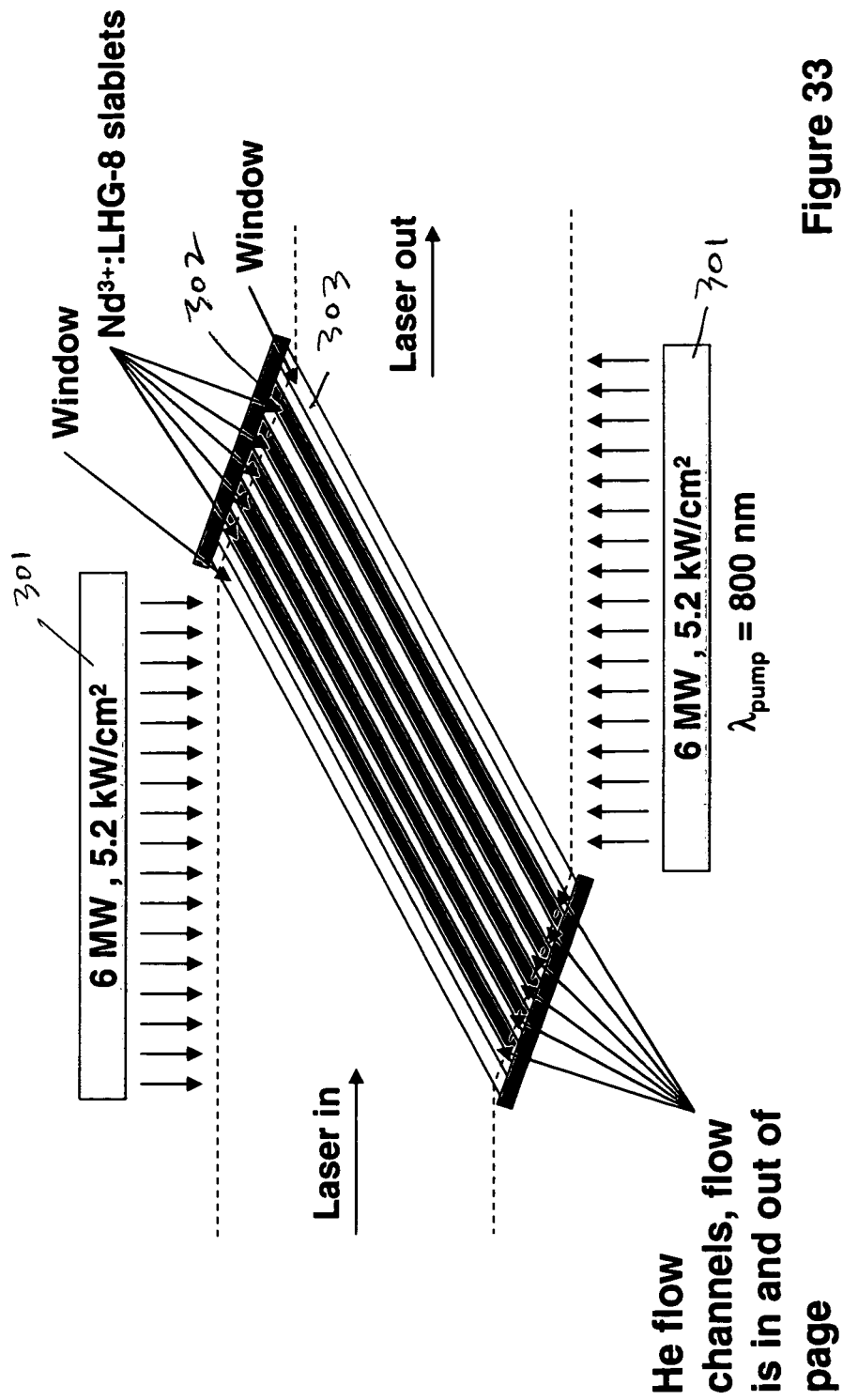

FIG. 33 illustrates a preferred implementation for each of the booster amplifier 244 and cavity amplifier 248. In FIG. 33 the slablets are shown from their edge, and are tilted at Brewster's angle with respect to the incoming laser pulse. Depicted are two arrays of vertical-cavity surface-emitting laser diodes (VCSELs) 301. These are positioned to pump a series of neodymium-doped glass slablets at about 800 nanometers providing about 5.2 kW power per square centimeter. Slablets are used rather than single slabs because the slablets are easier to cool, and easier to replace if necessary. To maintain appropriate temperatures, the slablets 302 are spaced apart a small distance to allow a cooling channel between each pair of slablets. A window 303 on each side of the assembly enables cooling of the outermost slablet 302. Helium is pumped between the slablets, for example in a direction perpendicular to the surface of the illustration of FIG. 33. If desired, the helium can be introduced between fins (not shown) along its flow path to cause the flow to be laminar, or turbulent, as desired. The thickness of each slablet is chosen to maintain an appropriate temperature given the rate of energy introduction into the slablets by the pumping VCSELs.

Figure 34:
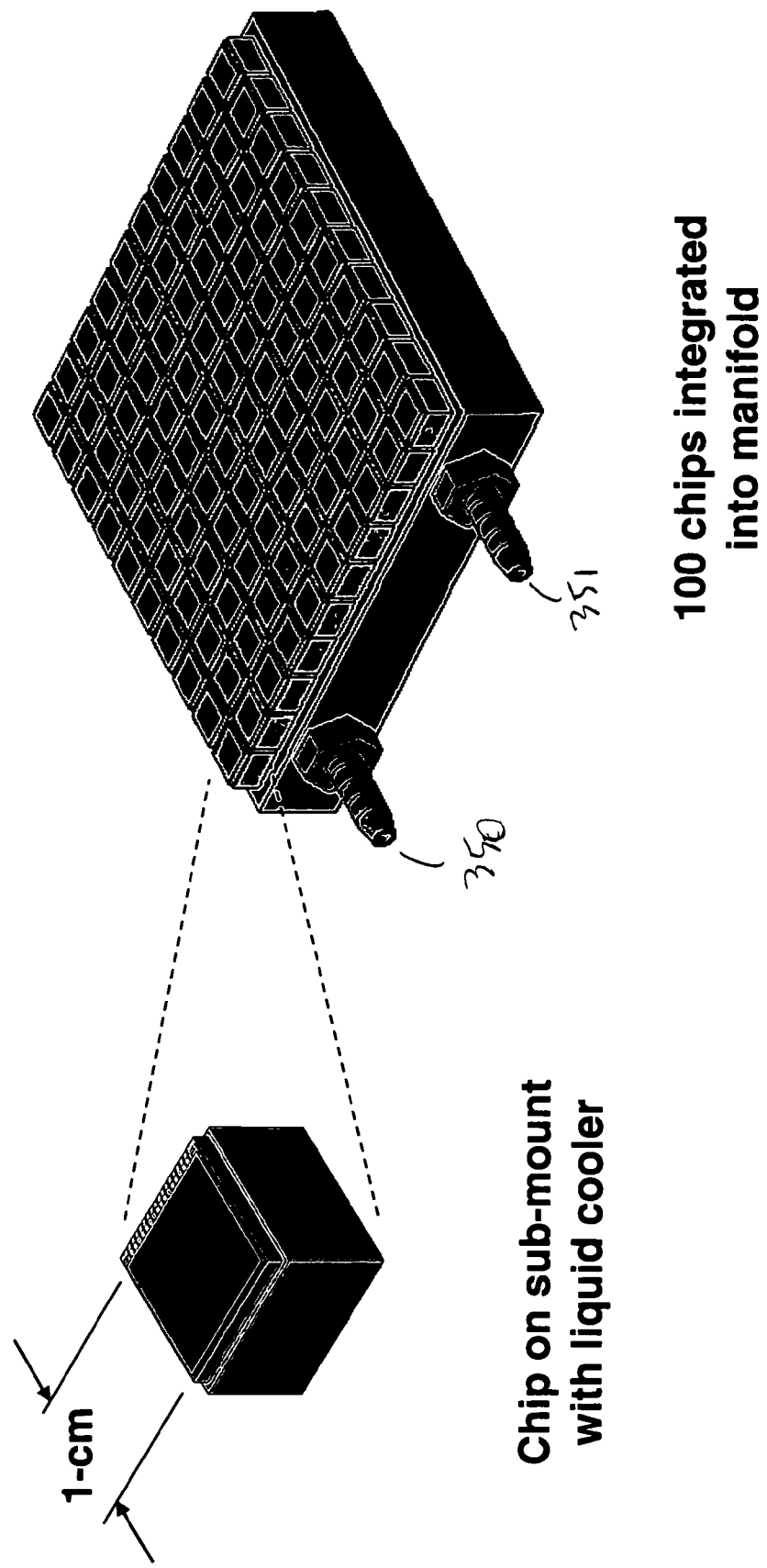

FIG. 34 illustrates VCSEL diodes fabricated as a 5 kW 1-cm$^2$ integrated circuits with 100 chips assembled into a single manifold. The liquid cooling is illustrated by the connections 350 and 351 along the edge of the manifold. Flow will be in one of the connections and out of the other connection to an external cooler.

FIG. 35 illustrates the neodymium doping of each slablet for the implementation of FIG. 33. By varying the doping from slablet to slablet 302, thermal loading in the presence of pump depletion is equalized among the slablets. Thus, in a five slablet implementation, the outer slablets are doped to about $2.27 \times 10^{19}$ atoms per cubic centimeter of neodymium doping, the next to the outer slablets are doped at $3.25 \times 10^{19}$ atoms per cubic centimeter, and the central slablet is doped at $3.96 \times 10^{19}$ atoms per cubic centimeter. A shown by the lower portion of FIG. 35, the doping profile from the upper portion of FIG. 35 results in uniform thermal loading—the same amount of pumping energy is deposited in each slablet.

Figure 36:
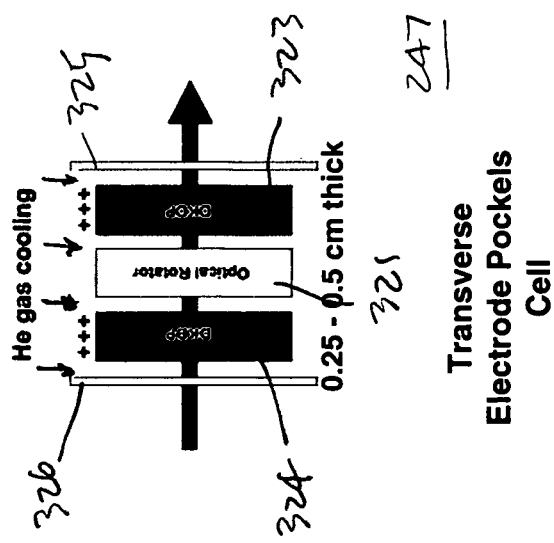

FIG. 36 is a diagram illustrating in more detail the transverse electrode Pockels cell 247 shown in FIG. 32. The Pockels cell of FIG. 36 includes a polarizer 321 and two deuterated potassium phosphate isomorphic single crystals 323 and 324. In the Pockels cell, the second DKDP crystal cancels the birefringence from the first crystal.

The structure depicted makes up a transverse electrode Pockels cell. The Pockels cell, including the polarizer, enables switching between no optical rotation and 90° rotation. This creates a very fast switch which is capable of opening and closing in a few nanoseconds. The plasma electrode Pockels cell shown allows light to either pass through it or reflect off the polarizer (see FIG. 32) for transmission to the beam line and ultimate targeting 200. By rotating the polarization of the laser beam, the Pockels cell directs the laser light back and forth through the cavity amplifier 248 between mirrors 249 and 250, or switches it to the beam line.

The high energy of the laser light passing through the Pockels cell 247 tends to heat the polarizer 321 and crystals 323 and 324. These optical materials can be damaged if the heat is not dissipated and the optical materials maintained at desired cooler temperatures. To achieve this, windows 325 and 326 are placed adjacent the crystals 323 and 324. This defines a series of flow paths for helium gas to be moved across the heated optics to maintain them at the desired temperature.

Figure 37:
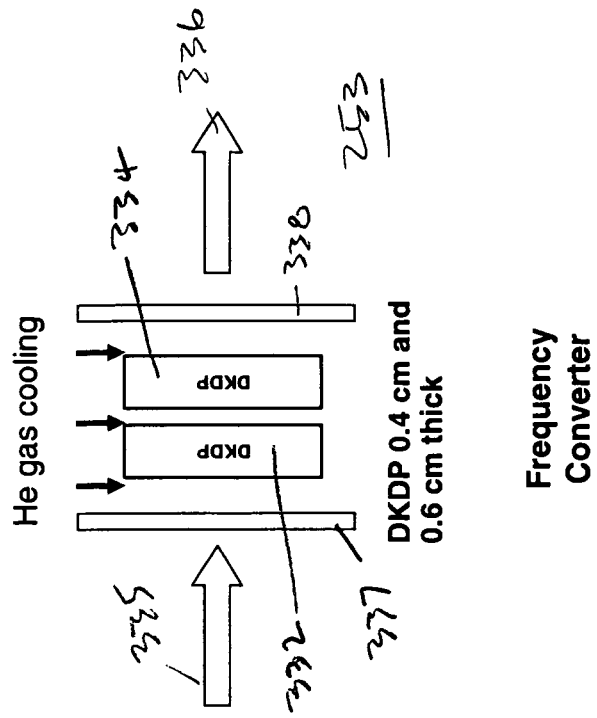

FIG. 37 is a diagram of the harmonic converter 253 previously shown schematically in FIG. 32. At the time the laser light reaches the harmonic converter, the wavelength of the light is 1.053 μm, which is in the infrared range. This wavelength corresponds to the lasing transition wavelength in the neodymium glass. In the harmonic converter 253, the beam is frequency converted to 351 nm (0.351 μm). Two DKDP plates 332 and 334 perform the conversion.

For the harmonic converter of FIG. 37, the DKDP plates are not uniformly divided to cause substantially equal heat loads to be imposed on each of the two plates. As laser light 335 enters plate 332, that plate is heated. When the laser passes through the second plate 334, some of its energy has been absorbed by the first plate 332, with the result that plate 334 can be thicker than plate 332, yet maintain the desired operating temperature. The ultimately-emitted green laser beam 336 is shown on the right-hand side of FIG. 37. In a manner similar to that described with respect to FIG. 36, windows 337 and 338 provide a contained path for flowing helium gas across the crystals 332 and 334.

Figure 38:
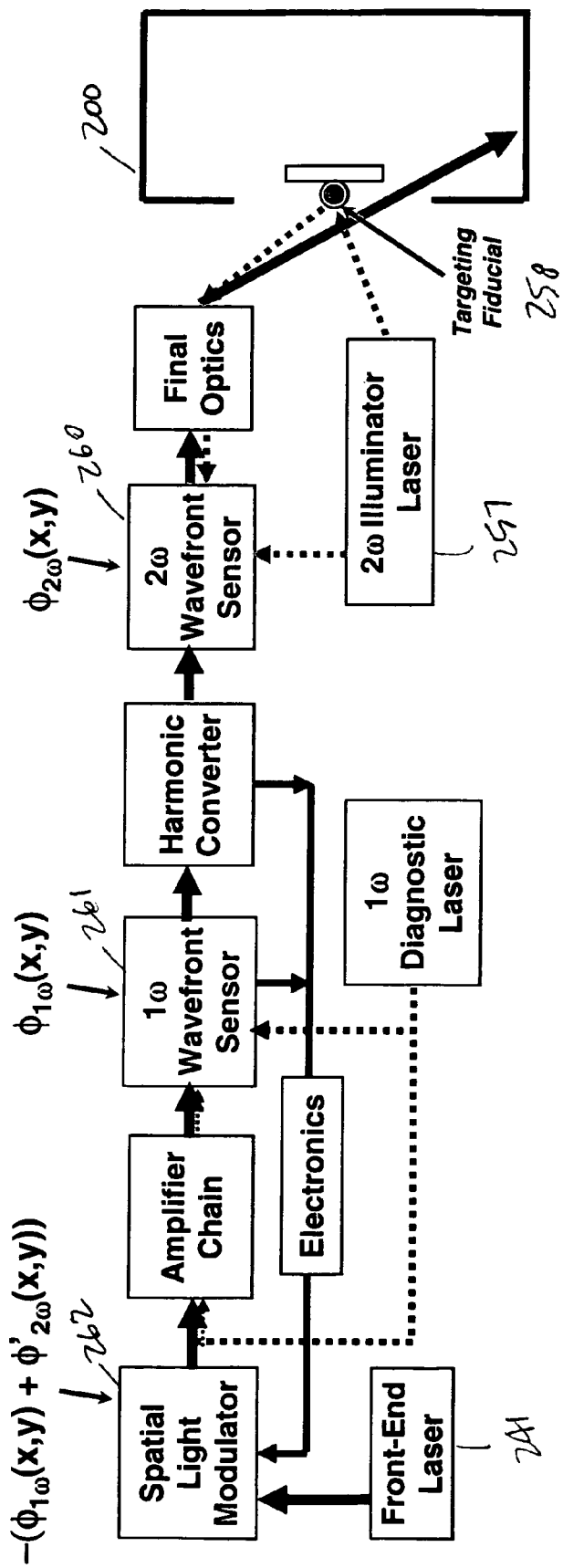

FIG. 38 illustrates the overall laser system and the techniques for diagnosing and monitoring the beams. Note that wavefront distortions are measured separately in both the 1ω and 2ω sections of each beamline, and that the 2w measurements include tilt due to target position. The electronics convert 2ω wavefronts to their 1ω equivalents and send combined 1ω and 2ω distortions to a high-speed MEMS spatial light modulator. The spatial light modulator corrects for wavefront distortions and points the beam onto the target.

In FIG. 38 is a flowchart illustrating the laser system in a block diagram form showing how the beams are corrected for distortions, and targeted. In FIG. 38 the front end laser system 241 has a small portion of beam energy diverted via 256 to a narrow band illuminating system 257. This system illuminates a targeting sphere 258 on hohlraum 200. Reflections off the targeting sphere are provided to the back end wave front sensors 260 which detect the position of the target and provide control information to the system. The combination of the front end wavefront sensor 26 and the back end wavefront 260 control the modulator 262 and the final optics to enable precise targeting of uniform beams.

Another technique for assuring that the target is correctly positioned within the chamber is to use laser peening. In laser peening a power laser striking an exterior surface of the hohlraum can form a high pressure plasma on the surface of the hohlraum causing a shockwave which physically moves the target to a different location. This technique allows fine adjustments in the location of the targets as they pass through the center of the chamber, assuring the laser beams are directed precisely enough to initiate a fusion reaction. By injecting the targets using electromagnetic forces, for example, with a rail gun, the targets can be situated very close to the center of the chamber with high reliability. Laser peening can then be used for fine adjustments in target locations to assure that the laser beams strike the target in the desired manner.

10. Conclusion

The laser inertial confinement fusion-fission engine described here uses beryllium to multiply and moderate fusion neutrons. These neutrons pass through a blanket of fissionable fuel which is cooled by radially flowing molten salt. Some of the neutrons react with the lithium in the coolant to produce tritium. This tritium is used to provide targets for the fusion reaction. The segmentation of the fuel blanket, the shared tritium inventory, and time varying fuel-to-moderator ratio enable improved performance and provide essentially constant power output over the duration of engine operation. As these procedures occur the engine remains sub-critical in all configurations.

The LIFE design is inherently safe. Decay heat removal is achieved using passive mechanisms such as natural convection. In a loss of coolant accident, the fission fuel can be passively dumped into a secondary vessel with favorable geometry for cooling via natural convection. The LIFE engine extracts virtually 100 percent of the energy content of its fuel, in comparison to the few percent of the energy in the ore required to make fuel for a typical light water reactor.

LIFE eliminates the need for costly uranium enrichment and refueling, enabling substantial cost savings, as well as significantly mitigating nuclear proliferation concerns. A nation operating LIFE engines does not need to build nuclear enrichment or reprocessing facilities. LIFE also drastically minimizes requirements for geologic waste repositories. LIFE offers a way to "burn to a nuclear crisp" all the spent nuclear fuel now destined for transportation to, and storage in Yucca Mountain, as well as the huge supply of depleted uranium that exists now, as well as what will be created in the decades ahead.

If the U.S. builds a reprocessing facility, as proposed for the Global Nuclear Energy Partnership (GNEP), LIFE engines can burn the mixture of plutonium 239 and minor actinides isolated from spent nuclear fuel by reprocessing. Unlike fast nuclear reactor technologies, LIFE can burn all of the high-level waste in a single reprocessing step. Moreover, LIFE power plants can burn all of the high-level waste that exists, and will be created by 2090.

When compared with existing and other proposed future nuclear reactor designs, the LIFE engine exceeds alternatives in the most important measures of proliferation resistance. By integrating fuel generation, energy production, and waste minimization into a single device, the LIFE engine is intrinsically highly proliferation-resistant. The engine needs no refueling during its lifetime. It requires no removal of fuel or fissile material generated in the reactor. It leaves no weapons-attractive material at the end of life.

This fusion-fission engine provides a pathway toward a sustainable energy future for the world, providing safe, carbon-free power, and disposing of accumulated nuclear waste from existing and future fission reactors. As such, LIFE enables the current nuclear energy industry to expand, knowing that technology capable of minimizing the long term nuclear waste and proliferation concerns associated with the current open fuel cycle is within reach. The LIFE technology offers many advantages over current and proposed nuclear energy technologies and could well lead to a true worldwide nuclear energy renaissance.

In summary, we have discussed a fusion-fission energy engine called LIFE. By 2100, LIFE engines could be powering most of the U.S. and worldwide energy grid and providing a large fraction of the global electricity demand, hydrogen fuel supply, desalinization plants and industrial processing plants without generating virtually any new long-lived radioactive waste.

It should be appreciated that the specific configurations, parameters, dimensions, power levels, materials, concentrations, and similar details provided herein are intended to illustrate various specific techniques for implementing the laser inertial-confinement fusion-fission engine described above. Other different specific configurations, parameters, dimensions, power levels, materials, concentrations, and similar details can also be used to implement the fusion-fission engine described. For example, alternative embodiments of the present invention may employ different techniques for creating the fusion reaction, moderating and multiplying neutrons from the reaction, protecting the first wall from damage, configuring the chamber to extract heat from the fusion-fission energy generated, etc. One of ordinary skill will recognize many variations, modifications, and alternatives. Accordingly it is to be understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A fusion-fission engine comprising:
    a chamber having a fusion source of neutrons;
    a fuel region for containing fertile or fissile fuel surrounding at least a portion of the chamber, wherein neutrons from the fusion source are introduced into the fertile or fissile fuel to convert it into different atomic weight elements and produce heat;
    a coolant which includes lithium circulating through the fertile or fissile fuel to extract heat therefrom for use in another process; and
    a coolant replenishing system for replenishing the lithium based coolant, the coolant replenishing system providing both $^6$Li and $^7$Li coolant in a specified ratio, wherein changing the ratio enables control of the heat produced by the engine.

2. A fusion-fission engine as in claim 1 wherein the fusion source of neutrons comprises neutrons produced by laser inertial confinement fusion.

3. A fusion-fission engine as in claim 2 wherein the neutrons from the fusion source convert some of the lithium into tritium.

4. A fusion-fission engine as in claim 3 wherein by absorption of the neutrons, production of the tritium reduces the electrical power output of the engine.

5. A fusion-fission engine as in claim 4 wherein during an initial phase of operation the engine is controlled to produce excess tritium by the coolant having a higher ratio of $^6$Li to $^7$Li, and during a later phase of operation the engine is controlled to produce less tritium by the coolant having a lower ratio of $^6$Li to $^7$Li.

6. A fusion-fission engine as in claim 1 wherein the neutrons are produced by laser light applied to targets containing tritium.

7. A fusion-fission engine as in claim 6 wherein tritium for use in the targets is manufactured by the fusion-fission engine.

8. A fusion-fission engine as in claim 1 wherein the fertile or fissile fuel comprises discrete units of fissile material and the engine further comprises:
    a safety system including a dump tank coupled to the chamber to receive the discrete units of fissile material from the chamber if the coolant ceases circulating through the fuel region;
    a convection cooling system coupled to the dump tank for cooling the discrete units of fissile material while in the dump tank; and
    a connection to the dump tank for removing the discrete units of fissile material from the dump tank.

* * * * *